(12) United States Patent
Semel-DeFeo

(10) Patent No.: US 12,398,914 B2
(45) Date of Patent: *Aug. 26, 2025

(54) HEATING, VENTILATION, AND AIR CONDITIONING SYSTEM AND METHOD

(71) Applicant: Geoflo Cooling, Inc., New Paltz, NY (US)

(72) Inventor: Damien Semel-DeFeo, New Paltz, NY (US)

(73) Assignee: GeoFlo Cooling, Inc., New Paltz, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/507,004

(22) Filed: Nov. 10, 2023

(65) Prior Publication Data

US 2024/0159424 A1 May 16, 2024

Related U.S. Application Data

(60) Provisional application No. 63/452,236, filed on Mar. 15, 2023, provisional application No. 63/424,508, filed on Nov. 11, 2022.

(51) Int. Cl.
*F24F 13/02* (2006.01)
*F24F 1/0011* (2019.01)
(Continued)

(52) U.S. Cl.
CPC ............ *F24F 13/10* (2013.01); *F24F 1/0011* (2013.01); *F24F 5/005* (2013.01); *F24F 8/10* (2021.01);
(Continued)

(58) Field of Classification Search
CPC .................. F24F 13/10; F24F 13/02
(Continued)

(56) References Cited

U.S. PATENT DOCUMENTS 4,203,424 A 5/1980 Coxon
4,437,511 A 3/1984 Sheridan
(Continued)

FOREIGN PATENT DOCUMENTS

KR 10-0795352 B1 1/2008
WO 03008874 A1 1/2003

OTHER PUBLICATIONS

International Search Report, International Application No. PCT/US 23/79443, Applicant: Geoflo Cooling, Inc., Mail Date: Mar. 12, 2024, 3 pages.

(Continued)

*Primary Examiner* — Avinash A Savani
*Assistant Examiner* — Ryan L Faulkner
(74) *Attorney, Agent, or Firm* — Saile Ackerman LLC; Stephen B. Ackerman

(57) ABSTRACT

The present disclosure proposes a method for when the Heating, Ventilation, and Air Conditioning (HVAC) is called for by a thermostat, the GeoFlo HVAC System first exhausts a heat sink in the basement, before calling for an evaporator to be activated. When the heat sink in the basement is cooling the conditioned space, by geothermally dispersing heat into the earth, the GeoFlo HVAC turns off the evaporator. Alternatively, the system acts as a substitute for an AC evaporator. Variations of the GeoFlo HVAC system and a control box designed to move heat from one area of a building to another using the existing HVAC system are also disclosed.

30 Claims, 40 Drawing Sheets

(51) Int. Cl.
    *F24F 5/00*           (2006.01)
    *F24F 8/10*           (2021.01)
    *F24F 8/22*           (2021.01)
    *F24F 11/72*         (2018.01)
    *F24F 11/76*         (2018.01)
    *F24F 11/79*         (2018.01)
    *F24F 13/10*         (2006.01)
    *F24F 110/10*        (2018.01)

(52) U.S. Cl.
    CPC ............... *F24F 8/22* (2021.01); *F24F 11/72* (2018.01); *F24F 11/76* (2018.01); *F24F 11/79* (2018.01); *F24F 13/02* (2013.01); *F24F 2005/0064* (2013.01); *F24F 2110/10* (2018.01); *F24F 2203/021* (2013.01)

(58) Field of Classification Search
    USPC ........................................................ 454/228
    See application file for complete search history.

(56) References Cited

U.S. PATENT DOCUMENTS

| | | | |
|---|---|---|---|
| 7,918,407 B2 | 4/2011 | Patch | |
| 8,555,666 B1 | 10/2013 | Pettus | |
| 9,857,810 B2 | 1/2018 | Smith | |
| 2003/0190885 A1* | 10/2003 | Johnsons, Jr. | F24F 7/065 454/186 |
| 2006/0162720 A1 | 7/2006 | Kaiser | |
| 2009/0101727 A1* | 4/2009 | Boudreau | F24F 3/14 236/44 C |
| 2012/0305214 A1* | 12/2012 | Wright | F24T 10/10 165/45 |
| 2017/0248332 A1* | 8/2017 | Wright | F24T 10/40 |
| 2019/0299154 A1 | 10/2019 | Meirav et al. | |
| 2020/0292240 A1 | 9/2020 | Chase | |
| 2021/0165926 A1* | 6/2021 | Flaherty | F24F 11/70 |
| 2021/0293441 A1 | 9/2021 | Conrad | |
| 2022/0026101 A1 | 1/2022 | Ko | |
| 2022/0120468 A1 | 4/2022 | Burks, III | |

OTHER PUBLICATIONS

Written Opinion of the International Searching Authority, International Application No. PCT/US 23/79443, Applicant: Geoflo Cooling, Inc., Mail Date: Mar. 12, 2024, 9 pages.
US Notice of Allowance, U.S. Appl. No. 18/507,003, Applicant: Damien Semel-DeFeo, Mail date: Jan. 24, 2024, 11 pages.
US Office Action, U.S. Appl. No. 18/507,006, Applicant: Damien Semel-DeFeo, Mail date: Jan. 17, 2024, 12 pages.
US Office Action, U.S. Appl. No. 18/507,006, Applicant: Damien Semel-DeFeo, Mail date: Oct. 28, 2024, 24 pages.
US Office Action, U.S. Appl. No. 18/507,007, Applicant: Damien Semel-DeFeo, Mail date: Jun. 28, 2024, 20 pages.

* cited by examiner

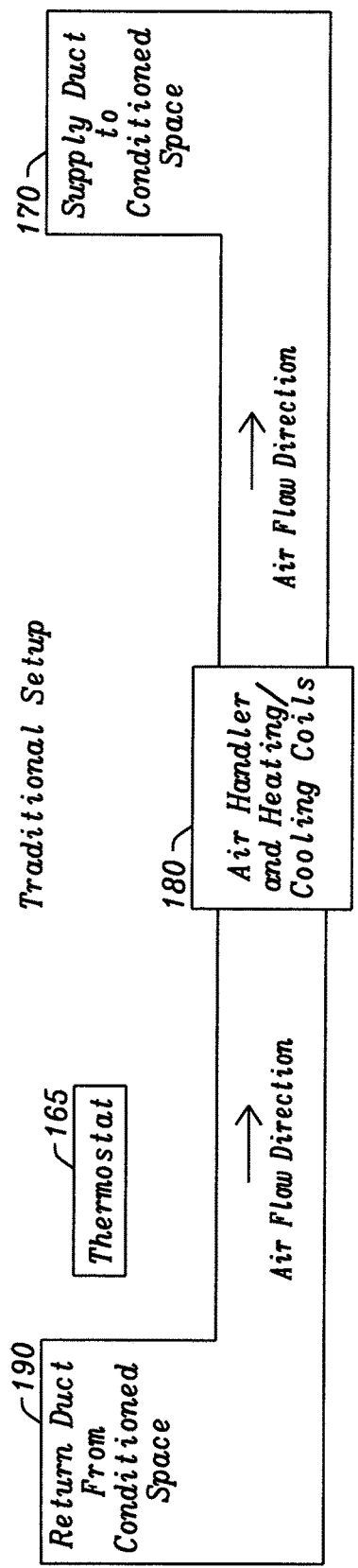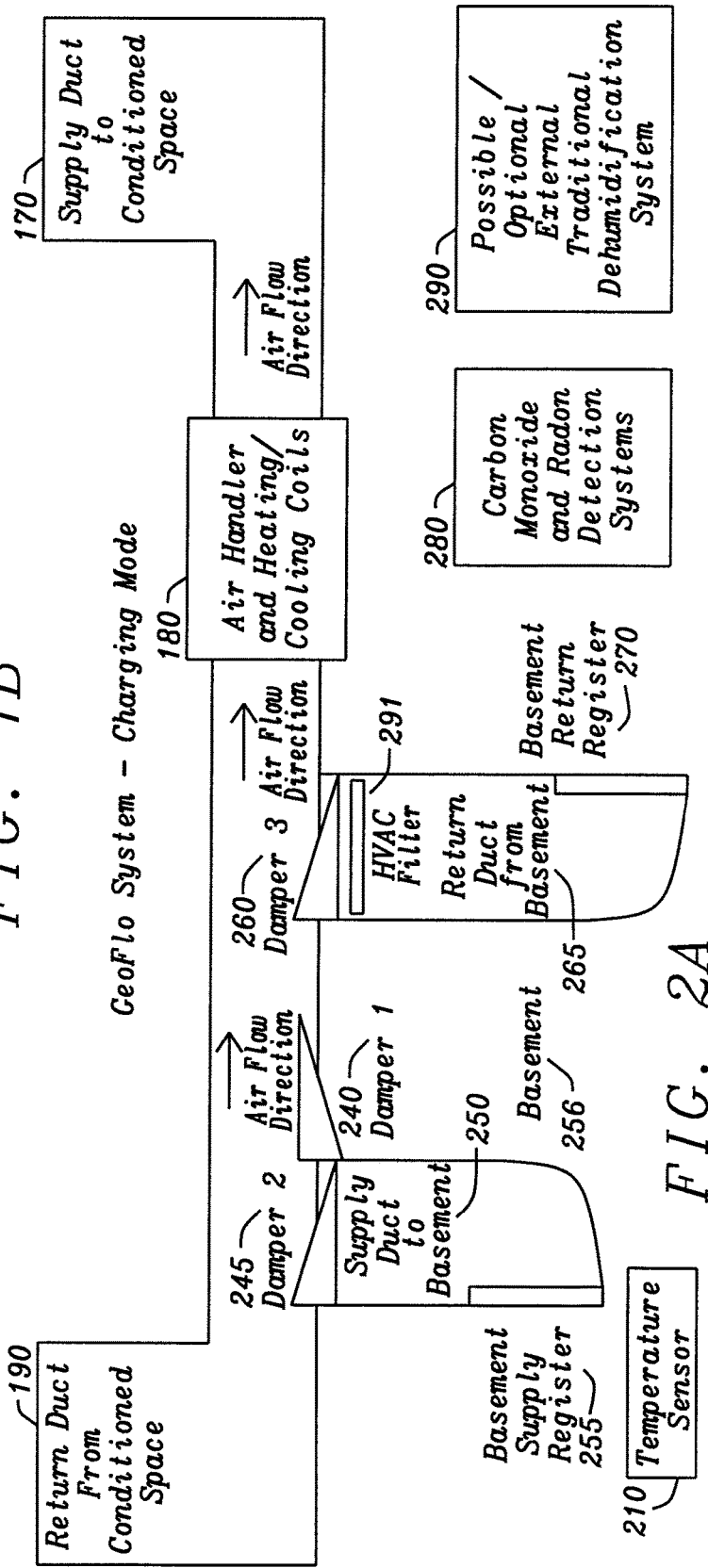
FIG. 1B
FIG. 2A

HEATING, VENTILATION, AND AIR CONDITIONING SYSTEM AND METHOD

RELATED PATENT APPLICATION

This application is related to U.S. patent application Ser. No. 18/507,003, filed on Nov. 10, 2023, which is assigned to a common assignee, and which is herein incorporated by reference in its entirety.

This application is related to U.S. patent application Ser. No. 18/507,006, filed on Nov. 10, 2023, which is assigned to a common assignee, and which is herein incorporated by reference in its entirety.

This application is related to U.S. patent application Ser. No. 18/507,005, filed on Nov. 10, 2023, which is assigned to a common assignee, and which is herein incorporated by reference in its entirety.

BACKGROUND

Field

The present disclosure relates generally to a system and method for heating, ventilating, and air conditioning a building. More particularly, the present disclosure relates to using passively cooled or heated air to reduce a traditional Heating, Ventilation, and Air Conditioning (HVAC) system's kilowatt draw.

Description of Related Art

Current industry practice for the Air Conditioning (AC) of an HVAC system is to require the evaporator to bear the entire cooling load of a house, while for buildings with basements, an unused perfect geothermal heat sink exists in the basement.

HVAC systems such as air conditioners and heat pumps typically require substantial amounts of electricity to operate.

The evaporator and condenser cons inside a central air conditioner or heat pump are used to exchange heat with the surrounding aft, and are important elements for cooling a living space, for air conditioners, or heating the living space in the case of heat pumps.

The evaporator coil is typically placed inside an aft handler and inside a building, and contains a chilled refrigerant moved there by a compressor. For an aft conditioner or heat pump being used for cooling, as aft from a blower fan moves over the con, the cold refrigerant removes the heat from the living space air, becomes warmer, and then travels to the condenser coil located outside the building.

In a heat pump being used for heating, the process reverses, and the evaporator coil expels heat from the refrigerant into the living space.

The condenser coil wraps around an outdoor condenser, and aft is pulled over the coil to cause the refrigerant inside the coil to lose heat, when used in an aft conditioning system or heat pump being used for cooling.

A heat pump being used for heating again reverses the process, with the condenser coil gathering heat from the outside air, and then air blowing over the hot evaporator coil warms the temperature in the building living space.

In this disclosure, the term evaporator, or evaporator coil, is used to refer to the indoor portion of an HVAC system, and condenser, or condenser coil, to the outdoor portion, unless otherwise indicated. The terms heating coils and cooling coils may also be used, and generally will be referring to the indoor element (i.e., the evaporator coils) of the system.

Typical AC systems have a return duct that carries air from finished/conditioned space through an air handler and across an evaporator coil component of the AC system. The cooled air is then delivered back to the finished/conditioned space via supply ducts. As a result, the conditioned air passes from conditioned space through the HVAC system and back into conditioned space in a continuous cycle. The unconditioned basement space in buildings with unfinished basements is not included in that cycle.

SUMMARY

The disclosed system and method for conditioning the air in a building, is hereinafter referred to as a GeoFlo Heating, Ventilation, and Air Conditioning (HVAC) System.

It should be noted that throughout these descriptions of various embodiments of the cooling system described, heat is dispersed through the basement slab and into the earth at all times.

Accordingly, it is an object of one or more embodiments of the present disclosure to provide significantly reduced kilowatt draw from a conventional AC evaporator, or in some cases, eliminate the need for an evaporator altogether.

It is a further object of one or more embodiments of the disclosure to provide building owners who have forced air heat but no central AC to moderately, and geothermally, cool their building with no evaporator.

Still further, it is an object of one or more embodiments of the disclosure to use a basement as a heat sink whenever possible, to allow the AC evaporator to turn off during those times, or to cool a building that does not have an AC evaporator.

The above and other objects of the present disclosure may be accomplished with an air conditioning system having a computing or wiring based system, comprising one or more thermostats, configured to sense a temperature at a location of the thermostat in a building, and to sense a temperature in a basement of the building, a main return duct, a basement supply duct and a basement return duct, each connected on one end to the main return duct, and each opening on another end to the basement, and dampers for controlling air flow through the main return duct, the basement supply duct, and the basement return duct.

The above and other objects of the present disclosure may be further accomplished with a method for operating an air conditioning system having a computing or wiring based system, in a building having pre-existing central air conditioning, wherein the air conditioning system comprises one or more thermostats, configured to sense a temperature at a location of the thermostat in conditioned space in a building, and to sense a temperature in a basement of the building, a main return duct, a basement supply duct and a basement return duct, each connected on one end to said main return duct, and each opening on another end to said basement, and dampers for controlling air flow through said main return duct, said basement supply duct, and said basement return duct. The method comprises the steps of if the temperature in the basement is less than a predetermined threshold cooler than the temperature of the conditioned space, entering a charging mode, wherein an evaporator is activated, an air handler is activated or remains active, and the conditioned air is circulated through said main return duct, said air handler and said evaporator. If the temperature in the basement is equal to or greater than said predetermined threshold cooler than the temperature of the conditioned space, entering a cooling mode, wherein the evaporator is deactivated, the air handler is activated or remains active, and the conditioned air is circulated through the main return vent, the basement supply duct, the basement return duct and the air handler.

The objects of this disclosure are further met by an embodiment of a GeoFlo HVAC System having a supplemental air handler.

The objects of this disclosure are further met by an embodiment of a GeoFlo HVAC System in a building with forced air heating, and without existing central air conditioning.

The objects of this disclosure are further met by an embodiment of a GeoFlo HVAC System in a building with existing central air conditioning, and an optional savings booster.

The objects of this disclosure are further met by an embodiment of a GeoFlo HVAC System with a booster air source heat pump, for a boost to the system's cooling power, plus dehumidification.

The objects of this disclosure are further met by an embodiment of a GeoFlo HVAC System with an alternate layout booster air source heat pump, for boost plus dehumidification.

The objects of this disclosure are further met by an embodiment of a GeoFlo HVAC System with a modular kit, and a replaced section of duct.

The objects of this disclosure are further met by an embodiment of a GeoFlo HVAC System with a basement air to air heat exchanger, for damp basements.

The objects of this disclosure are further met by an embodiment of a GeoFlo HVAC System with a custom dual-duct damper. The dual damper described herein is viable for any use case outside those described here where two mutually exclusive ducts are served by dampers so that one is open while the other is closed.

The objects of this disclosure are further met by an embodiment of a GeoFlo HVAC System with a vapor reducing HVAC filter.

The objects of this disclosure are further met by an embodiment of a GeoFlo HVAC System variation, with an air-to-air passive supplemental ground loop.

The objects of this disclosure are further met by an embodiment of a GeoFlo HVAC System variation, with an air-to-air forced supplemental ground loop.

The objects of this disclosure are further met by an embodiment of a GeoFlo HVAC System variation, with an air-to-air forced supplemental ground loop, and an air source heat pump.

The objects of this disclosure are further met by an embodiment of a GeoFlo HVAC System variation, with a water-to-air supplemental ground loop, and a ground source heat pump.

The objects of this disclosure are further met by an embodiment of one or more thermostats for damper-based zones, in a building with one air handler supporting more than one zone, separated by HVAC dampers, and controlled by separate thermostats.

The objects of this disclosure are further met by an embodiment of ultraviolet (UV) antimicrobial filtration, placed in the basement return duct.

The objects of this disclosure are further met by an embodiment of using the GeoFlo System to heat conditioned space by drawing warm air from solar or geothermally passively heated space and placing the GeoFlo System onto ducts designed for the specific purpose of drawing air from that passively heated space.

The objects of this disclosure are further met by an embodiment of using a ground-source heat pump GeoFlo System fed by an individual or an array of radiant/thermal hot water solar panel(s).

The objects of this disclosure are further met by an embodiment of using a ground-source heat pump GeoFlo System fed by a radiant/thermal hot water solar panel, where the hydronic fluid supplied by the solar panel has a temperature boost from a supplemental heat source.

The objects of this disclosure are further met by an embodiment of Bimetallic style dampers, allowing the dampers to open and close based on the temperature of the basement.

The objects of this disclosure are further met by an embodiment of Billows valve style dampers, allowing dampers to open and close based on the temperature of the basement.

The objects of this disclosure are further met by an embodiment of Bimetallic and Billows variations opening and closing the dampers gradually and naturally, creating a hybrid version of cooling and charging modes.

The objects of this disclosure are further met by an embodiment of an additional feature on the thermostat where the user would turn on or off a dehumidification feature. This embodiment would also include a sub-variation with a hygrometer located in the basement and the thermostat designed and/or coded in such a way that it can accept and process readings from the hygrometer as it would a thermometer.

The objects of this disclosure are further met by an embodiment of using individual units that combine a supply register, an HVAC filter, and a small air handler or other vent fan, where the units can be installed in the floor of each room/area that touches the basement and that requires cooling without the need for any ductwork.

The objects of this disclosure are further met by an embodiment to accommodate a central AC system or zone with an air handler located in the attic or other mechanical space other than the basement or other space from which cool air is drawn.

The objects of this disclosure are further met by an embodiment where an HVAC system serves an area that includes a basement, and an additional duct connects the supply duct to the return duct.

The objects of this disclosure are further met by an embodiment where an HVAC system includes a section of return duct that serves as a heat exchanger, and the exchanger core is built into the return duct.

The objects of this disclosure are further met by an embodiment where an HVAC system includes a section of return duct with a compartment to accommodate an off the shelf heat exchanger core or a custom heat exchanger core.

The objects of this disclosure are further met by an embodiment where an HVAC system includes a supply duct installed to transfer cool basement air to a conditioned space.

The objects of this disclosure are further met by an embodiment where an HVAC system includes a separate section of duct outside the main return duct.

The objects of this disclosure are further met by an embodiment where an HVAC system includes a supply duct installed to transfer cool air into a conditioned space, from either the basement or fro outside the house.

The objects of this disclosure are further met by an embodiment where an HVAC system includes outdoor flexible ducting connecting two window inserts for cooling a conditioned space.

The objects of this disclosure are further met by an embodiment where an HVAC system includes an air handler and a return duct from the conditioned space to an air-to-air heat exchanger.

The objects of this disclosure are further met by an embodiment of using a control box for a system, designed to move heat from one area of a building to another using the existing HVAC system.

The objects of this disclosure are further met by an embodiment of an air conditioning system having a computing or wiring based control system, with one or more thermostats, configured to sense a temperature at a location of the thermostat in a building, and to sense a temperature in a basement of the building, a main return duct, a heat exchanger formed within, or inline with, the main return duct, and a blower or fan.

Other objects will appear hereinafter.

BRIEF DESCRIPTION OF THE DRAWINGS

The present disclosure will be more clearly understood from the following description taken in conjunction with the accompanying drawings in which like reference numerals designate similar or corresponding elements, regions, and portions and in which:

FIG. 1B is a block diagram of a traditional central AC setup, without the disclosed system.

FIG. 2A is a block diagram of a GeoFlo HVAC System, for charging mode, embodying the principles of the disclosure.

DETAILED DESCRIPTION

The present disclosure proposes, with minor modifications to an HVAC system in a building, a system and method for times when Air Conditioning is called for by the thermostat, in which the GeoFlo System first exhausts the heat sink in the basement, before calling for an evaporator to be activated. Then when the basement has cooled, by geothermally dispersing heat into the earth, the GeoFlo HVAC System turns off the evaporator until the heat sink is at capacity again.

Figure 1A:
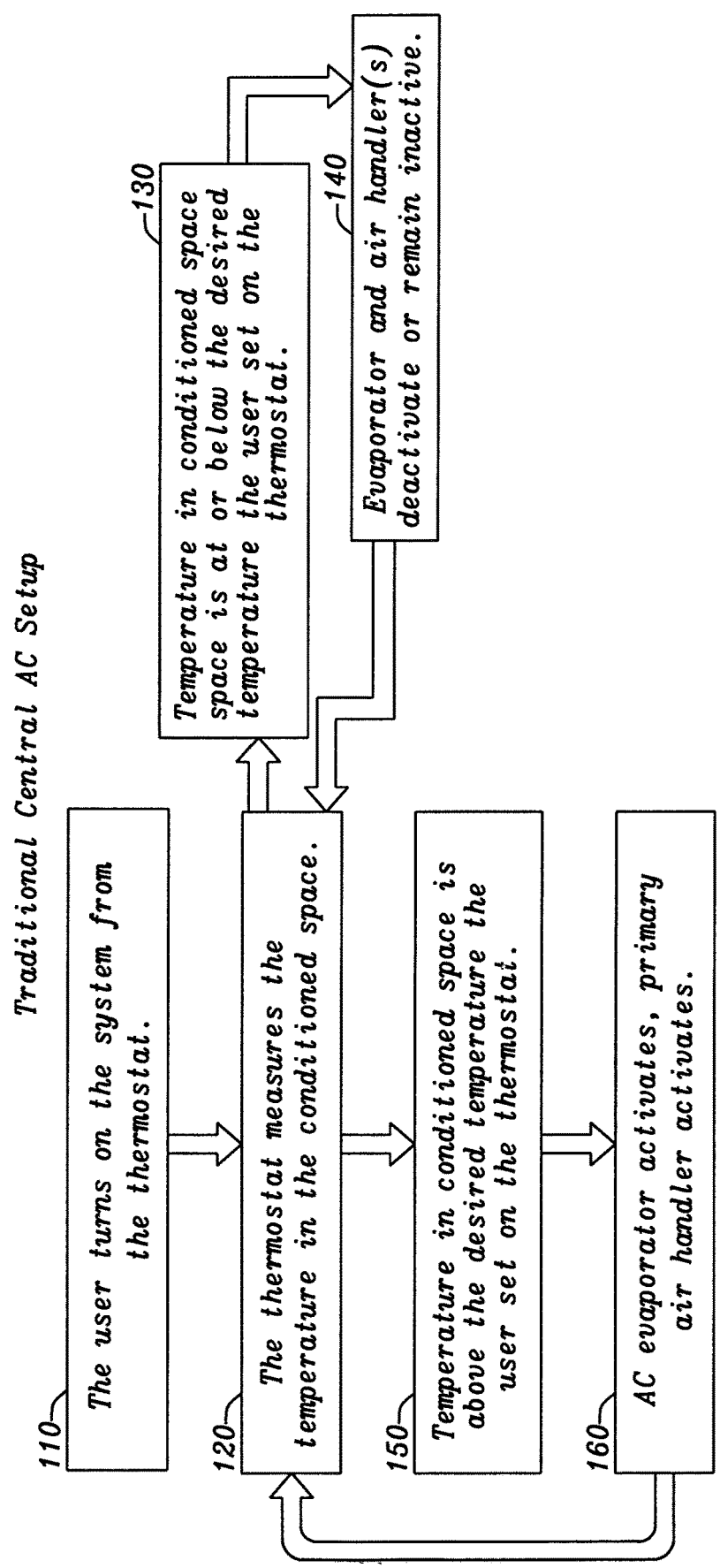
FIG. 1A is a flowchart of a traditional central AC setup, without the disclosed system.

FIG. 1A is a flowchart of a traditional central AC setup, without the disclosed system. In a traditional central AC setup, the user turns on the AC from their thermostat, 110. A thermostat measures the temperature in the conditioned space, 120. If the temperature in the conditioned space is at or below the desired temperature the user set on the thermostat 130, the evaporator and air handler(s) deactivate or remain inactive, 140. If the temperature in the conditioned space is above the desired temperature the user set on the thermostat 150, the AC evaporator and the primary air handler activate 160. Thermostat 165 is a traditional thermostat, located in the conditioned space, which includes a temperature sensor to sense the air temperature, controls for a user to set a desired temperature, and controls to turn the AC system on or off, depending on the relationship between the actual and desired temperatures.

FIG. 1B is a block diagram of a traditional central AC setup, without the disclosed system. In a typical HVAC setup with a duct system that originates in the basement, the air handler draws air from the conditioned space in the house through a return duct 190, then moves the air across a heating and/or cooling coil 180, then moves the air back into the conditioned space via a supply duct 170.

The present disclosure of the GeoFlo System proposes two modes, cooling mode and charging mode. In cooling mode, cool basement air is used to cool a conditioned space, until the basement air is too warm, based on a predetermined threshold. Then the system transitions to charging mode. In charging mode, the basement air is allowed to "recharge", that is, to cool back down, primarily due to heat dissipation through the basement walls and floor, until the basement air is cool enough to transition back to cooling mode.

For cooling mode, a first damper is closed, and second and third dampers are opened, allowing cool basement air to supply the conditioned space, drawing air from a basement return duct. For charging mode, the second and third dampers are closed, and the first damper is opened, allowing the system to operate like a traditional HVAC system, drawing air through a return duct from the conditioned space, over an AC coil (if one exists), and through a supply duct.

There are four primary components to the GeoFlo HVAC System: one or more thermostats, an additional basement return and supply duct added to a HVAC system along with an HVAC damper system, modifications to the ordinary return duct, including two additional registers, and a computing or wiring based control system.

Conventional thermostats, located in a main living area, sense the temperature at the location of the thermostat to determine when cooling is needed. The thermostat for a GeoFlo System does this as well but also senses the temperature in the basement of the house, remotely via either a second thermostat or other means of remotely measuring the temperature.

FIG. 2A is a block diagram of a GeoFlo HVAC System, for charging mode, embodying the principles of the disclosure. In addition to the ordinary return duct 190, found in a conventional HVAC system, the GeoFlo AC System adds an additional return duct 265/270, that draws air from the basement. This basement return duct will be separated from the rest of the HVAC system by an HVAC damper system 260/291, so that it is isolated from the HVAC system when it is not being called upon.

The ordinary return duct will also be modified. First, it will be separated from the rest of the HVAC system by two HVAC dampers 240 and 245, so that it is isolated from the HVAC system when the basement return duct is being called upon by the thermostat. Second, the ordinary return duct will be modified in a way so that the air that it draws from the finished/conditioned space is able to be exhausted 250 through a register 255, directly into the basement instead of being drawn into the air handler 180. In some cases, this may also require the installation of a supplemental air handler 385 (to be described later), for the limited purpose of drawing air from conditioned space to exhaust into the basement to maintain appropriate pressure levels throughout the house and HVAC system.

To accomplish this, there are three dampers added to the main return duct system. The first damper 240, opens or closes off the traditional return duct before the air handler 180. The second damper opens the feed to the basement supply register and the third damper will open the feed from the basement return register, 255. The dampers operate together to allow the return duct to either send air to the basement or the air handler, but not both at the same time. Temperature sensor 210, or alternatively a separate thermostat, is used in the basement to sense the temperature, and communicates with thermostat 165. A second thermostat can alternatively be used as the basement temperature sensor. Communication between the temperature sensor and thermostat can be wired or wireless. A computing or wiring based control system will control all components. Optional carbon monoxide and radon detection systems are represented in 280, and an optional external traditional dehumidification system in 290. Either or both may be desirable when using the disclosed system, in order to treat basement air that will now be circulated through the conditioned building space.

In the charging mode of FIG. 2A, the GeoFlo HVAC System operates like a traditional AC system. The first damper 240 is open, and the second damper 245 and third damper 260 are closed, so that air bypasses the basement completely and is drawn into the air handler, to supply the conditioned space through main supply duct 170.

Figure 2B:
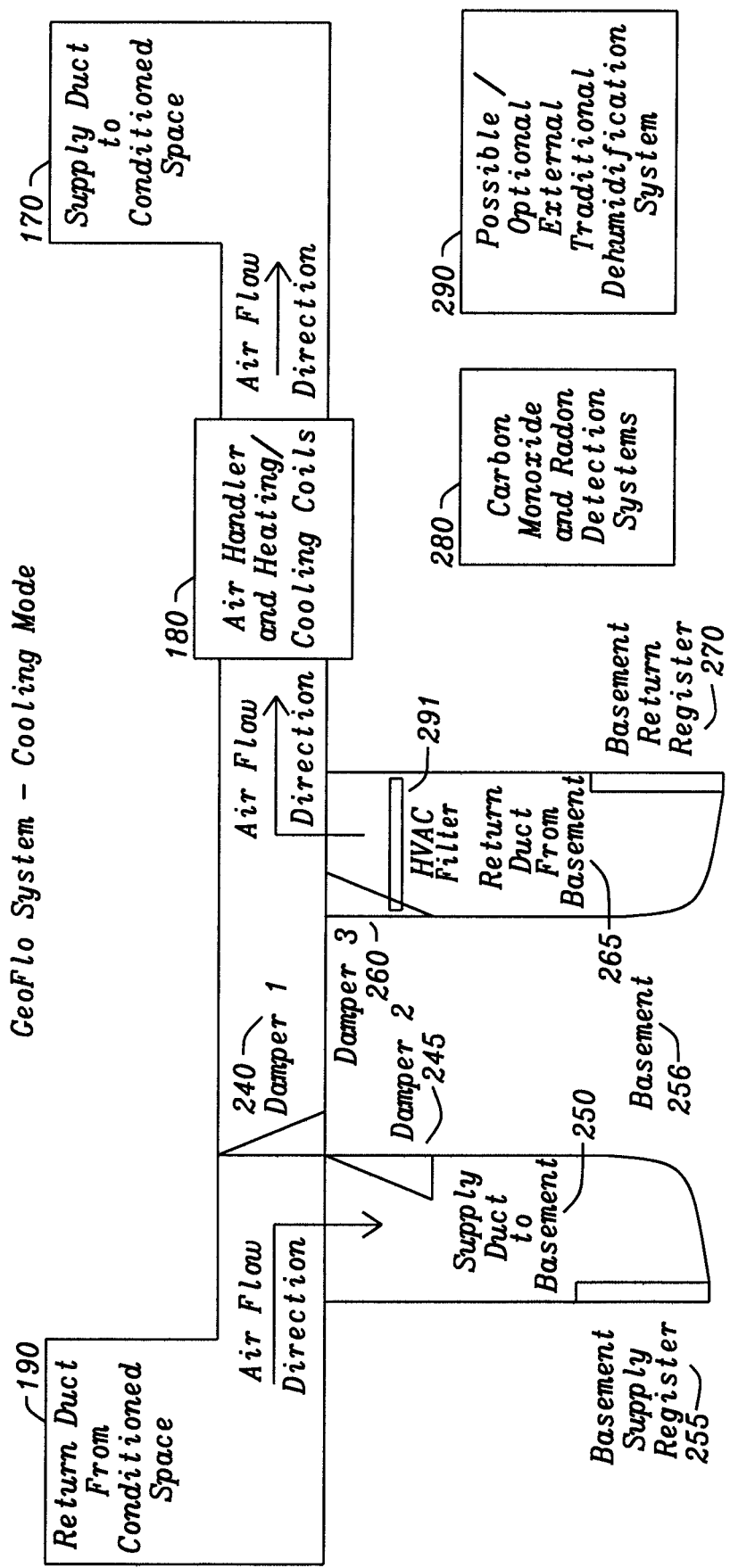
FIG. 2B is a block diagram of a GeoFlo HVAC System, for cooling mode, embodying the principles of the disclosure.

FIG. 2B is a block diagram of a GeoFlo HVAC System, for cooling mode, embodying the principles of the disclosure. Here, the GeoFlo HVAC System directs air from the ordinary return duct 190, into the basement 250/255, instead of drawing it into the air handler and evaporator coil 180. It then draws passively, geothermally cooled air from the basement 256, and delivers it through the air handler 180 and supply duct 170, to the finished/conditioned space in the house, without activating the AC condenser/evaporator system.

In the cooling mode of FIG. 2B, the second and third dampers 245 and 260 open the basement supply and return registers 255, respectively, and the first damper 240 closes off the portion of the return duct that would feed the air handler 180. It is during cooling mode when kilowatt consumption is dramatically reduced.

The control system will be set up to prioritize operating in cooling mode and do so whenever possible. It will determine when the system can operate in cooling mode by making sure the basement is sufficiently cooler than the finished/conditioned space. Whenever the basement is cool enough, the GeoFlo HVAC System will use basement air to condition the finished space and displace warmer air from the finished space into the basement. It will do so until the basement has absorbed enough heat from the finished space to bring the temperature up to a point where it can no longer effectively cool the finished space.

At that point, the GeoFlo HVAC System will switch back into charging mode and activate the traditional AC evaporator, or GeoFlo will simply shut off in cases where there is no traditional AC evaporator. During this time, the basement naturally, geothermally disperses heat into the earth and cools off enough to allow the system to enter cooling mode again.

Figure 3A:
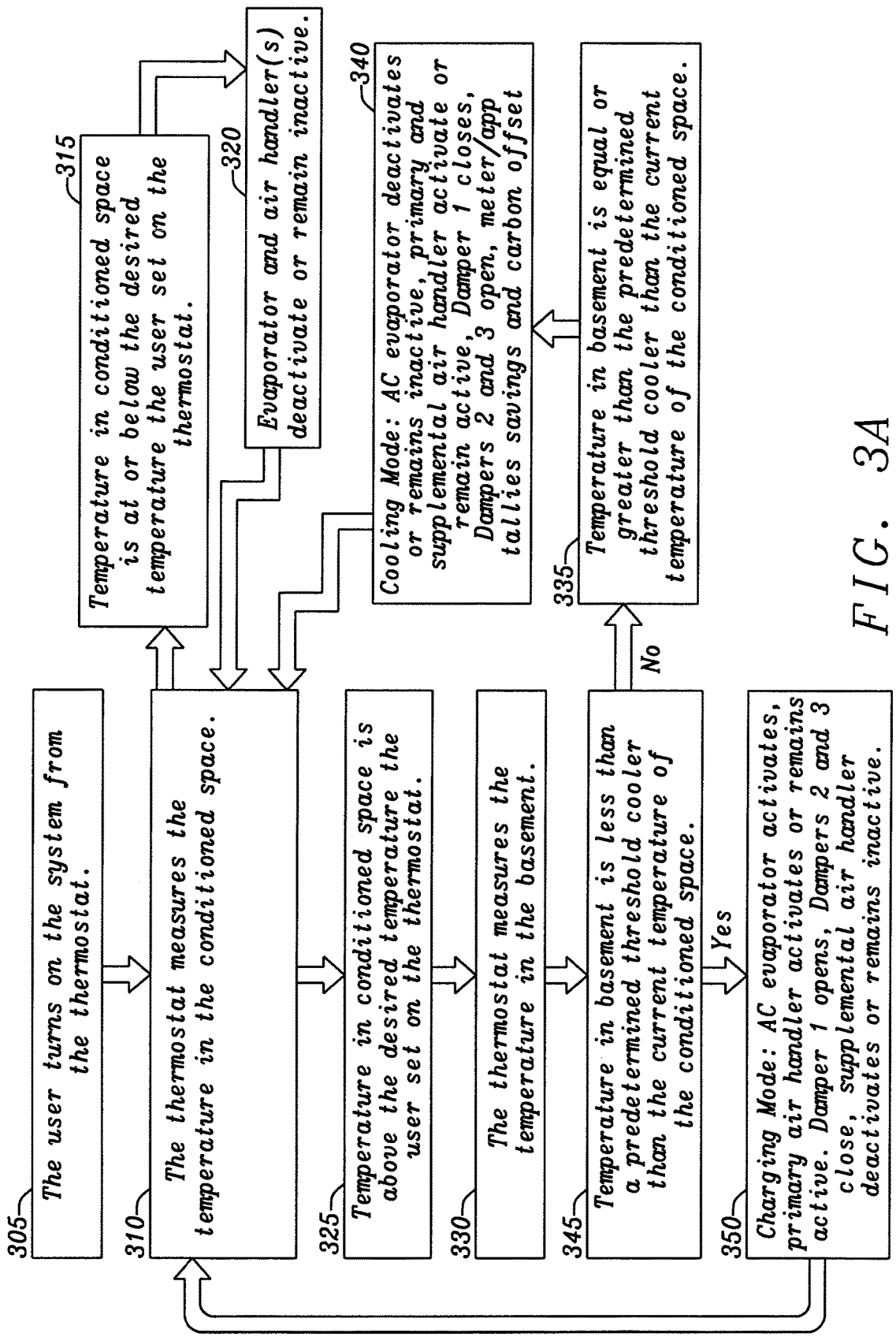
FIG. 3A is a flowchart of a GeoFlo HVAC System, in a building with an existing central AC, according to one embodiment of the disclosure.

FIG. 3A is a flowchart of a GeoFlo HVAC System, in a building with an existing central AC, according to one embodiment of the disclosure. In a GeoFlo HVAC System, with existing central AC, the user turns on the AC from their thermostat, 305. A thermostat measures the temperature in the conditioned space, 310. If the temperature in the conditioned space is at or below the desired temperature the user set on the thermostat 315, the evaporator and air handler(s) deactivate or remain inactive, 320. If the temperature in the conditioned space is above the desired temperature the user set on the thermostat 325, the thermostat measures the temperature in the basement 330. If the temperature in the basement is less than a predetermined threshold, for example, 5 degrees cooler than the current temperature of the conditioned space 345, charging mode is entered. Here, the AC evaporator activates, the primary air handler activates or remains active, Damper 1 opens, Dampers 2 and 3 close, and the supplemental air handler (in cases where one is needed) deactivates or remains inactive 350. If the temperature in the basement is equal to or greater than the predetermined threshold above the current temperature of the conditioned space 335, cooling mode is entered. Here, the AC evaporator deactivates or remains inactive, the primary and supplemental air handler activate or remain active, Damper 1 closes, Dampers 2 and 3 open. As described below, an optional meter/app may be used to tally savings and carbon offset 340.

The GeoFlo HVAC System of FIG. 3A will cycle between charging mode and cooling mode, alternating whenever the AC evaporator would have been called upon with a conventional central AC set up. It switches between modes by opening and closing a series of HVAC dampers, and activating or deactivating the evaporator and air handler, as needed. (As well as possibly activating a secondary air handler, in instances where one is needed.)

Figure 3B:
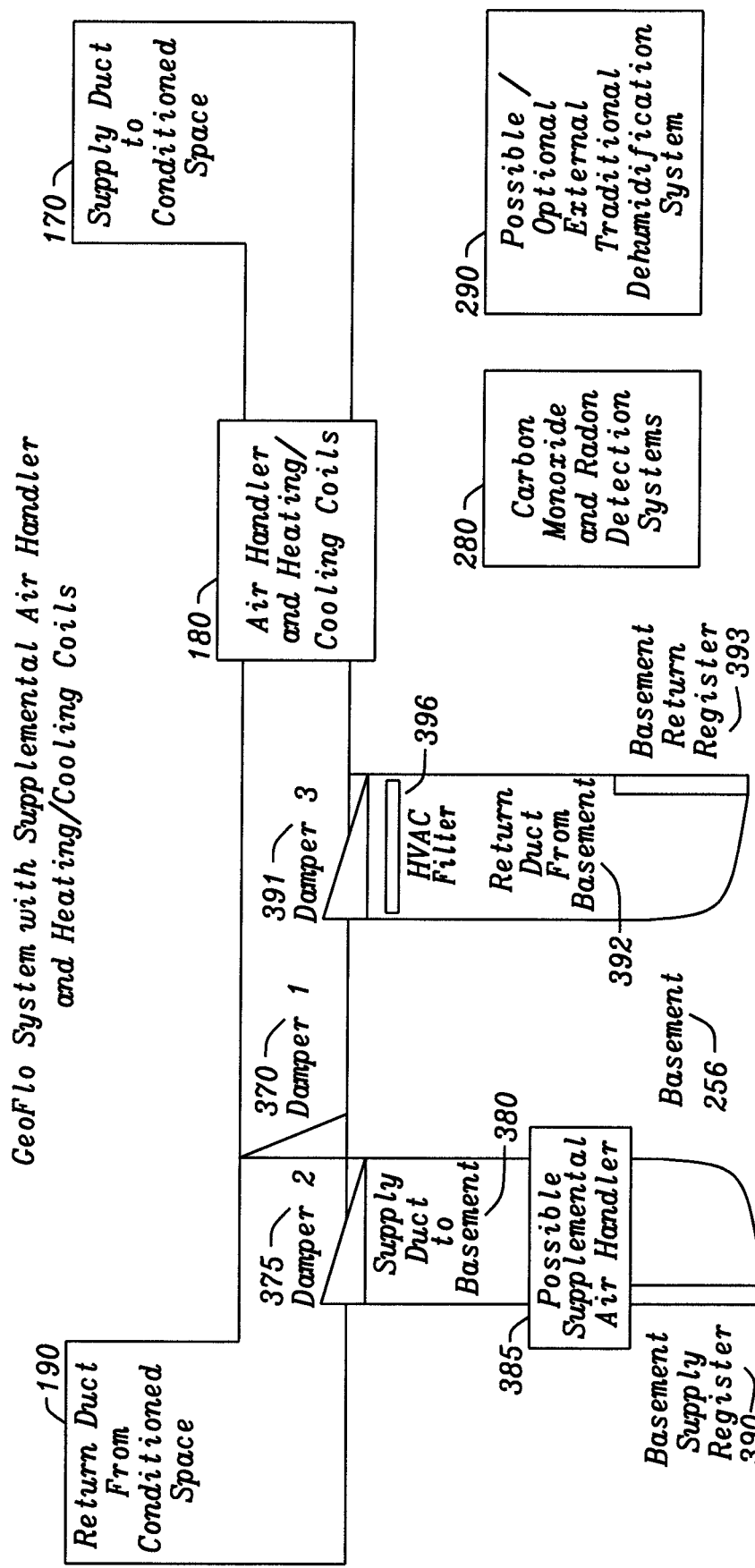
FIG. 3B is a block diagram of a GeoFlo HVAC System, with a supplemental air handler and heating/evaporating coils.

FIG. 3B is a block diagram of a GeoFlo HVAC System, with a supplemental air handler and heating/evaporating coils. The small supplemental air handler 385 added to the basement supply duct 380 boosts the HVAC system flow rate. This allows the system to compensate for possibly diluted drawing force because the air handler is drawing air from the conditioned space through the return duct indirectly. (It is doing so by drawing air out of the basement and opening a damper to allow the basement to draw air out of the conditioned space.) The supplemental handler only operates during cooling mode. In almost all cases this supplemental air handler will be completely unnecessary.

An alternative embodiment of the GeoFlo HVAC System is predictive temporary shutdown of the system during charging mode, when the basement is almost cool enough to allow the system to operate in cooling mode. If the conditioned space only needed a few minutes of cooling, for example, a 3-5 minute time period, and charging mode was almost complete, the system would pause cooling for a few minutes, to allow itself to operate in cooling mode instead of using the AC evaporator. This will allow a more efficient rhythm of charging mode and cooling mode to take place. This will only be available for systems where there is an AC evaporator. This mode can be manually shut off to allow more powerful (albeit less efficient) cooling.

Another embodiment of the GeoFlo HVAC system is an optional meter or app that calculates customer savings by simply multiplying the hours the system is in use in cooling mode, by the kilowatt rating of the AC evaporator, and then by the homeowner's kilowatt rate charged by their electric utility. The meter or app will not only show the user their savings but will also gather data for GeoFlo to optimize its performance and possibly diagnose faulty performance before the user is aware of it.

The GeoFlo HVAC system can also be used for buildings with forced air heat and no central AC. Though it might not be powerful enough to cool such buildings completely, it will provide some geothermal cooling even without an AC evaporator. For owners of buildings with this heating set up, this would be significantly less costly than an upgrade to a traditional central AC system.

Figure 4A:
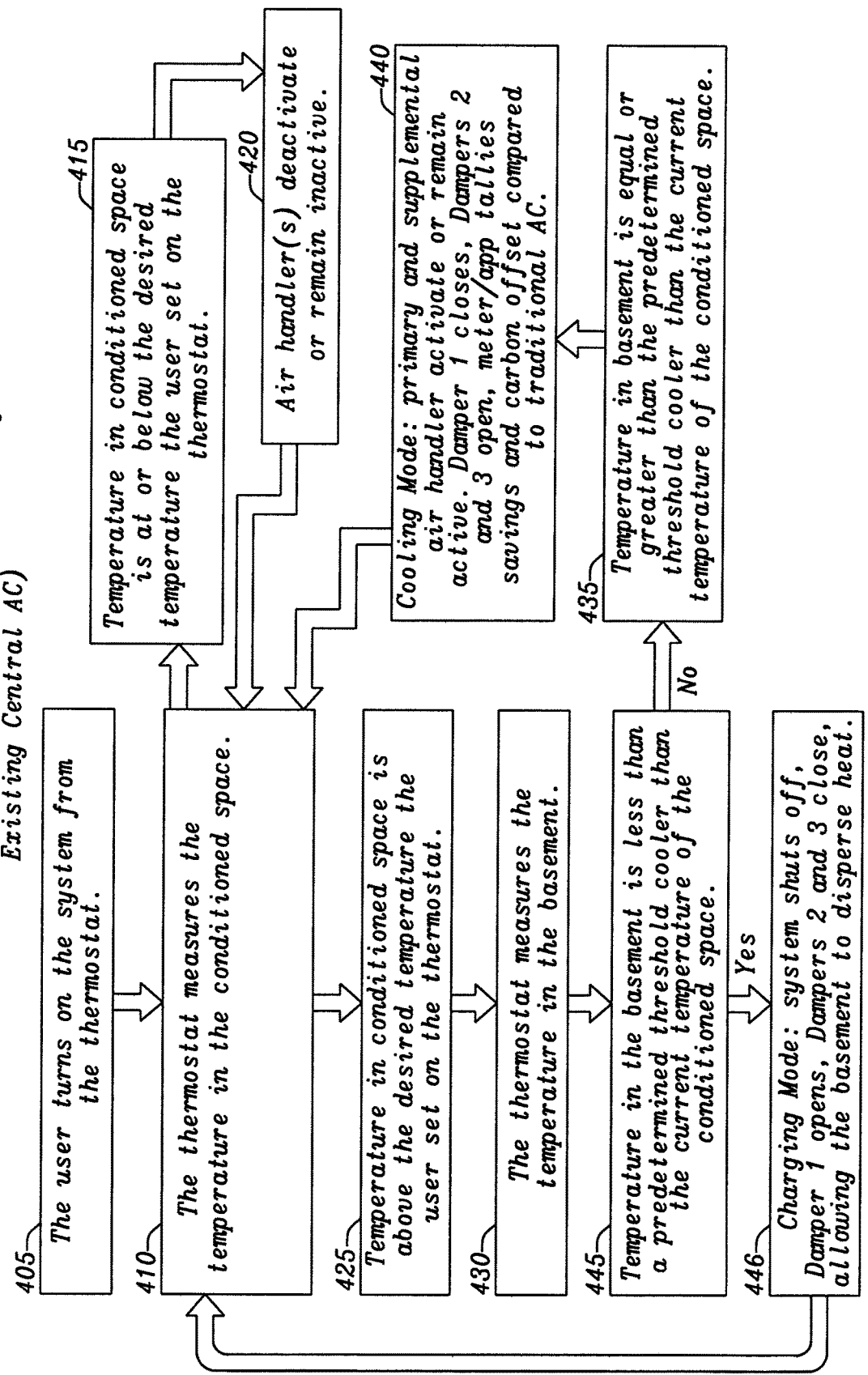
FIG. 4A is a flowchart of a GeoFlo HVAC System, in a building with forced air heating, and without existing central AC.

FIG. 4A is a flowchart of a GeoFlo HVAC System, in a building with forced air heating, and without existing central AC. In a GeoFlo HVAC System without existing central AC, the user turns on the system from their thermostat, 405. A thermostat measures the temperature in the conditioned space, 410. If the temperature in the conditioned space is at or below the desired temperature the user set on the thermostat 415, the air handler(s) deactivate or remain inactive, 420. If the temperature in the conditioned space is above the desired temperature the user set on the thermostat 425, the thermostat measures the temperature in the basement 430 via a remote sensor or separate thermostat. If the temperature in the basement is less than a predetermined threshold, for example, 5 degrees cooler than the current temperature of the conditioned space 445, the thermostat returns to measuring the temperature in the conditioned space, 410. If the temperature in the basement is equal to or greater than the predetermined threshold cooler than the current temperature of the conditioned space 435, cooling mode is entered. Here, air handler activates or remains active, Damper 1 closes, Dampers 2 and 3 open, and the optional meter/app may be used to tally savings and carbon offset compared to traditional AC 440. If the temperature in the basement is not less than the predetermined threshold, charging mode is entered. Here, the GeoFlo HVAC System shuts off, Damper 1 opens, Dampers 2 and 3 close, and the basement disperses heat into the earth.

Figure 4B:
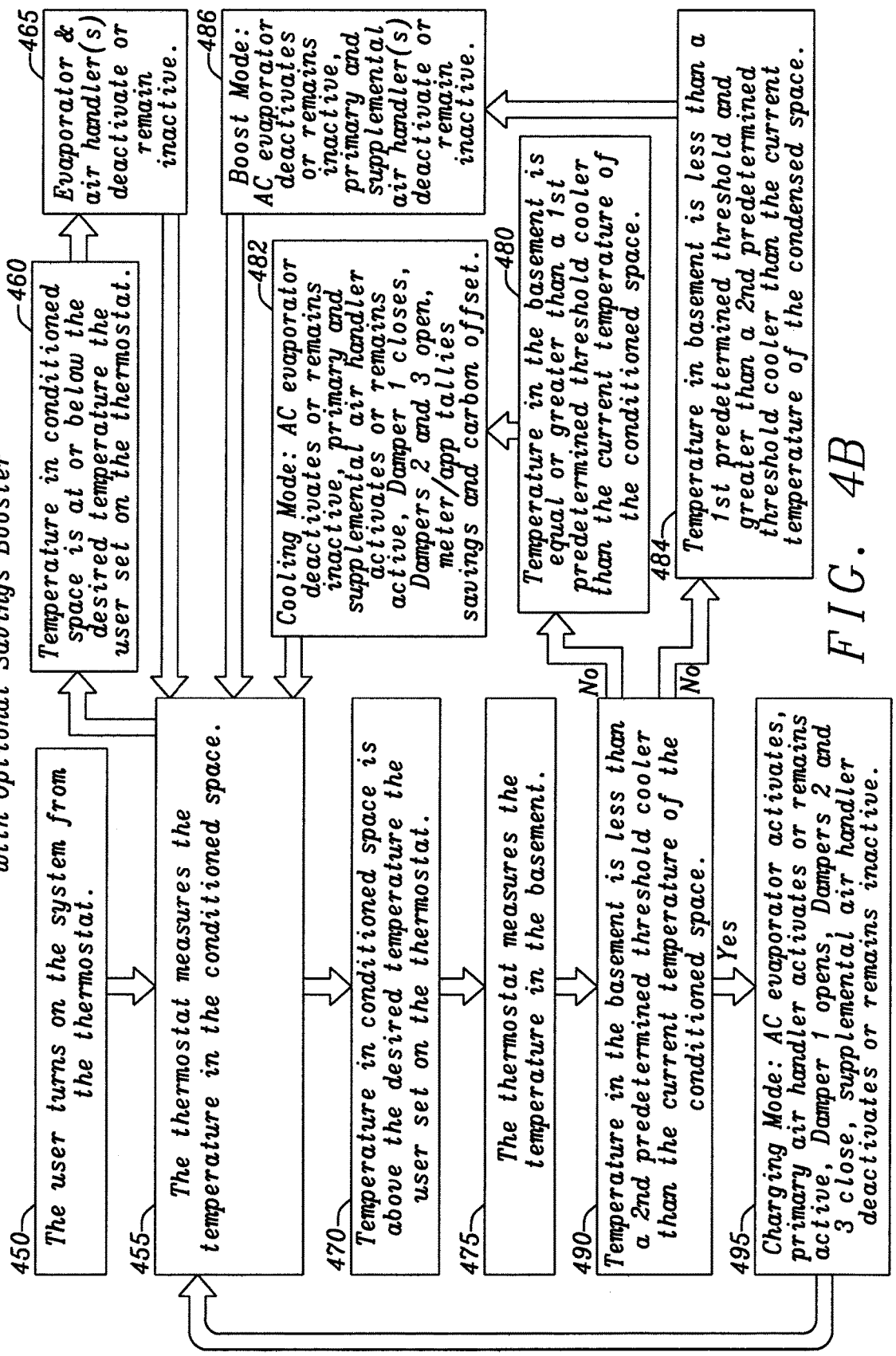
FIG. 4B is a flowchart of a GeoFlo HVAC System, in a building with an existing central AC, using an optional savings booster of the disclosure.

In another embodiment, FIG. 4B is a flowchart of a GeoFlo HVAC System, in a building with an existing central AC, using an optional savings booster of the disclosure. First, the user turns on the AC from their thermostat 450, and the thermostat measures the temperature in the conditioned space 455. If the temperature in the conditioned space is at or below the desired temperature the user set on the thermostat 460, the evaporator and air handler(s) deactivate or remain inactive 465. If the temperature in the conditioned space is above the desired temperature the user set on the thermostat 470, the thermostat measures the temperature in the basement 475 via a remote sensor or separate thermostat. If the temperature in the basement is equal to or greater than a $1^{st}$, predetermined threshold, for example, 5 degrees cooler than the current temperature of the conditioned space 480, cooling mode is entered. For the cooling mode of FIG. 4B, the AC evaporator deactivates or remains inactive, the primary and supplemental air handler (in instances where there is one) activates or remains active, Damper 1 closes, Dampers 2 and 3 open, and an optional meter/app may be used to tally savings and carbon offset 482. If the temperature in the basement is less than the $1^{st}$ predetermined threshold, for example, 5 degrees and greater than a $2^{nd}$ predetermined threshold, for example, 3 degrees cooler than the current temperature of the conditioned space 484, boost mode is entered. For boost mode, the AC evaporator deactivates or remains inactive, and primary and supplemental air handler(s) (in instances where there is one) deactivate or remain inactive 486. If the temperature in the basement is less than the $2^{nd}$ predetermined threshold, for example, 3 degrees cooler than the current temperature of the conditioned space 490, charging mode is entered. For the charging mode of FIG. 4B, the AC evaporator activates, the primary air handler activates or remains active, Damper 1 opens, Dampers 2 and 3 close, and the supplemental air handler (in cases where one is needed) deactivates or remains inactive 495. This mode can be manually shut off to allow more powerful (albeit less efficient) cooling.

Figure 5A:
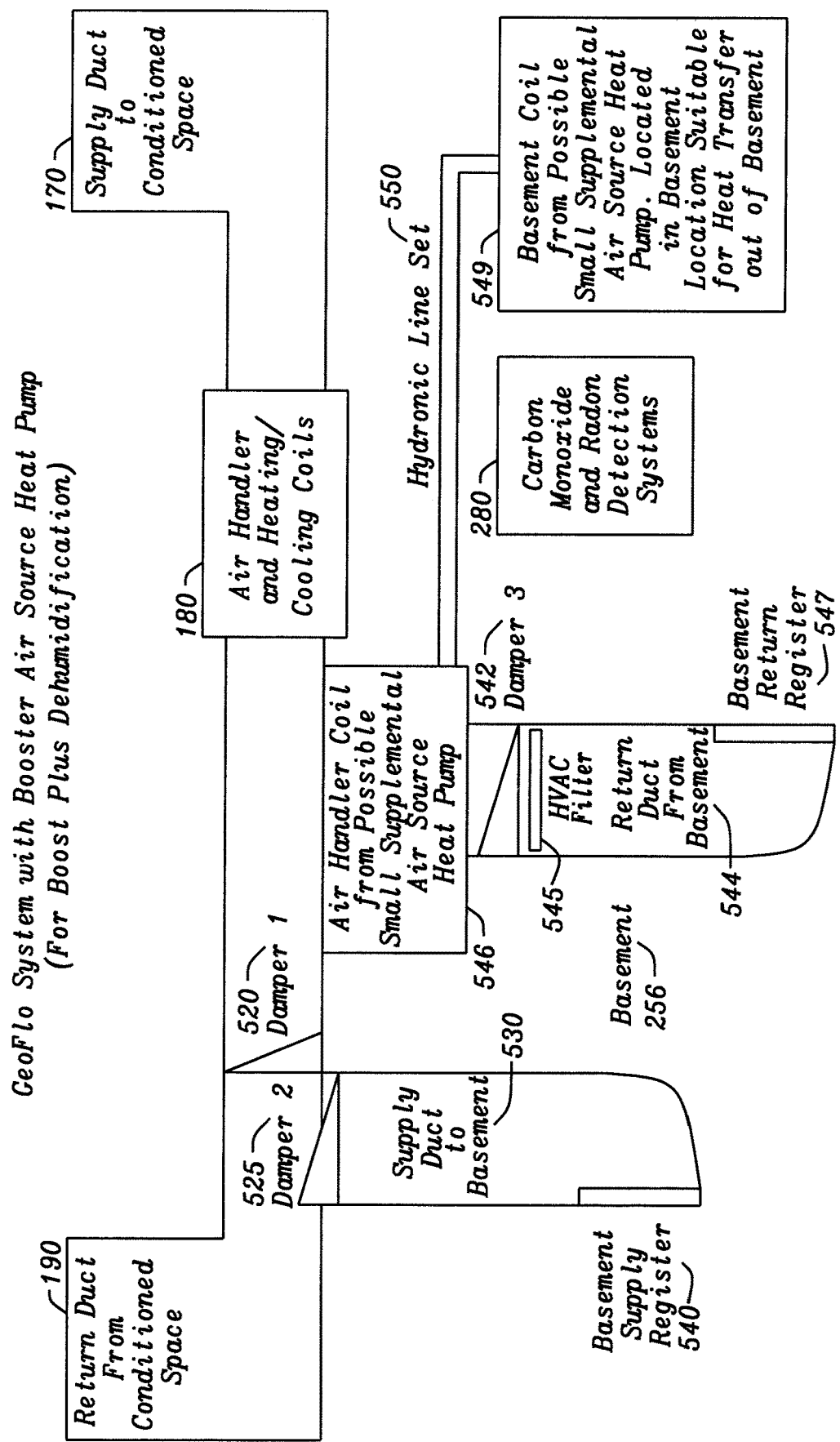
FIG. 5A is a block diagram of a GeoFlo HVAC System, with a booster air source heat pump, for a boost to the system's cooling power, plus dehumidification.
Figure 5B:
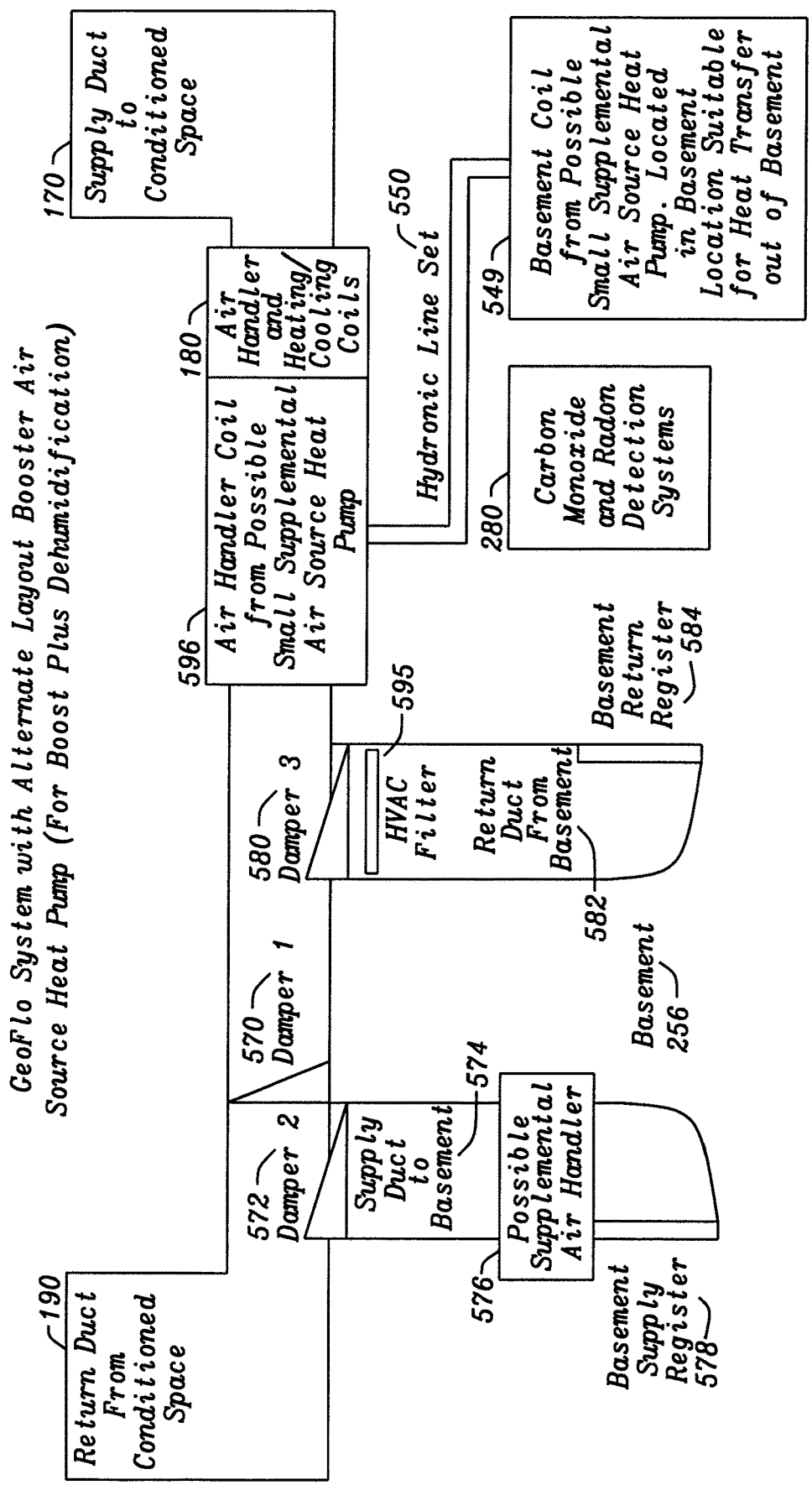
FIG. 5B is a block diagram of a GeoFlo HVAC System, with an alternate layout booster air source heat pump, for a boost to the system's cooling power, plus dehumidification.
Figure 6A:
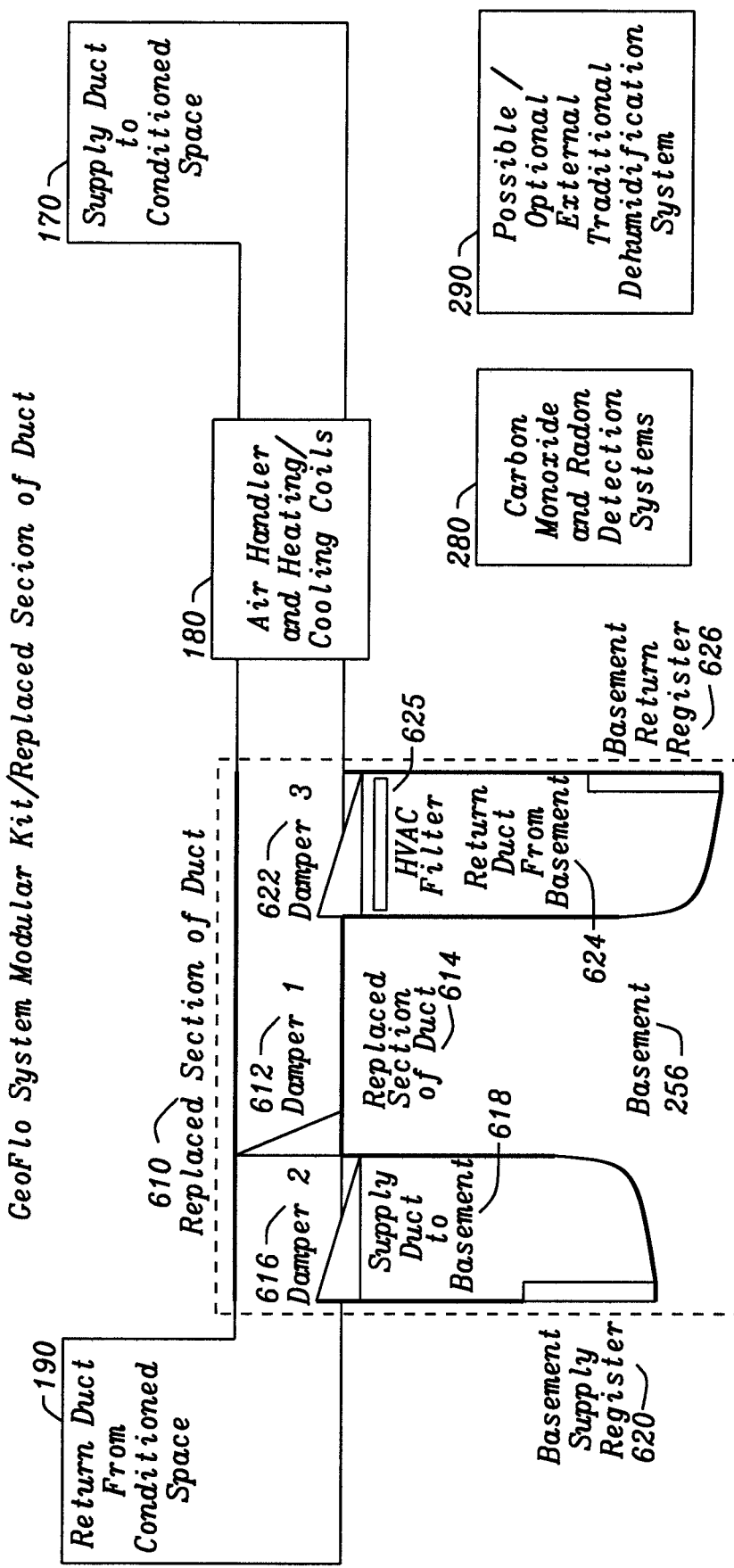
FIG. 6A is a block diagram of a GeoFlo HVAC System modular kit, showing a replaced section of duct.

In another embodiment, FIG. 5A is a block diagram of a GeoFlo HVAC System, with an optional booster air source heat pump. The air source heat pump includes an air handler coil (commonly referred to as an inside coil in the traditional use case for an air source heat pump) 546, located in line with the basement return duct 544, and a basement coil (commonly referred to as an outside coil in the traditional use case for an air source heat pump) 549 connected by hydronic line set 550 to the evaporator, wherein the condenser is located in a basement location suitable for heat transfer out of the basement. The basement coil located in the basement would preferably be on the basement floor or against a basement wall but in other cases superior aft flow around the exchanger might take place out in the open. The supplemental air source heat pump would provide boosted cooling, as well as dehumidification. FIG. 5B is a block diagram of a GeoFlo HVAC System, with an alternate layout of the optional booster air source heat pump 549 and 596, for a boost plus dehumidification. The variations of FIGS. 5A and 5B include an air source heat pump for dehumidification plus a boost in cooling power. This would also allow the system to contribute highly efficient heating and reduce the heating fuel consumption of the house, as well. This variation could also provide highly efficient passive geothermal heat to a building, not likely to be enough heat to completely replace the heating system, but enough to reduce the fuel consumption of the heating system. Air source heat pumps can allow each of the two coils to perform as either an evaporator coil or condenser con, so they can be used for both cooling/dehumidification and heating, FIG. 6A is a block diagram of a GeoFlo HVAC System modular kit 610, showing a replaced section of duct. Rather than installing the 3 dampers (612, 616, and 622), 2 additional curved sections (618 and 624), and 2 registers (620 and 626), separately in the basement, this variation allows the components to be assembled remotely as a kit along with a short section of ducting. The drop-in duct could be connected to the existing duct work, where a short section of the return duct would be cut out and replaced by the modular kit.

Figure 6B:
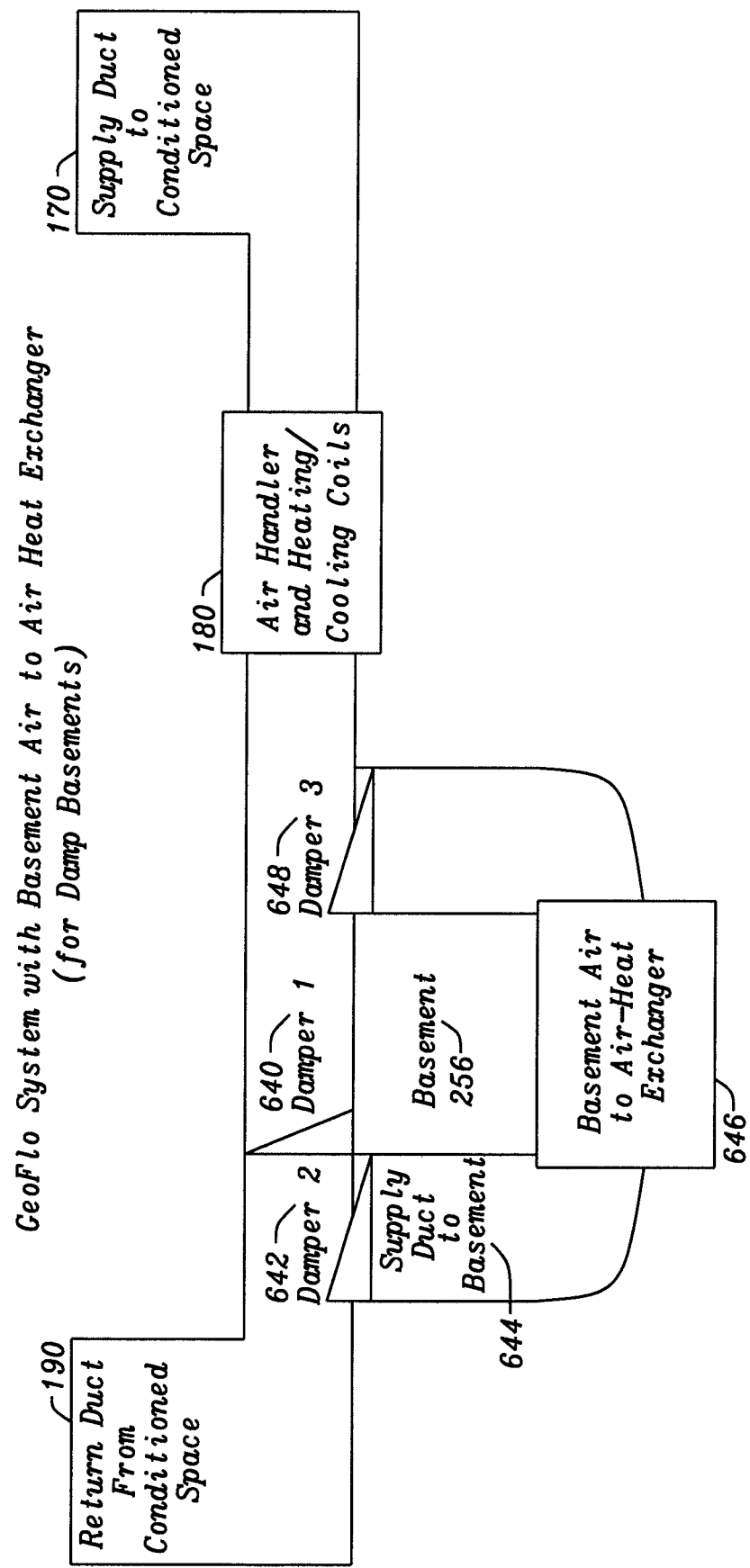
FIG. 6B is a block diagram of a GeoFlo HVAC System, with a basement air to air heat exchanger, for damp basements.

FIG. 6B is a block diagram of a GeoFlo HVAC System, with a basement air to air heat exchanger, for damp basements. This variation includes an air-to-air heat exchanger 646 placed in the basement rather than an open-air exchange of basement air. This would be used in cases where the basement is so damp that ordinary dehumidification measures will not be adequate. The air-to-air heat exchangers can be placed on floors, along walls, or out in the open. Note that no additional HVAC filter is required for this version.

Figure 6C:
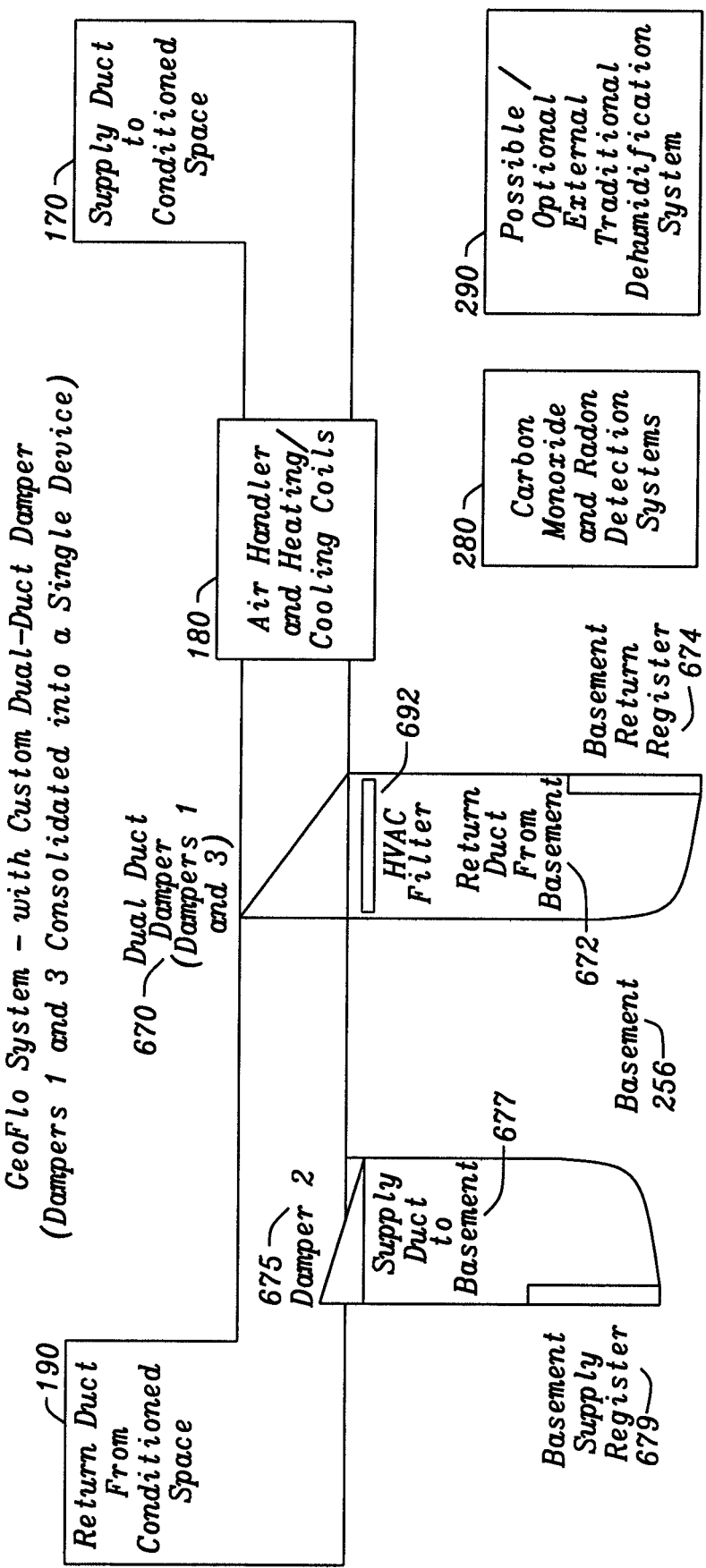
FIG. 6C is a block diagram of a GeoFlo HVAC System, with a custom dual-duct damper.

FIG. 6C is a block diagram of a GeoFlo HVAC System, with a custom dual-duct damper, and dampers 1 and 3 are consolidated into a single device. This variation includes a damper device 670 that could swing into two alternate positions and allow air to flow in either of two directions (rather than simply operating in either opened or closed mode as existing dampers do.) The Dual Duct Damper is installed at a T intersection in the ducts, and it has a door that swings into two alternate positions to either close one duct 672 and open the other 677 or vice versa. Note that this variation could allow the combination of either dampers 1 and 3 or dampers 1 and 2 into a single device. The first and third dampers may be formed as a dual damper, whereby opened/closed positions of the first and third dampers are mutually exclusive, or both are open. The first and second dampers may also be formed as a dual damper, whereby opened/closed positions of the first and third dampers are mutually exclusive, or both are open.

Figure 6D:
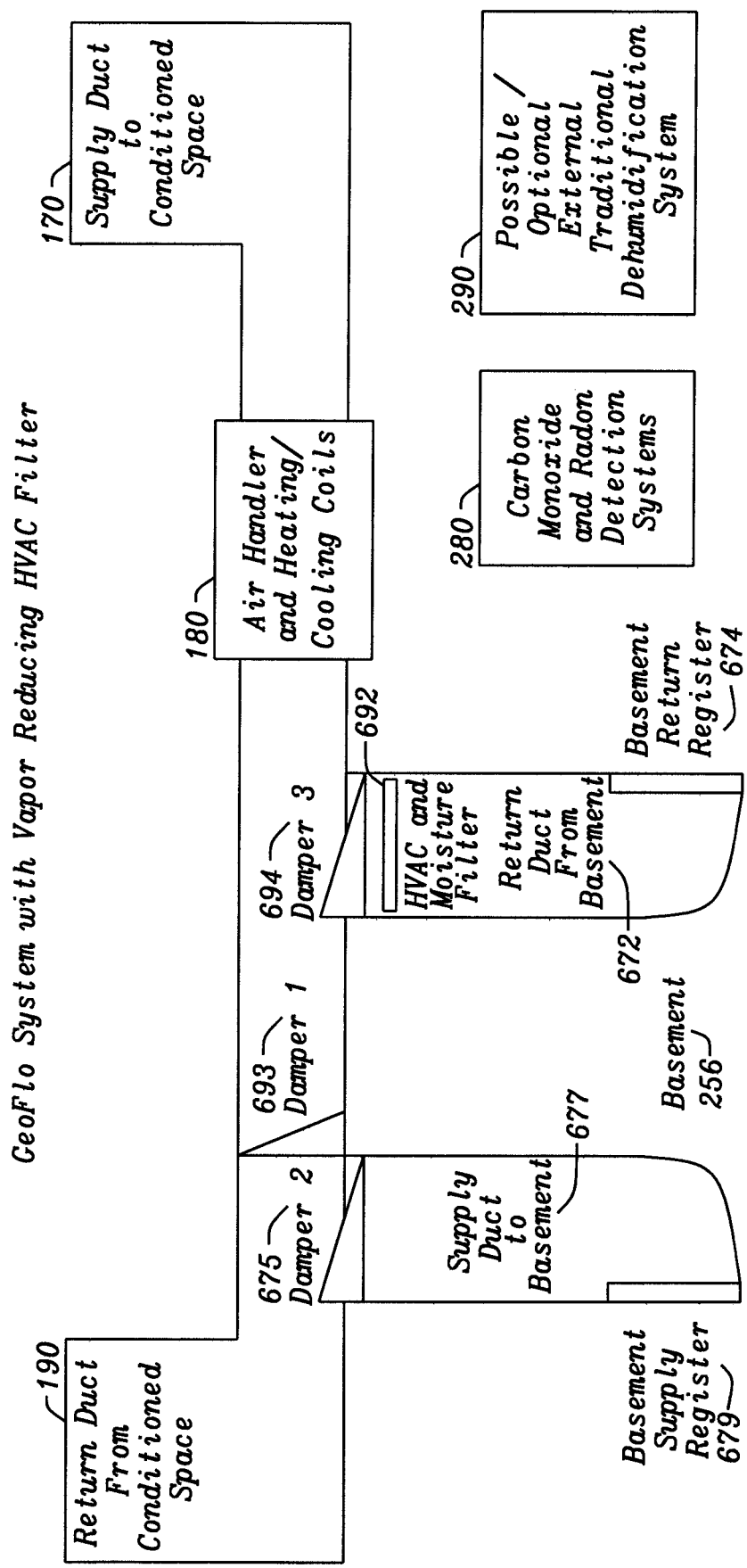
FIG. 6D is a block diagram of a GeoFlo HVAC System, with a vapor reducing HVAC filter.

FIG. 6D is a block diagram of a GeoFlo HVAC System, with a vapor reducing HVAC filter. This variation uses a filter 692 that reduces moisture rather than a traditional HVAC filter.

Figure 6E:
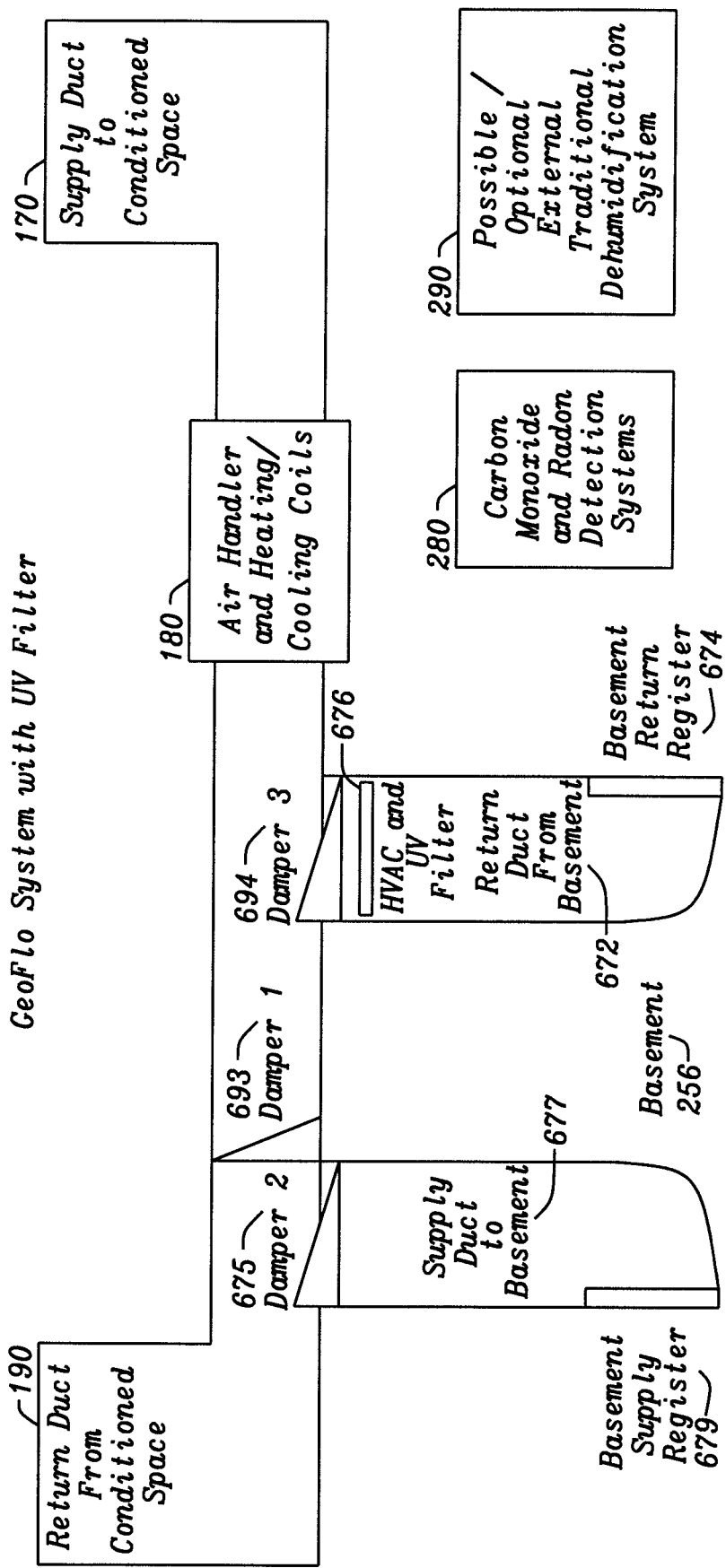
FIG. 6E is a block diagram of a GeoFlo HVAC System, with a UV filter.

FIG. 6E is a block diagram of a GeoFlo HVAC System, with a UV filter. This variation uses a UV filter 676 rather than a traditional HVAC filter.

Figure 7:
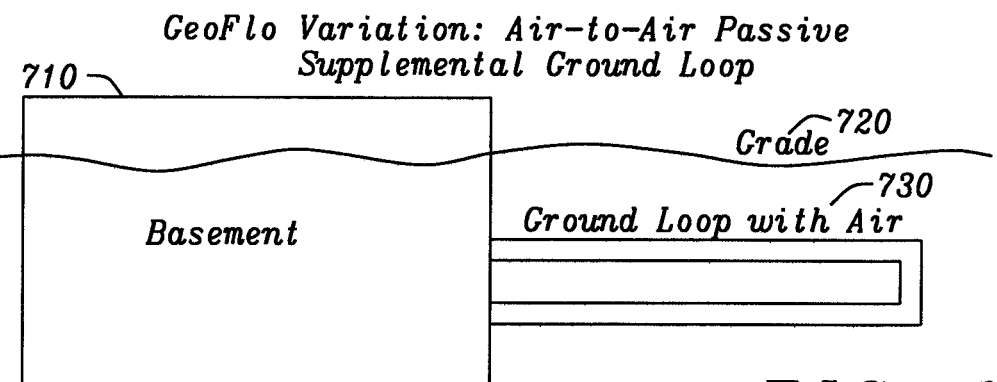
FIG. 7 is a block diagram of the GeoFlo HVAC System, with an air-to-air passive supplemental ground loop.

FIG. 7 is a block diagram of the GeoFlo HVAC Systems, with an air-to-air passive supplemental ground loop. This variation simply has a buried, open pipe loop 730, with openings into the basement, 710. The ground loop would aid the system by passively dissipating more heat into the earth 720, than the basement would do on its own. This variation would increase the cooling power of the GeoFlo System, as a whole.

Figure 8:
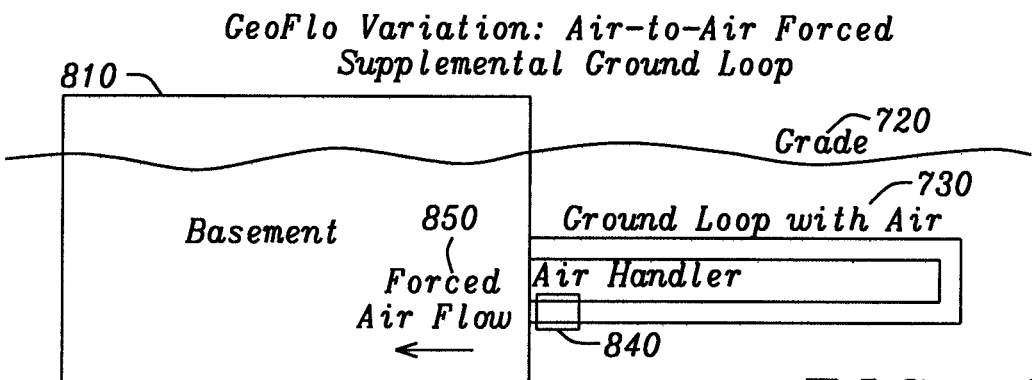
FIG. 8 is a block diagram of the GeoFlo HVAC System, with an air-to-air forced supplemental ground loop.

FIG. 8 is a block diagram of the GeoFlo HVAC Systems, with an air-to-air forced supplemental ground loop. This variation has a buried, open pipe loop 730, with openings into the basement 810, with forced air flow 850, plus a small air handler/fan 840. The ground loop would aid the system by actively dissipating more heat into the earth 720, than the basement would do on its own. This variation would increase the cooling power of the GeoFlo System, as a whole.

Figure 9:
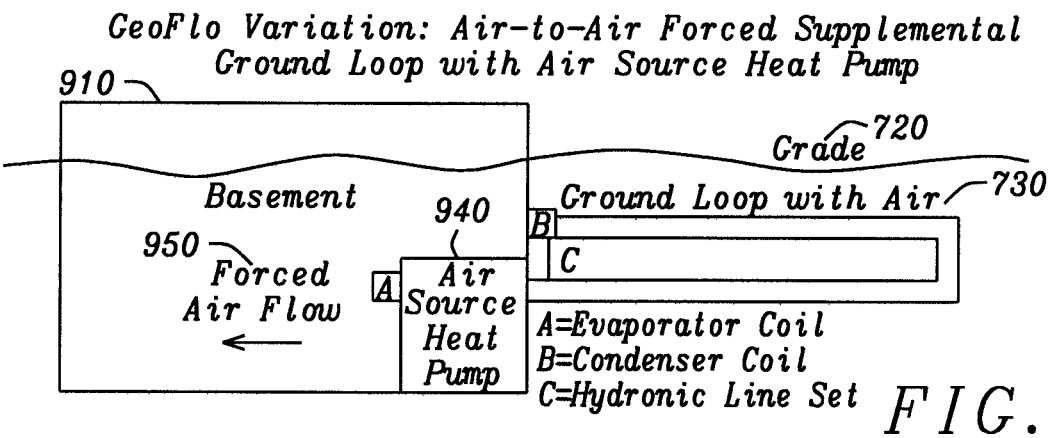
FIG. 9 is a block diagram of the GeoFlo HVAC System, with an air-to-air forced supplemental ground loop, and an air source heat pump.

FIG. 9 is a block diagram of the GeoFlo HVAC Systems, with an air-to-air forced supplemental ground loop and an air source heat pump. This variation has a buried, open pipe loop 730, with openings into the basement 910, with forced air flow 950, plus a small air source heat pump 940. The ground loop would aid the system by actively dissipating more heat into the earth 720, than the basement would do on its own. Basement air would be drawn past the condenser coil B, where it would absorb heat. That air would then dissipate that heat into the earth via the ground loop. The cooler air returning through the ground loop would be further cooled by the evaporator coil A, as it reenters the basement and increase the cooling power of the GeoFlo System, as a whole. The Hydronic Line Set C is standard for air source heat pumps, and circulates the refrigerant between the coils.

Figure 10:
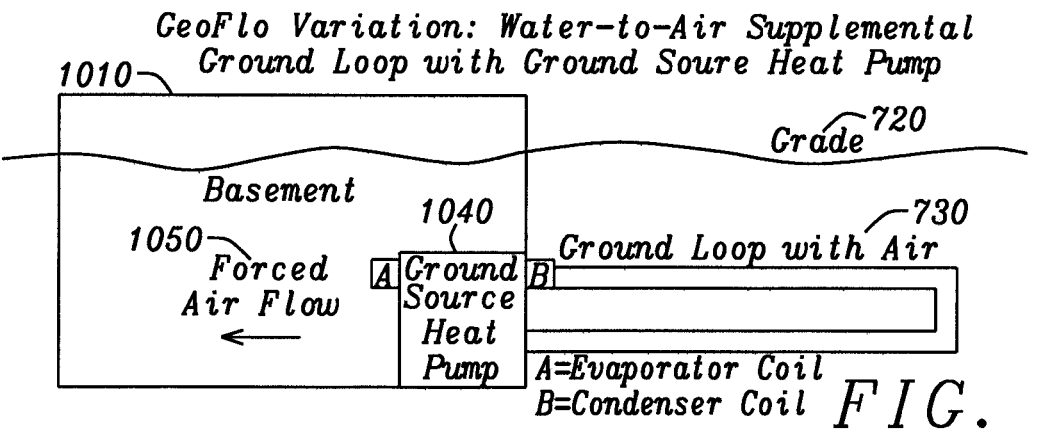
FIG. 10 is a block diagram of the GeoFlo HVAC System, with a water-to-air supplemental ground loop, and a ground source heat pump.

FIG. 10 is a block diagram of the GeoFlo HVAC Systems, with a water-to-air supplemental ground loop and a ground source heat pump. This variation has a buried, geothermal ground loop 730, with propylene glycol (or another suitable) coolant supporting a geothermal heat pump 1040, with forced air flow 1050. The ground loop would aid the system by actively dissipating more heat into the earth 720, than the basement 1010 would do on its own. As with any geothermal heat pump used for cooling, air would be drawn past the evaporator coil A, which would absorb heat. The coolant would then dissipate that heat into the earth via the ground loop. The geothermal heat pump would directly cool the basement air and increase the cooling power of the GeoFlo System, as a whole.

The GeoFlo System may include an embodiment of a thermostat for damper-based zones, in a building with one air handler supporting more than one zone. The zones would be separated by HVAC dampers and controlled by separate thermostats. This variation includes thermostats that can perform GeoFlo System thermostat functions in the context of damper-based zones.

The GeoFlo System may also include ultraviolet (UV) antimicrobial filtration, placed in the basement return duct.

In another embodiment, the GeoFlo System may also be used to heat conditioned space by drawing warm air from solar or geothermally passively heated space and requires placing the GeoFlo System onto ducts designed for the specific purpose of drawing air from that passively heated space.

Figure 11A:
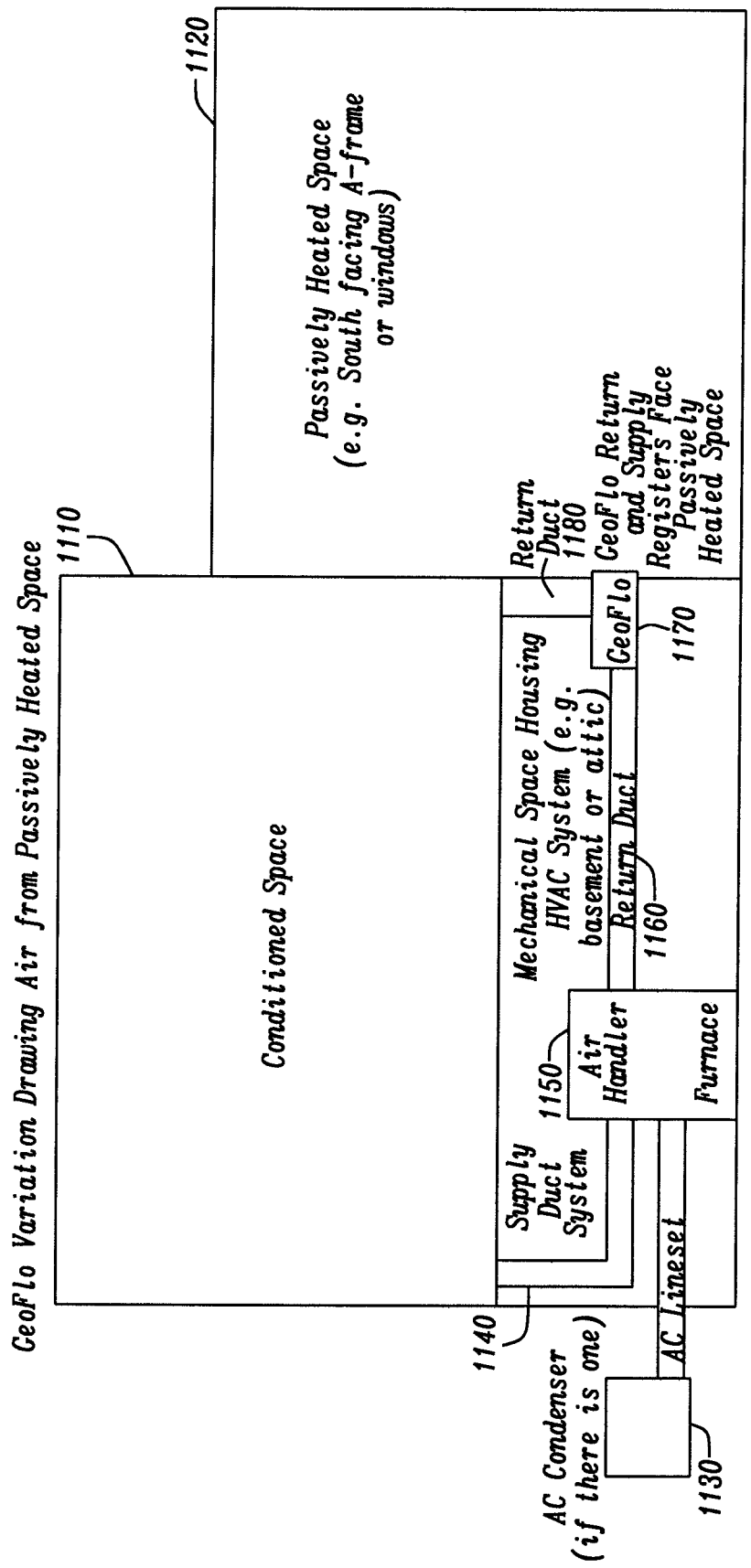
FIG. 11A is block diagram of a GeoFlo System for an embodiment of the disclosure drawing aft from a passively heated space.
Figure 11B:
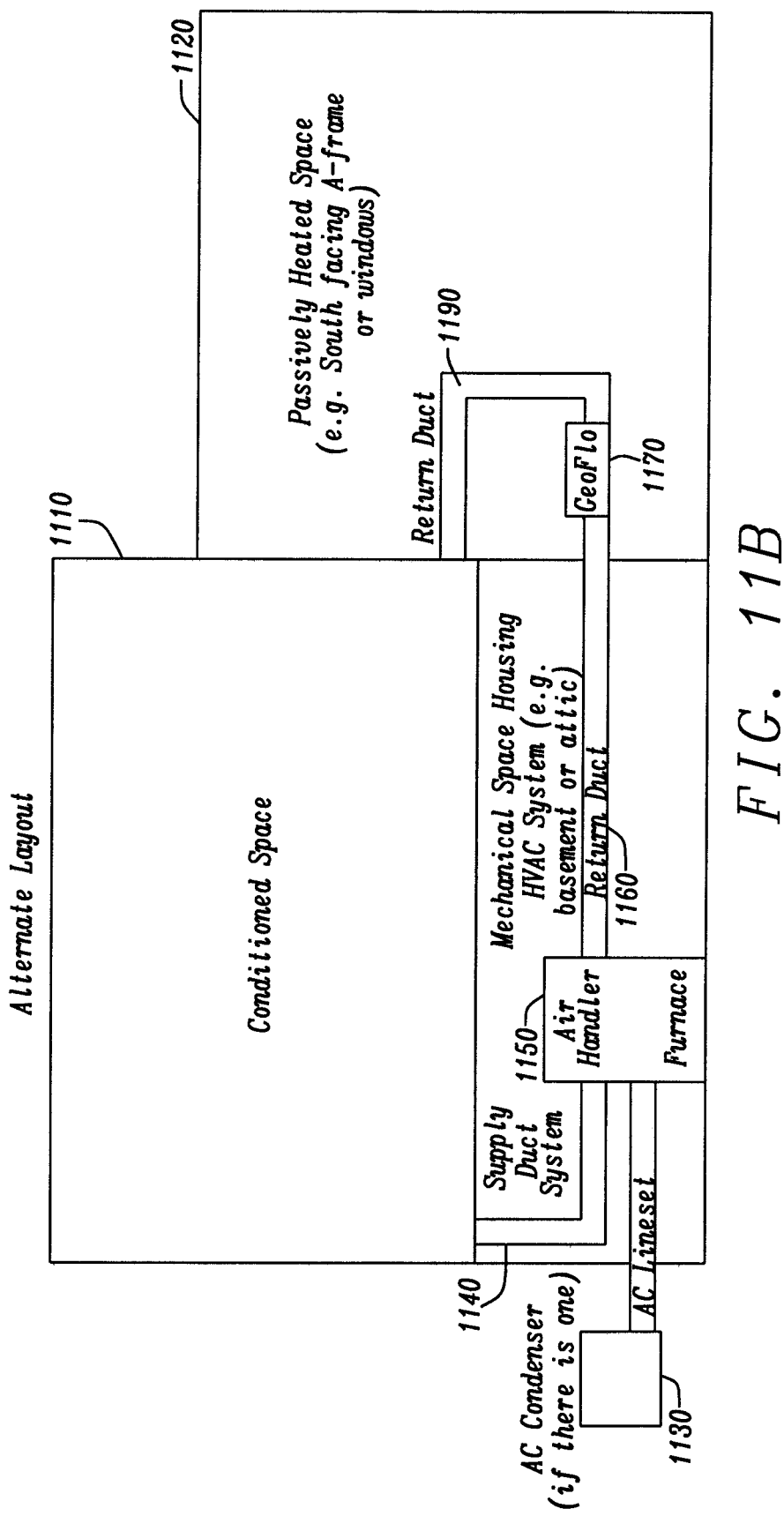
FIG. 11B is an alternate layout of a GeoFlo System for an embodiment of the disclosure drawing air from a passively heated space.

FIG. 11A is block diagram of a GeoFlo System for an embodiment of the disclosure drawing air from a passively heated space, and FIG. 11B is an alternate layout of a GeoFlo System for an embodiment of the disclosure drawing air from a passively heated space. These embodiments would require additional coding of the control system, beyond that described above, because they would require the thermostat to measure the temperature in the both the conditioned space 1110, and a passively heated space 1120 via a remote sensor or separate thermostat. The GeoFlo System would operate in a charging mode and heating mode (no cooling mode). During charging mode, the passively heated space geothermally absorbs heat or absorbs heat via passive solar, enough to allow the system to enter heating mode again. The system coding would be structured so that the predetermined temperature difference required to toggle between heating and charging modes be measured to insure the passively heated space is warmer than the conditioned space. Note that in this disclosure, 'coding', 'system coding' and 'thermostat changes' are synonymous and refer to changes made to a traditional thermostat to allow it to operate the GeoFlo System.

FIGS. 11A and 11B comprise AC condenser 1130 (if there is one), supply duct system 1140, aft handler/furnace 1150 main return duct 1160, GeoFlo System 1170, and passively heated space return duct 1180. In FIG. 11A, the GeoFlo System and main and passively heated space return ducts are within the mechanical space housing the HVAC system (for example, a basement or attic). In FIG. 11B, the GeoFlo System and heated space return duct 1190 are within the passively heated space.

Figure 12A:
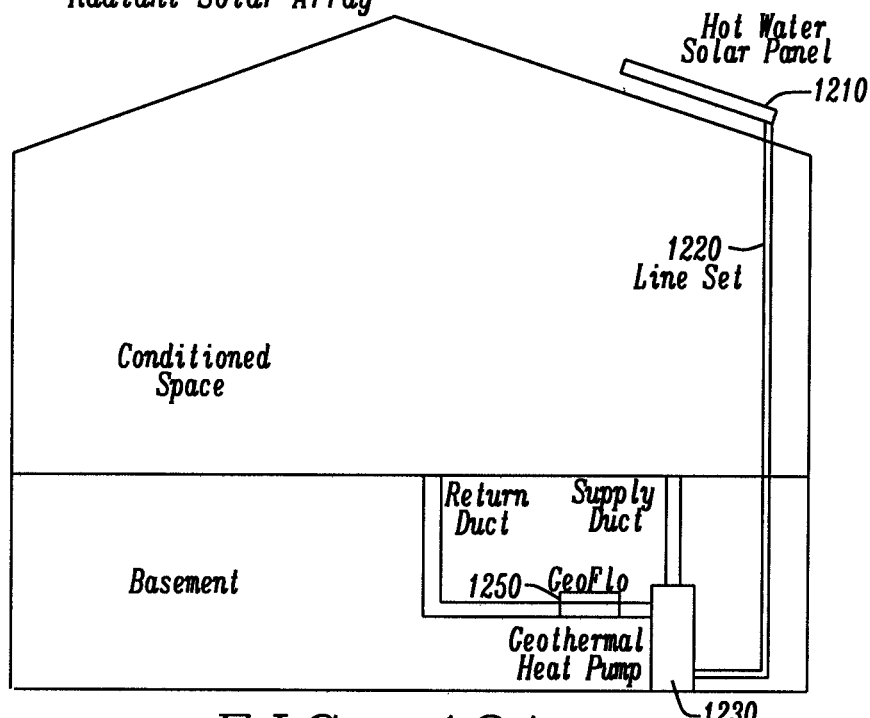
FIG. 12A shows a ground-source heat pump GeoFlo System fed by a radiant/thermal hot water solar panel.
Figure 12B:
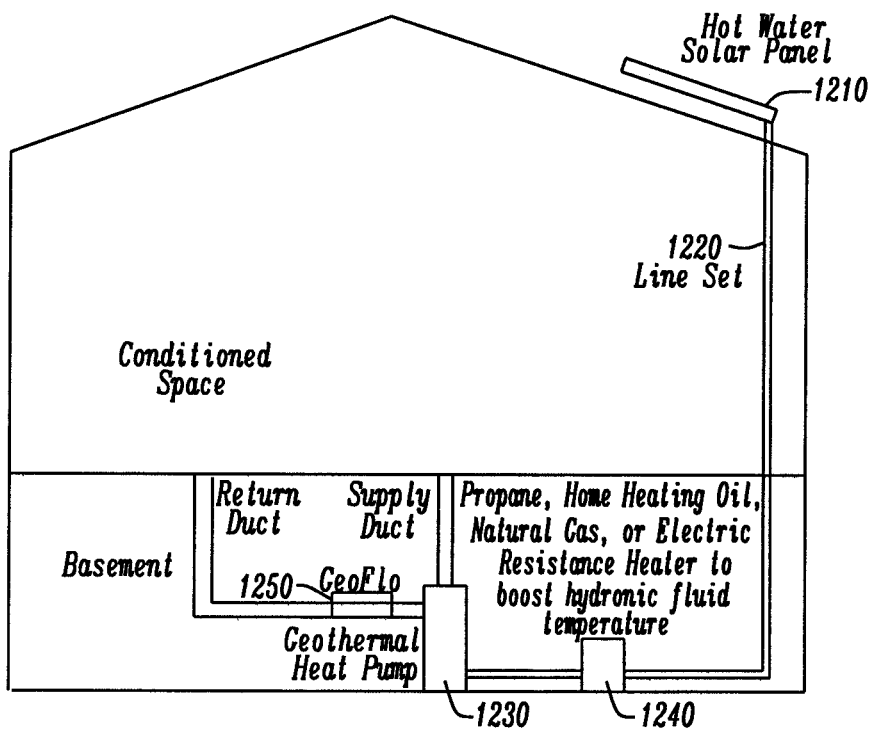
FIG. 12B shows a ground-source heat pump GeoFlo System fed by a radiant/thermal hot water solar panel, where the hydronic fluid supplied by the solar panel has a temperature boost from a supplemental heat source.

Another embodiment of the disclosure is shown in FIGS. 12A and 12B in which a GeoFlo System is used in conjunction with a modified geothermal heat pump. In a traditional geothermal heat pump, as is known in the art, there is a ground loop which typically involves running fluid-filled piping into one or more deep, drilled holes, or otherwise running underground, fluid-filled piping in the ground near the building, so that heat is exchanged to (in the summer) or from (in the winter) the earth. A geothermal heat pump is also called a ground-source heat pump. For the FIGS. 12A and 12B embodiments, an expensive ground loop is not needed, and is replaced by a passive, hot water solar panel or array of solar panels.

The embodiments of FIGS. 12A and 12B show hot water solar panel or array of solar panels 1210, line set 1220, and geothermal heat pump 1230, that houses the air handler or otherwise feeds refrigerant to the air handler. Rather than being fed coolant from a ground loop, the ground-source heat pump in FIGS. 12A and 12B is fed by a radiant/thermal hot water solar panel or array of solar panels. In the sub variation of FIG. 12B, the hydropic fluid supplied by the solar panel has a temperature boost from a supplemental heat source 1240, such as a natural gas, propane, home heating fuel, or electric heating unit. The GeoFlo System of the disclosure is represented by 1250 and would have the same structure and be operated in the same way as earlier described, for cooling. That is, the system of FIGS. 12A and 12B would allow for the use of cool air from the basement, to supplement cooling of the conditioned space, as disclosed earlier in FIGS. 2A and 2B and the accompanying description. When the conditioned space needs to be heated, the system of FIGS. 12A and 12B would utilize the combination of the hot water solar panel or array of solar panels 1210 and geothermal heat pump 1230 to heat the conditioned space, without the need to use the GeoFlo system 1250. Geothermal heat pump 1230 has the same configuration and internal components as geothermal heat pumps known in the art, with the only difference being the source of heated fluid being hot water solar panel or array of solar panels 1210, instead of a ground loop.

The GeoFlo damper system may utilize Bimetallic style dampers, to allow the dampers to open and close based on the temperature of the basement. The bimetallic feature would be exposed to the ambient basement temperature and open and close the dampers based on that temperature, acting as a substitute for the GeoFlo System thermostat.

The GeoFlo damper system may alternately utilize Billows valve style dampers, to also allow the dampers to open and close based on the temperature of the basement. The billows valve feature would be exposed to the ambient basement temperature and open and close the dampers based on that temperature, acting as a substitute for the GeoFlo System thermostat.

The bimetallic and billows dampers would allow for another embodiment of the system, in which the dampers are opened and closed gradually and naturally. This could be used to create a hybrid version of cooling and charging modes, in which the system operates in both modes concurrently. The AC evaporator would be running at the same time that the GeoFlo system is drawing cool basement aft, providing a benefit by drawing some basement aft to reduce the amount of work the evaporator must do. An additional benefit of this variation is to dehumidify the basement aft since the system would run the evaporator while drawing basement air. The amount the dampers are opened could be variable, depending on factors such as desired efficiency, temperature differences, amount of dehumidification desired, etc.

The GeoFlo System may also include an embodiment where the user turns on or off a dehumidification feature, to enter or exit a drying mode. Drying mode would be similar to cooling mode, where damper 1 is closed, dampers 2 and 3 are opened, and the aft handler is on, except that in drying mode, the system leaves the evaporator on. The system coding would call upon the GeoFlo System to enter drying mode for a predetermined period of time, for example 3 to 5 minutes, before entering cooling mode. When the dehumidification feature is turned on, any time the GeoFlo System would call for cooling mode, the system will enter drying mode for a predetermined period of time first, and then enter cooling mode. This feature would also include a sub-variation with a hygrometer located in the basement and a thermostat designed and/or coded in such a way that it can accept and process readings from the hygrometer as it would a thermometer. The dehumidification feature could be turned on or off at the thermostat, or from the app, whenever the GeoFlo System is running.

Figure 13:
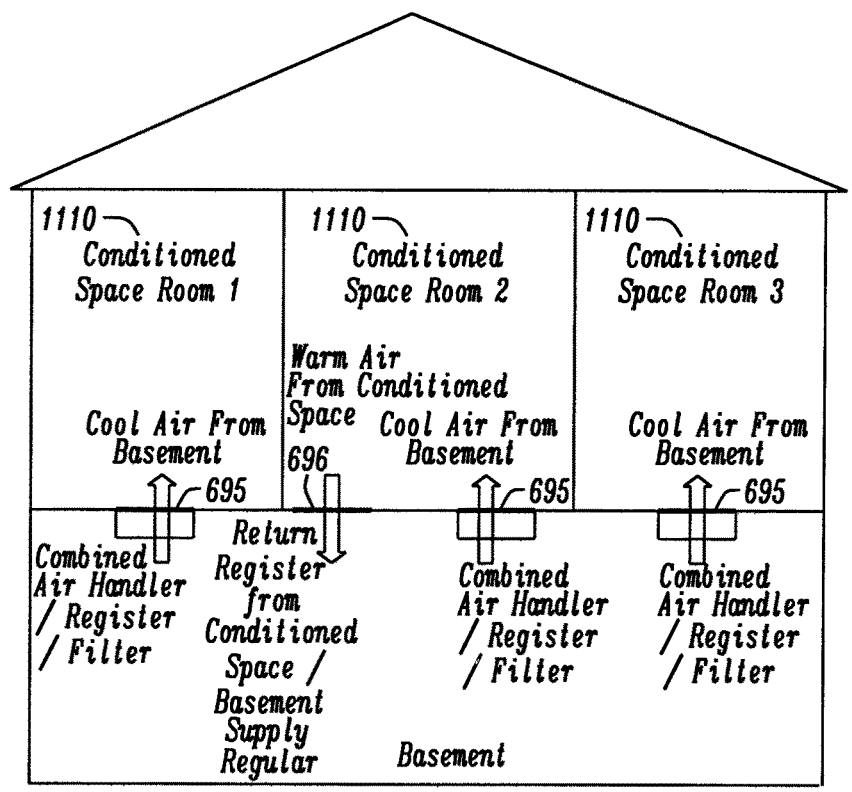
FIG. 13 is a block diagram of an embodiment of the disclosure which includes individual units that combine a supply register, an HVAC filter, and a small air handler or other vent fan, each of which can move cool air from a basement into an adjacent conditioned space.

FIG. 13 is a block diagram for another embodiment of the disclosure, for using basement air for cooling a room. It includes individual units 695 that combine a supply register, an HVAC filter, and a small air handler or other vent fan. The units can be installed in the floor, wall or other surface of each room/area that is adjacent to (typically, above) the basement, and which could benefit from cooling, and does so without the need for any ductwork. The units allow the direct transfer of naturally cool basement air to the conditioned space 1110. This embodiment typically also includes a simple return register 696 located in a floor that sits above the basement, and does not require any return ducts. This embodiment would typically include a GeoFlo thermostat as previously described, or other means of regulating the times when each of the units activates. This embodiment also would typically include a way for users to control each of the units individually or, alternately, all collective groups of the units via one or more thermostats, an app, remote control devices, or other methods of control.

Figure 14A:
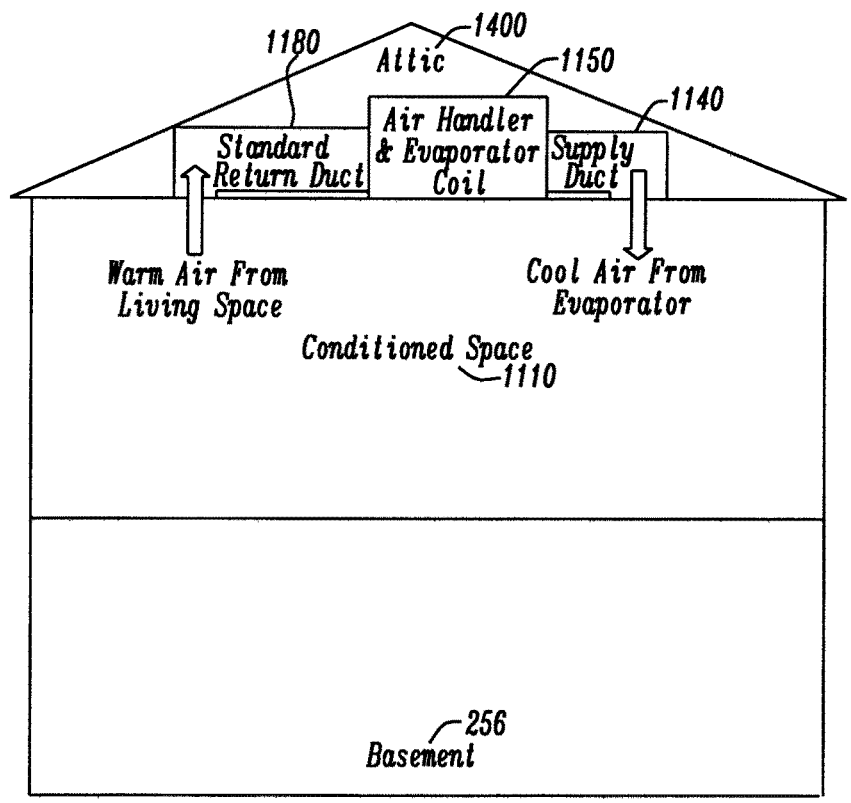
FIG. 14A is block diagram of a standard attic-based HVAC system.
Figure 14B:
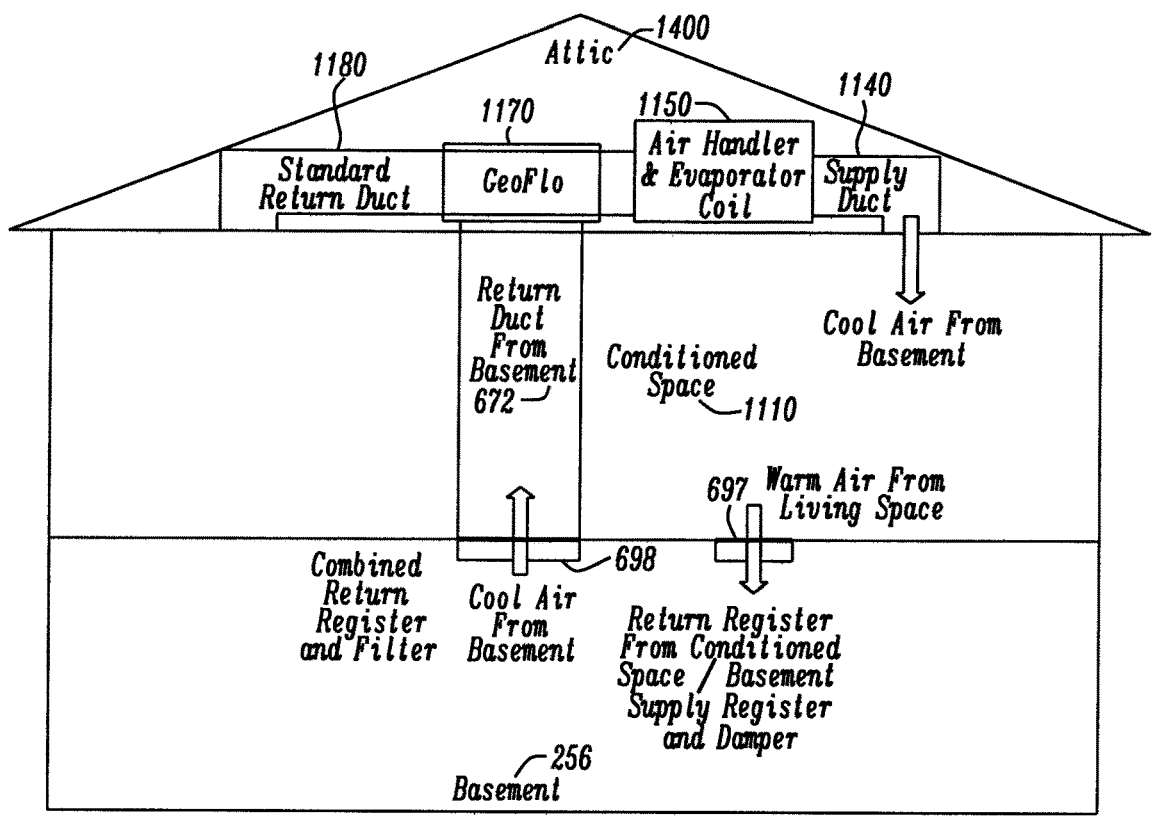
FIGS. 14B and 14D depict an embodiment of the disclosure including a Geoflo system installed with an attic (or other mechanical space)-based HVAC system for drawing cool air from a basement, in a Cooling Mode.
Figure 14C:
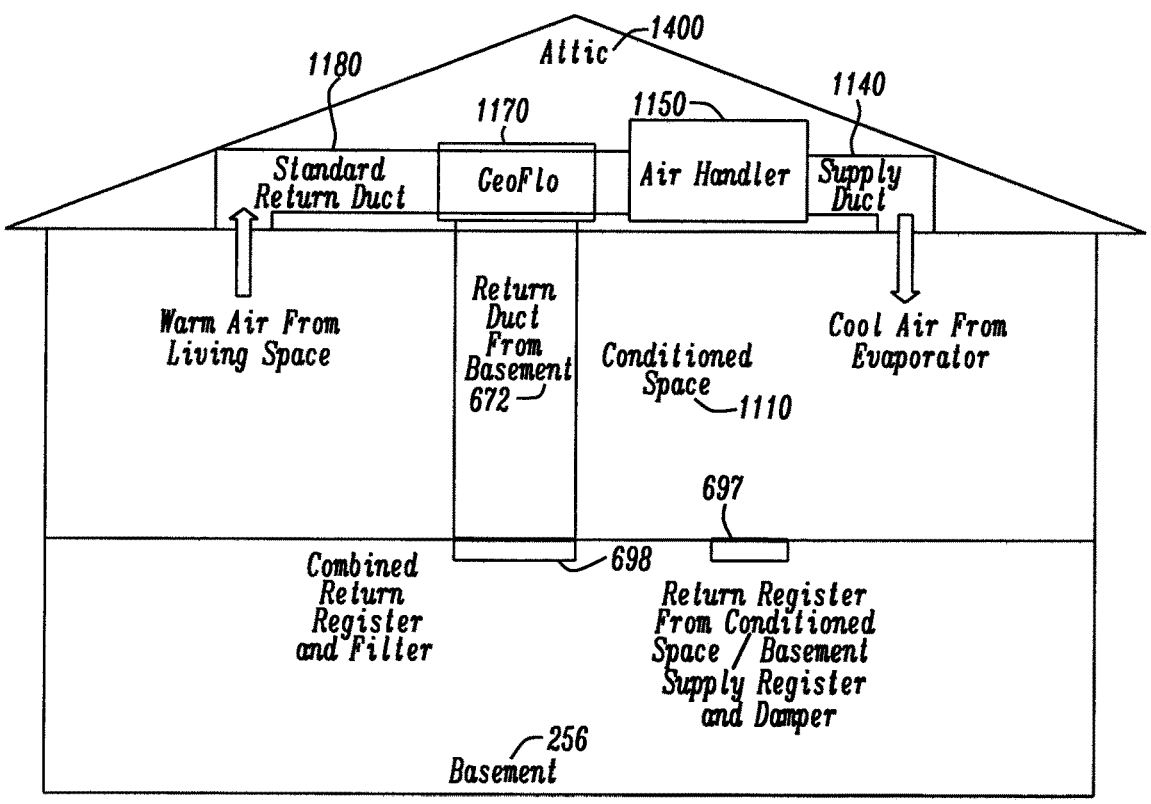
FIGS. 14C and 14E depict an embodiment of the disclosure including a Geoflo system installed with an attic (or other mechanical space)-based HVAC system for drawing cool air from a basement, in a Charging Mode.
Figure 14D:
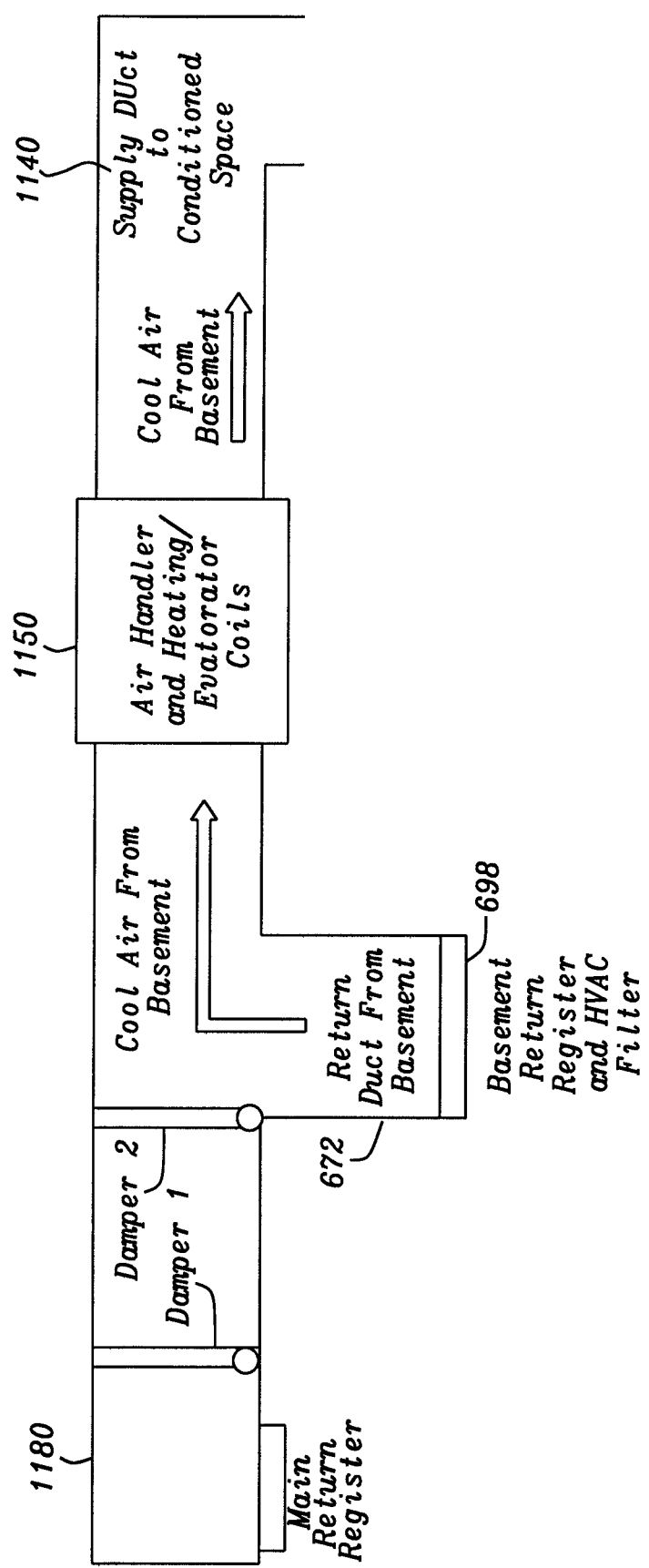
Figure 14E:
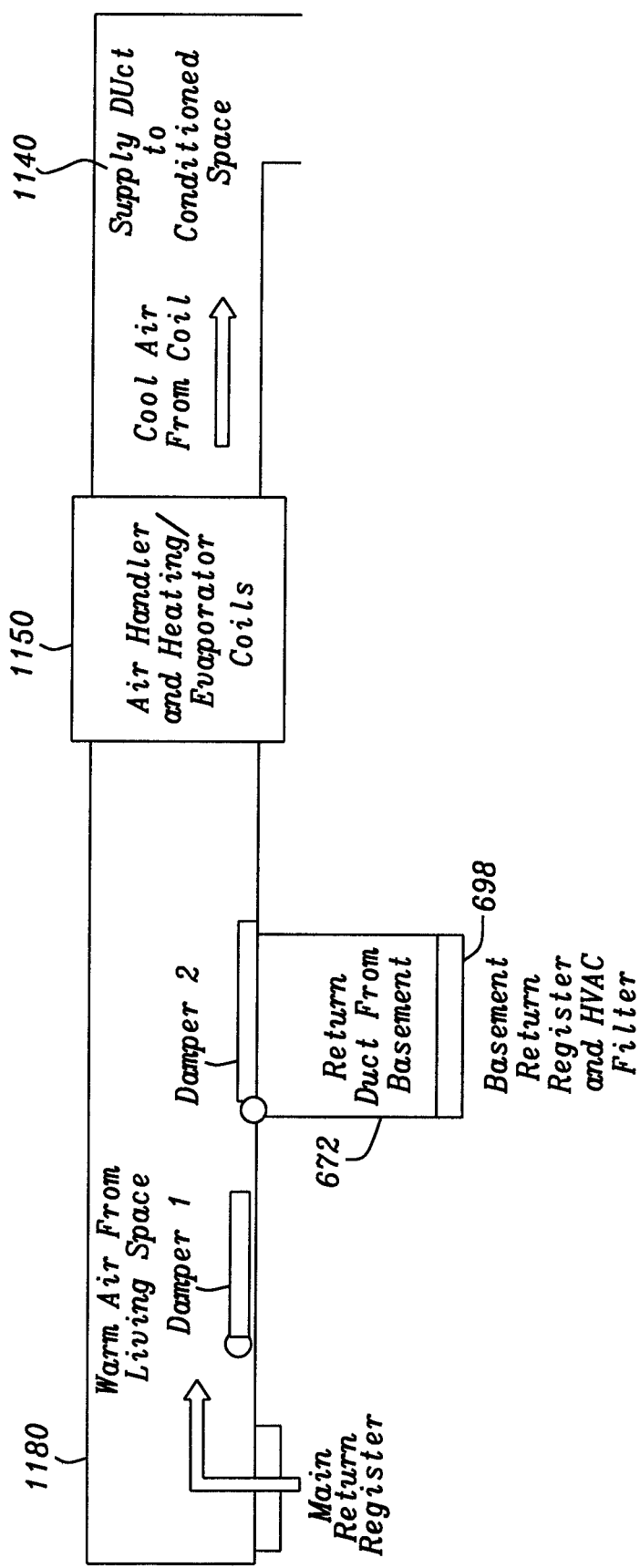

FIG. 14A depicts a standard attic 1400 based HVAC system, having a return duct 1180, air handler/evaporator 1150 and supply duct 1140, located above a conditioned space 1110, as is known in the art, which takes in warm air from the conditioned space and returns cool air to the conditioned space. FIGS. 14B-14E illustrate another embodiment of the disclosure, for a Geoflo system 1170 installed in conjunction with an attic (or other mechanical space) based HVAC system as shown in FIG. 14A, for drawing cool air from a basement. FIGS. 14B and 14D illustrate this embodiment in a cooling mode, while FIGS. 14C and 14E are for a charging mode. Other mechanical spaces include places like knee walls, crawl spaces, or other spaces that are not living space.

FIG. 14B illustrates the attic based GeoFlo System in Cooling Mode. In this mode, the AC evaporator is inactive, the air handler is active, and dampers are in positions to allow the system to draw warm air from the conditioned space 1110 through a basement supply register 697, after which the air is cooled in the basement 256. The cooled basement air then moves through return register/filter 698 and return duct 672 to the attic based Geoflo system and air handler and back into the conditioned space 1110. The conditioned air is displaced via pressure out of the conditioned space 1110 through the conditioned space return register and basement supply register/damper 697 into the basement, to replace the air being drawn into the air handler.

FIG. 14C illustrates the attic based GeoFlo System in Charging Mode. In this mode, the AC evaporator is active, the air handler is active, and dampers are in positions to allow the system to draw air from the conditioned space 1110 through the standard return duct 1180, evaporator 1150 where cooling takes place, and then back to the conditioned space through supply duct 1140.

FIG. 14D is a magnified view of the duct system of the attic based GeoFlo System of FIG. 14B for Cooling Mode, Damper 1 closes off the standard return duct 1180 and main return register, and an optional Damper 2 opens return duct 672 from the basement.

FIG. 14E is a magnified view of the duct system of the attic based GeoFlo System of FIG. 14C for Charging Mode. Damper 1 opens the standard return duct 1180 and main return register, and an optional Damper 2 closes off return duct 672 from the basement.

Similar to earlier embodiments, Cooling mode is used when the GeoFlo System detects that the basement air is cool enough to provide necessary cooling. If the temperature difference between the basement and conditioned space is too small to allow for cooling from the basement, the system operates in Charging mode until the basement air again cools sufficiently to be used again for cooling.

Figure 15A:
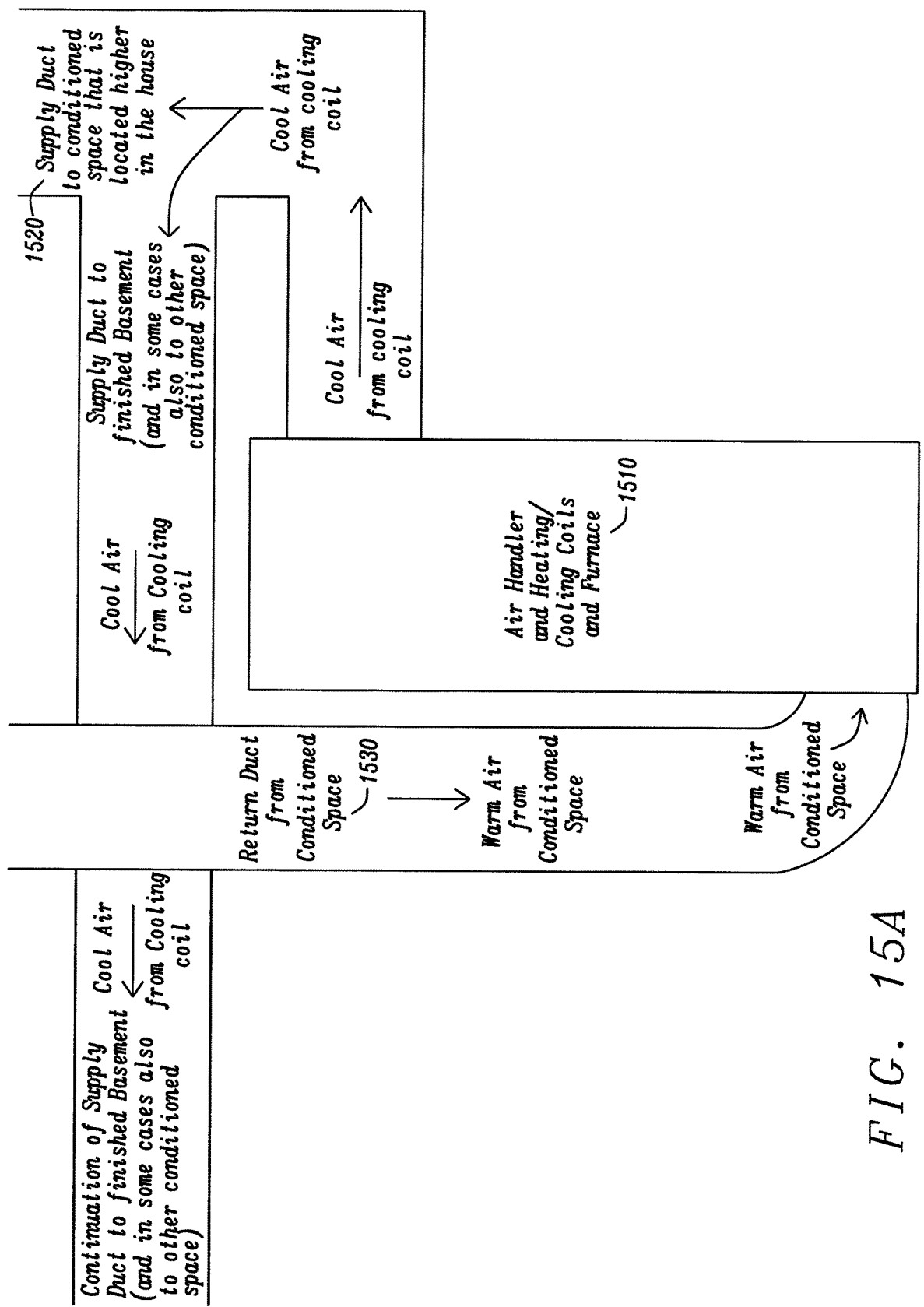
FIGS. 15A, 15B, and 15C depict an embodiment of the disclosure where an HVAC system serves an area that includes a basement, and an additional duct connects the supply duct to the return duct along with a series of dampers to route air flow as needed.
Figure 15B:
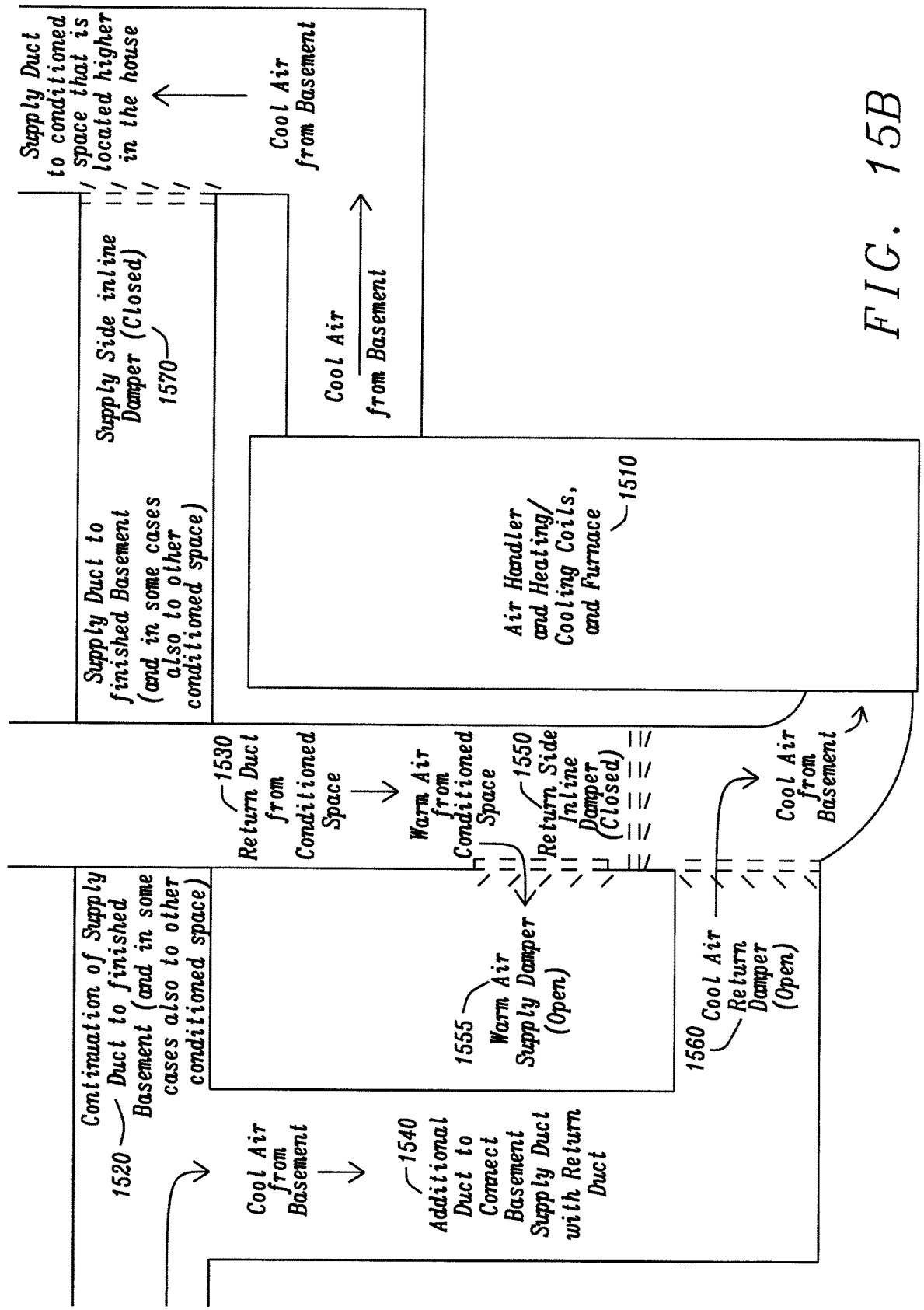
Figure 15C:
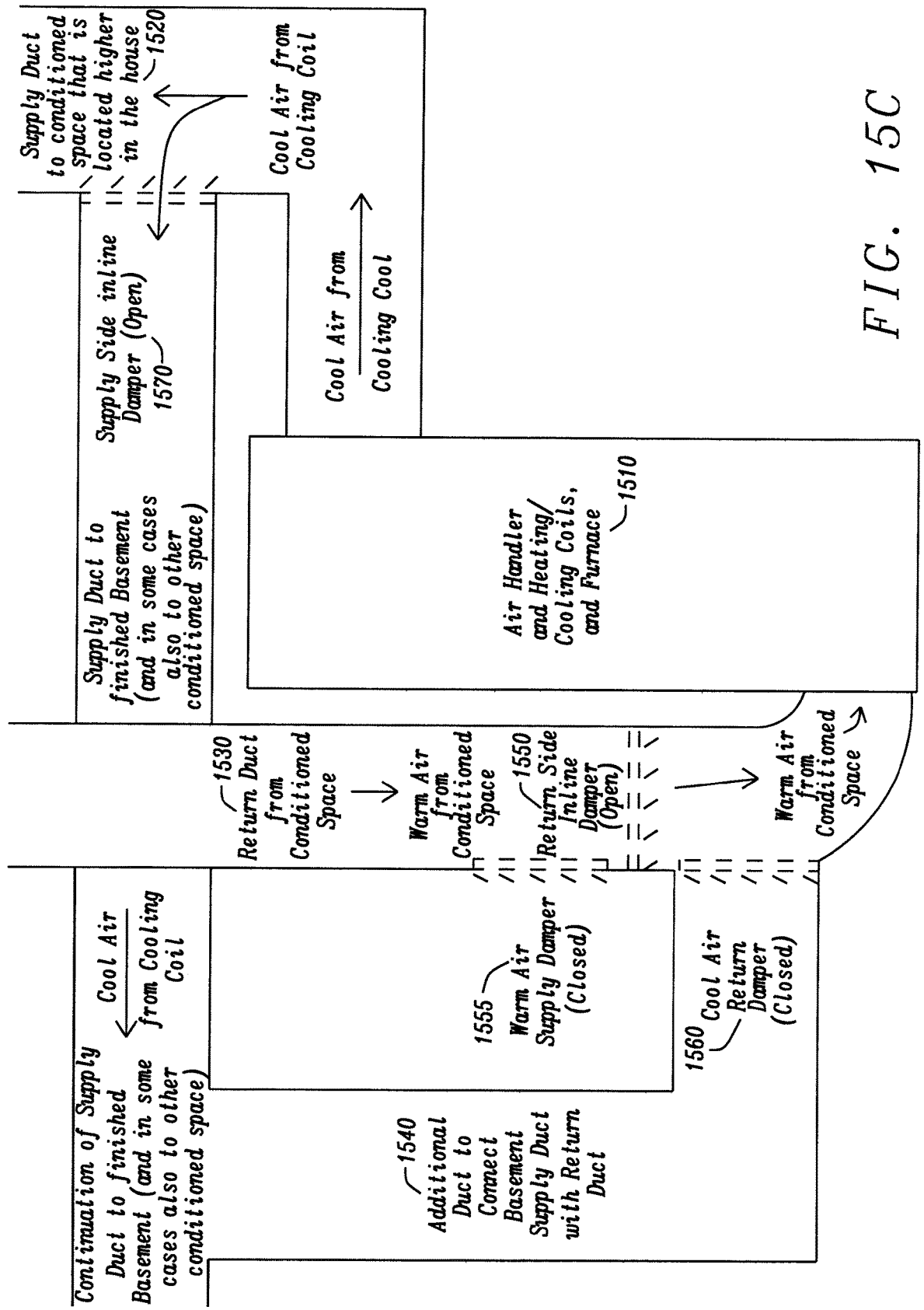

FIGS. 15A, 15B, and 15C depict an embodiment of the disclosure where an HVAC system 1510 serves an area that includes a basement, and an additional duct 1540 connects the supply duct 1520 to the return duct 1530. This variation is suitable for situations where a house has a basement that is served by a duct system, as in FIG. 15A. It uses the GeoFlo carburetor system consisting of three dampers plus one additional damper, as in FIGS. 15B and 15C. There is also a control box and temperature sensor.

The system will cycle between two modes of operation. In FIG. 15B, it will enter active cooling mode when the temperature sensor determines that the basement area that is served by the ducts is cold enough (either a specified basement threshold temperature or that there is a greater than a specified threshold delta compared to the temperature in other finished space located upstairs in the house). This means the AC condenser deactivates (if there is one). The return side inline 1550 damper closes, the warm air supply 1555 and cold air return 1560 dampers open, and the basement supply side inline 1570 damper closes. During this phase the cold temperatures from the basement are drawn through ducts normally dedicated to supplying the basement and used to cool the house, and at the same time heat from the conditioned space is directed into the basement where it is dispersed into the ground.

If at any time the temperature sensor determines that the basement temperature is not cold enough (either a specified basement threshold temperature or that there is less than a specified threshold delta compared to the temperature in other finished space located upstairs in the house) the Cool Down system enters an inactive recharging mode, as in FIG. 15C. During this phase the AC condenser activates (if there is one). The return side in-line 1550 damper opens, the warm air supply 1555 and cold air return 1560 dampers close, and the basement supply side inline 1570 damper opens. This allows the cold temperatures to build up in the basement again as heat continues to disperse into the ground until the basement is once again cold enough. At that time the system cycles back into active cooling mode.

Figure 16A:
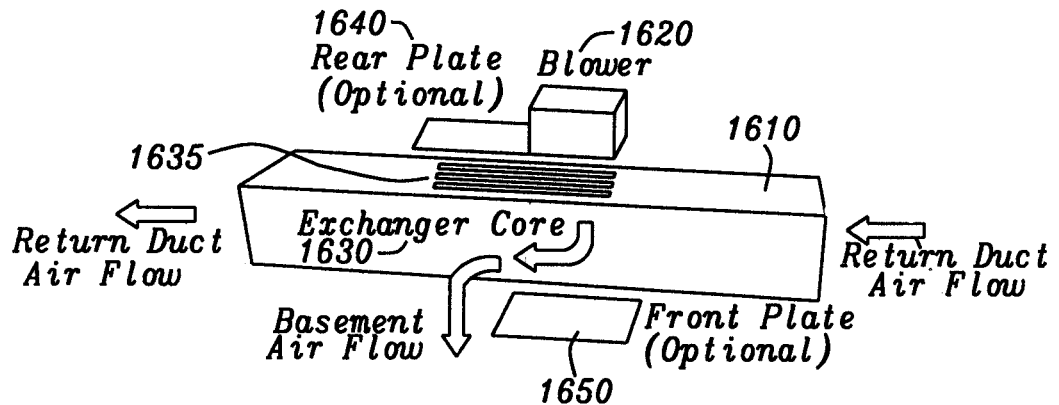
FIGS. 16A, 16B, 16C, and 16D represent a block diagram of an HVAC system including a section of return duct that serves as a heat exchanger, where the exchanger core is built into the return duct.
Figure 16B:
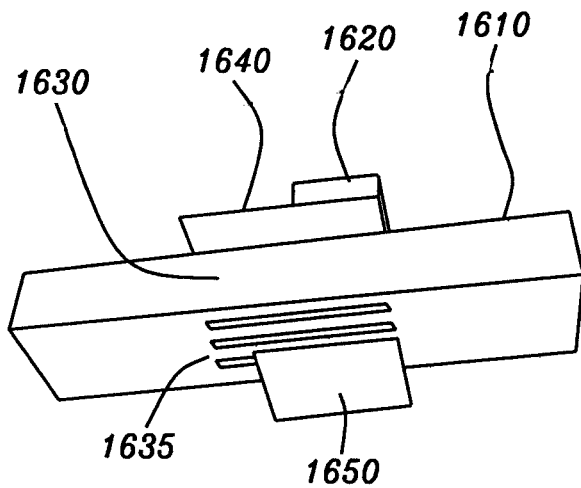
Figure 16C:
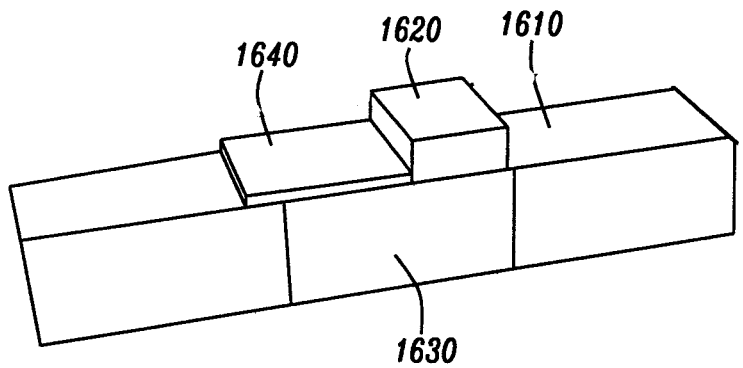
Figure 16D:
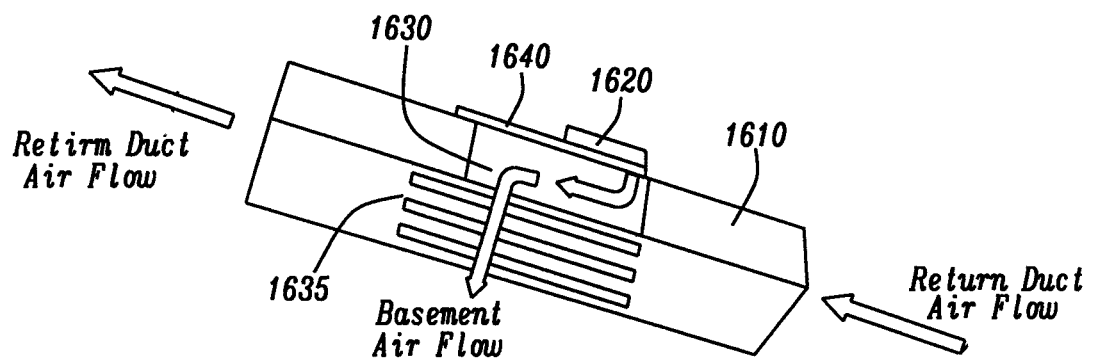

FIGS. 16A, 16B, 16C, and 16D represent a block diagram of an HVAC system including a section of return duct 1610 that serves as a heat exchanger, where the exchanger core is built into the return duct. This variation allows a section of return duct to serve as a heat exchanger 1630. It allows air that is passing through the duct to be cooled by air from the basement without the two air streams mixing. The air that is passing through the return duct is divided into multiple small channels 1635 with spaces between those channels and a correspondingly high amount or surface area on those channels for the purpose of facilitating heat exchange. As the air is passing through the return duct, a cooler, separate stream of air from the basement is drawn across the exterior of the channels by a blower 1620, cooling the air that is passing through the return duct. Optional sheet metal plates 1640, 1650 are installed on both sides of the return duct in order to direct the flow of basement air on a longer path through the channels to maximize heat exchange. FIGS. 16A and 16C are side views (Angle 1), and FIGS. 16B and 16D are views from underneath (Angle 2) the exchanger core built into the return duct.

Figure 17A:
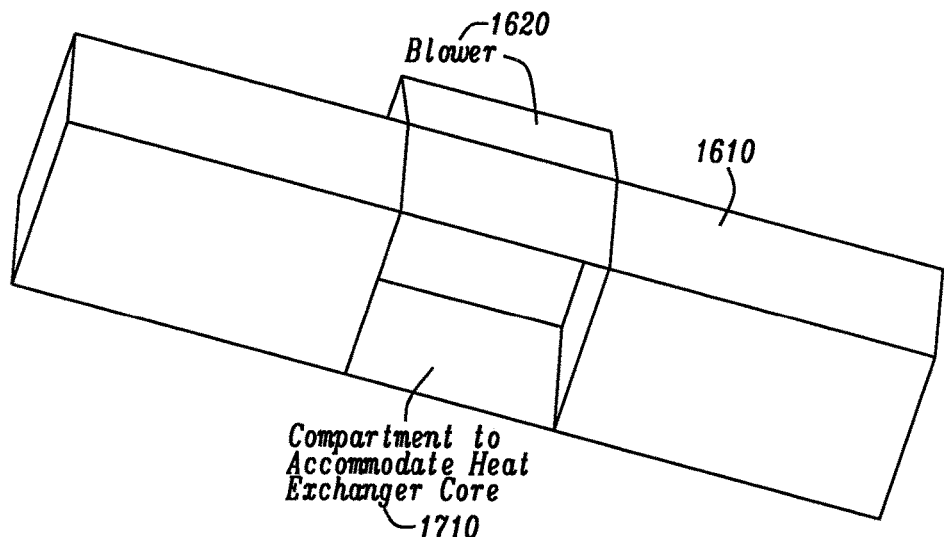
FIGS. 17A and 17B represent a block diagram of an HVAC system including a section of return duct with a compartment to accommodate an off the shelf heat exchanger core or a custom heat exchanger core.
Figure 17B:
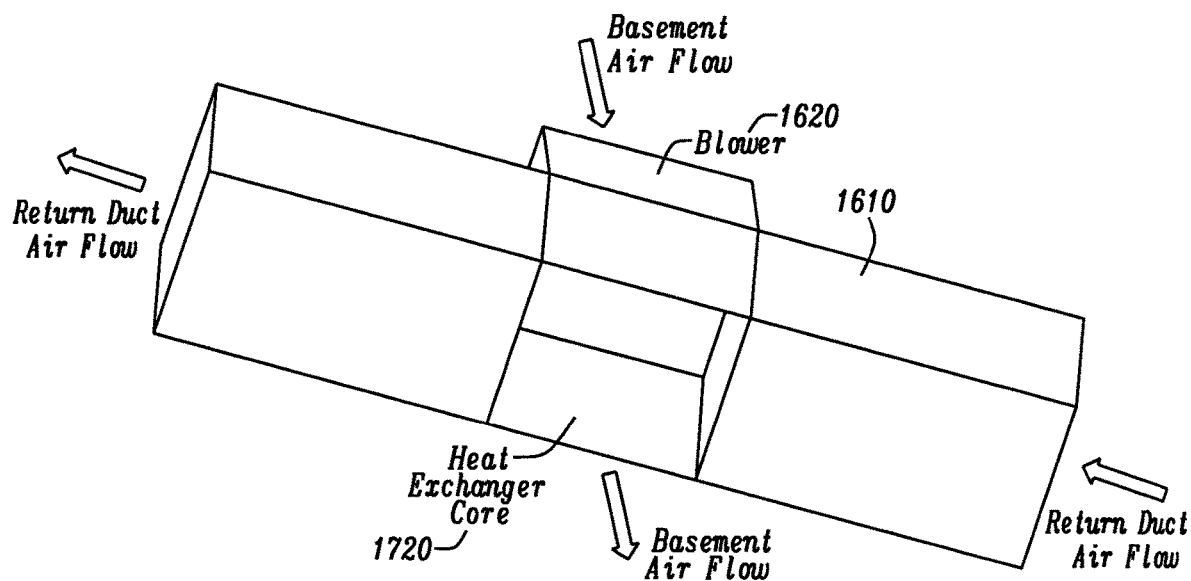

FIGS. 17A and 17B represent a block diagram of an HVAC system including a section of return duct with a compartment 1710 to accommodate an off the shelf heat exchanger core or custom heat exchanger core. This variation allows a section of return duct 1610 to serve as a heat exchanger. It allows air that is passing through the duct to be cooled by air from the basement without the two air streams mixing. The air that is passing through the return duct is driven through an off-the-shelf heat exchanger core or custom heat exchanger core, where the air is divided into multiple small channels with spaces between those channels and a correspondingly high amount or surface area on those channels for the purpose of facilitating heat exchange. FIG. 17B shows as the air is passing through the exchanger core 1720, a cooler, separate stream of air from the basement is drawn across a separate set of channels by a blower 1620, cooling the air that is passing through the return duct.

FIGS. 16A-16D and 17A-17B represent another variation of Cool Down with a heat exchanger, similar to FIG. 6B where a GeoFlo HVAC System uses a basement air to air heat exchanger, except that here the heat exchanger is bunt right into the return duct. Rather than a system that routes the air out of the return duct and through a heat exchanger and then back into the return duct, this version shows the aft always passing through the heat exchanger, and active only when Cool Down is in active/cooling mode.

Figure 18A:
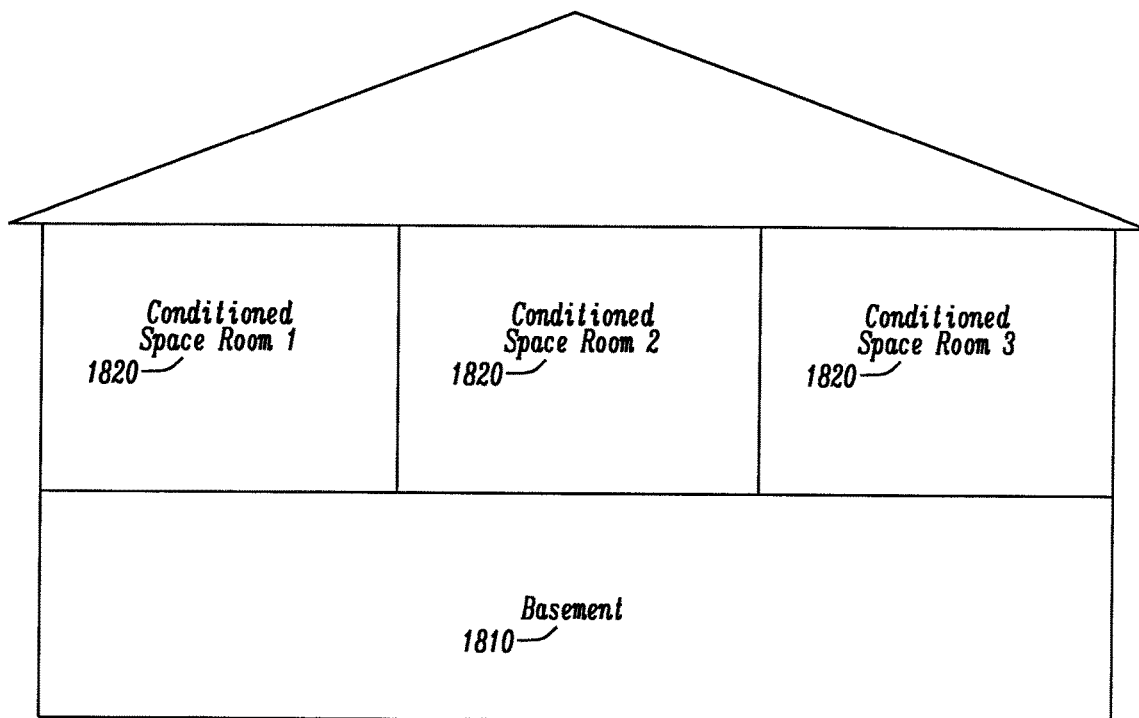
FIGS. 18A and 18B show a variation of an HVAC system including a supply duct installed to transfer cool basement air to a conditioned space.
Figure 18B:
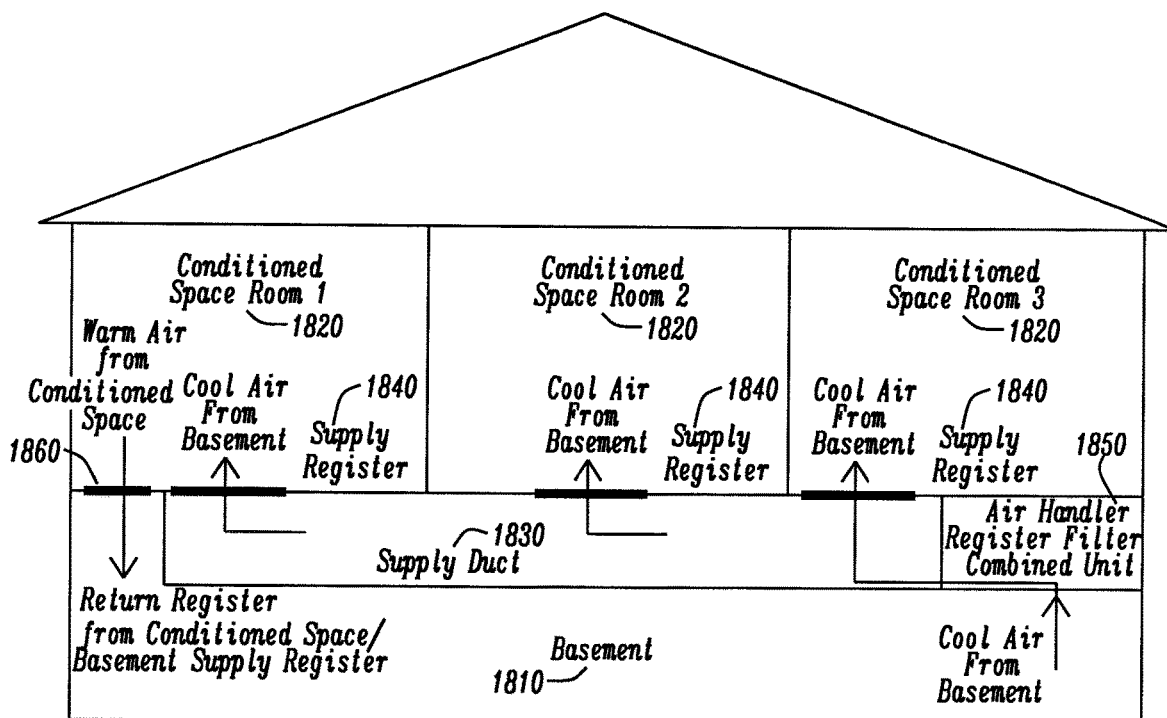

FIGS. 18A and 18B show a variation of an HVAC system including a supply duct 1830 installed to transfer cool basement 1810 aft to a conditioned space 1820. This variation includes a supply duct with a register 1840 for each room, an air handler 1850, and an HVAC filter. It can be installed in the floor of any room(s)/area(s) that touch the basement (or other mechanical space) or can otherwise be reached with ducts. This simple, dedicated section of duct would not require a return duct. (Nor would it require the dampers and registers typically placed on the house's main return duct in other GeoFlo variations).

This variation would allow the direct transfer of naturally cool basement air to the conditioned space. It would also include a simple return register 1860 on a floor that sits above the basement with no return ducts. This variation would typically include the GeoFlo thermostat or any other means of regulating the times when the system activates. It would typically include a means for users to control the system via the thermostat, an app, remote control devices, or other means of control.

Figure 19A:
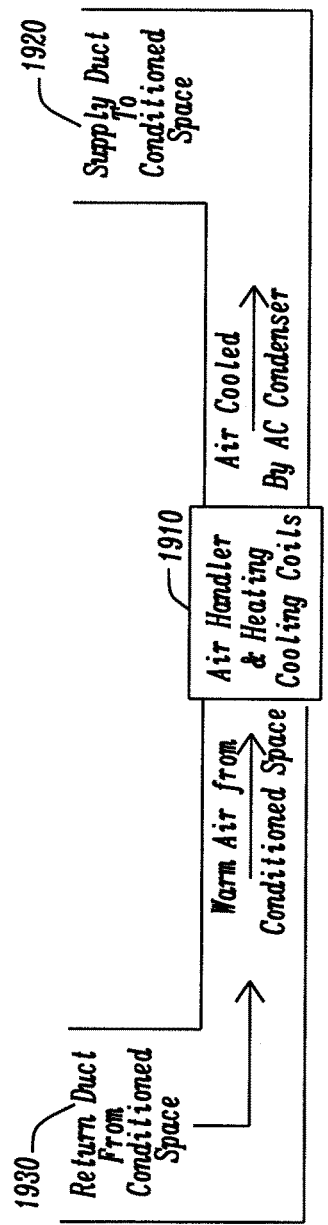
FIGS. 19A, 19B, and 19C depict an embodiment of the disclosure where an HVAC system includes a separate section of duct outside the main return duct.
Figure 19B:
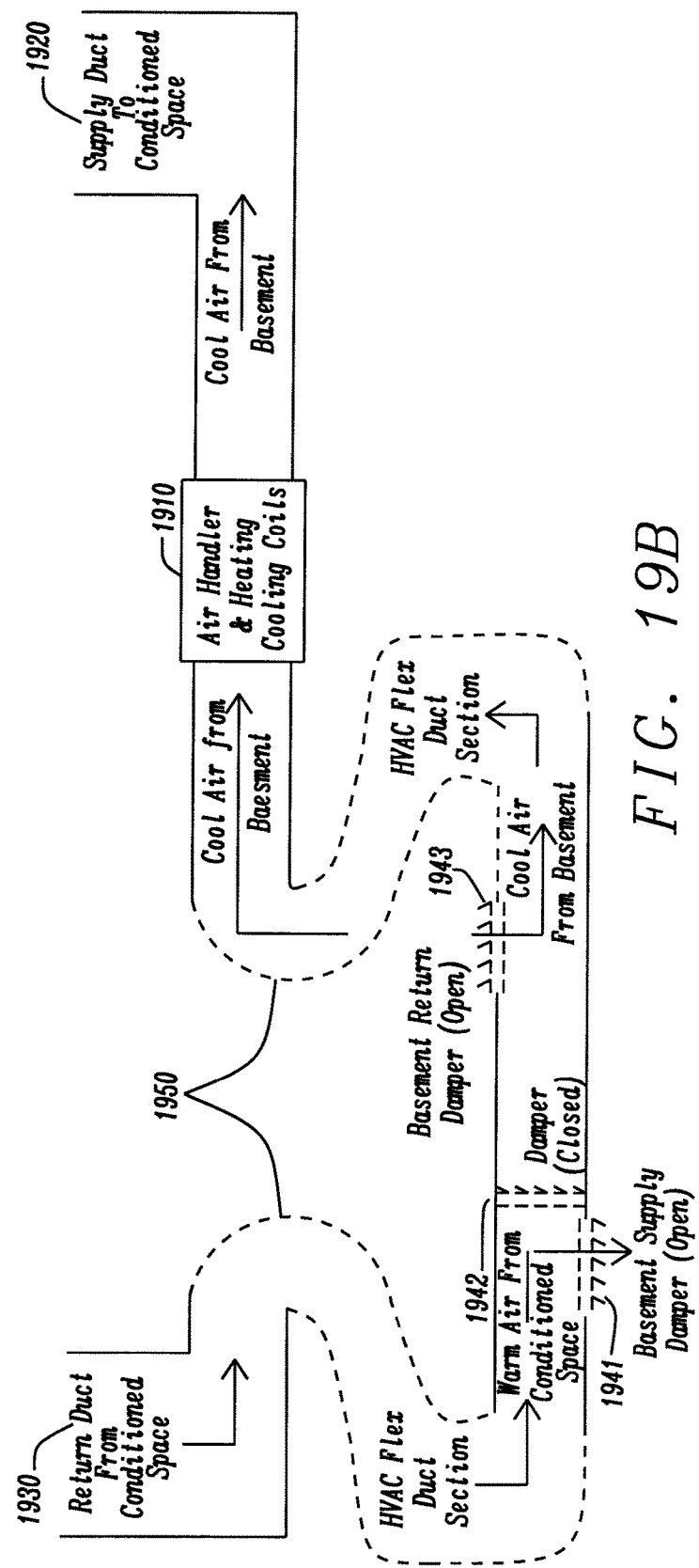
Figure 19C:
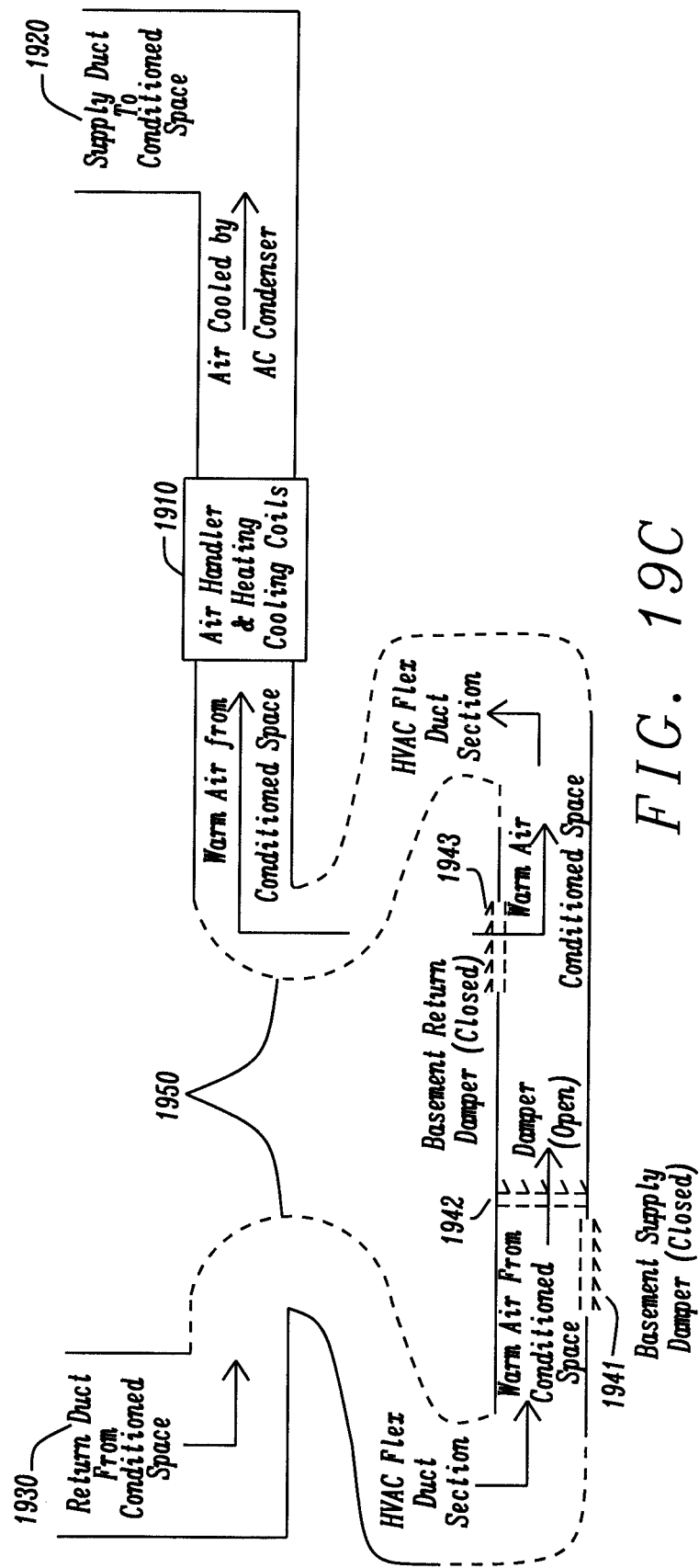

FIGS. 19A, 19B, and 19C depict an embodiment of the disclosure where an HVAC system includes a separate section of duct outside the main return duct 1930. The separate section of duct also includes 3 dampers 1941, 1942, 1943. It is attached to the return duct by two segments of flex duct 1950 in a space where a segment of the return duct was removed for the purpose of installing the two segments of flex duct. This variation would be used in situations where installation of other GeoFlo variations is not practical. For example, a case in which the only accessible portion of the house's return duct were too small to house the GeoFlo dampers and registers. FIG. 19B shows during Cooling Mode, warm air from the conditioned space flows through open basement supply damper 1941, damper 1942 is closed, and basement return damper 1943 is open, supplying cool air from the basement. FIG. 19C shows during Charging Mode, warm air from the conditioned space flows through open damper 1942 to air handler and cooling coils 1910, similar to pre-retrofit FIG. 19A, and basement supply damper 1941 and basement return damper 1943 are closed.

Figure 20A:
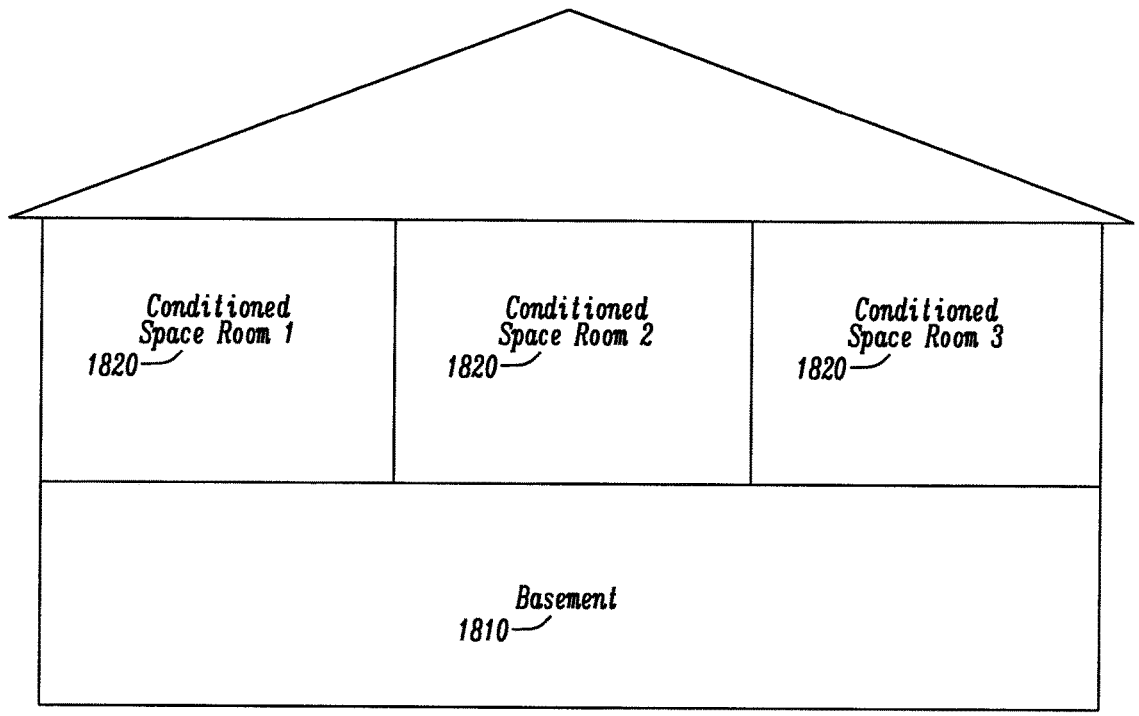
FIGS. 20A, 20B, and 20O show a variation of an HVAC system including a supply duct installed to naturally transfer cool air into a conditioned space, from either the basement or from outside the house.
Figure 20B:
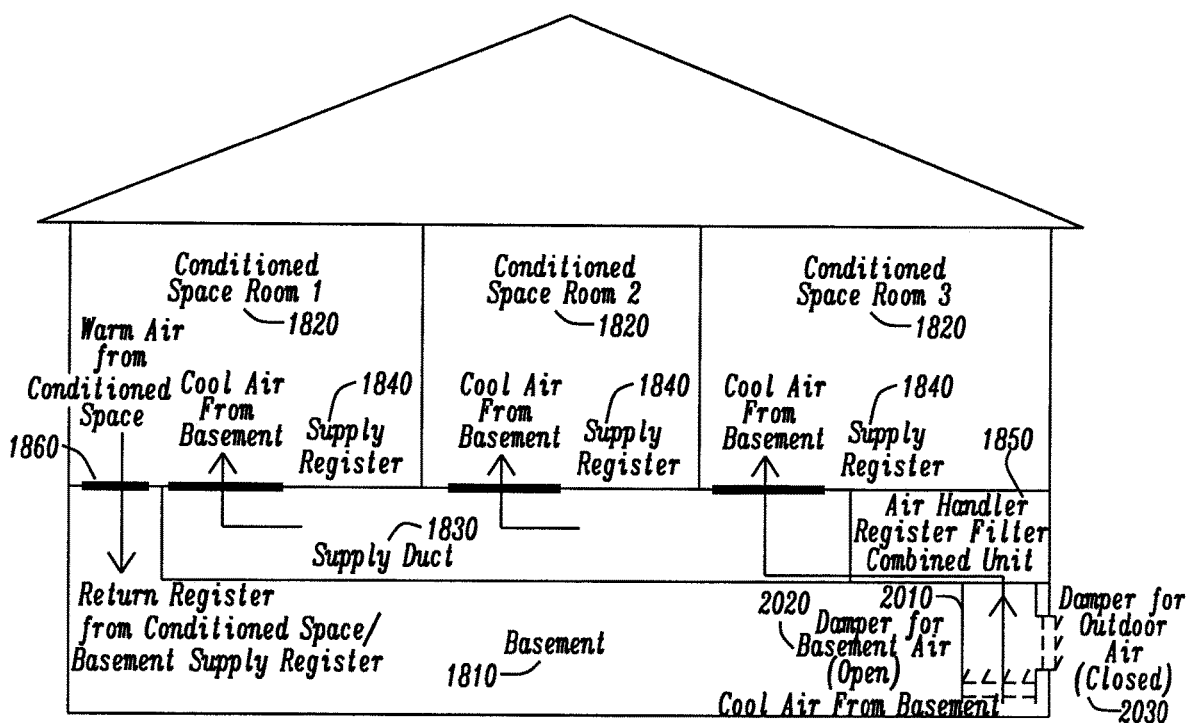

FIGS. 20A, 20B, and 200 show a variation of an HVAC system including a supply duct installed to transfer cool air into a conditioned space, from either the basement or from outside the house, whichever is cooler. This variation includes a supply duct 1830 with a register 1840 for each room, an air handler 1850, and an HVAC filter. It can be installed in the floor of any rooms areas that touch the basement (or other mechanical space) or can otherwise be reached with ducts. This simple, dedicated section of duct would not require a return duct. (Nor would it require the dampers and registers typically placed on the house's main return duct in other GeoFlo variations).

This variation would allow the direct transfer of naturally cool air into the conditioned space 1820 from either the basement 1810 or from outside the house, whichever is cooler. It would also include a simple return register 1860 on a floor that sits above the basement with no return ducts. This variation would typically include the GeoFlo thermostat/temperature sensor or any other means of regulating the times when the system activates, and in this case the system would also include an additional thermostat/temperature sensor outside of the house. It would also include duct 2010 capable of drawing air from outside of the house, and HVAC dampers to control whether cool air is drawn from the basement or outside of the house. This variation would typically include a means for users to control the system via the thermostat, an app, remote control devices, or other means of control.

Figure 20C:
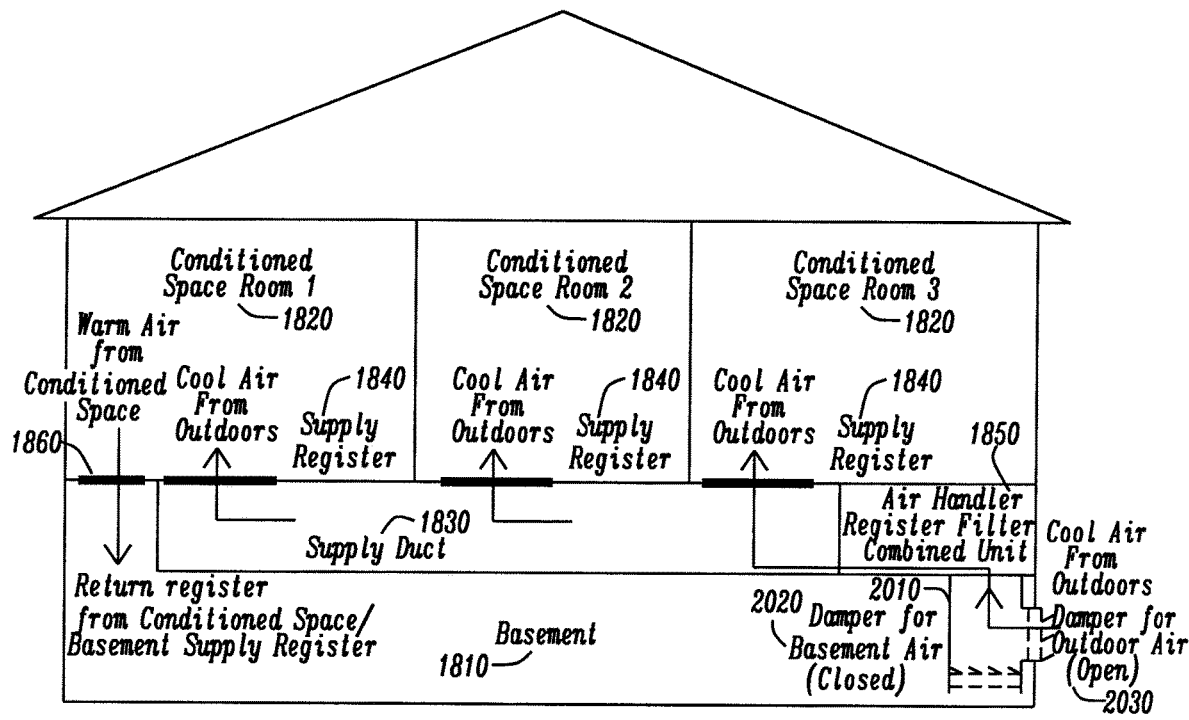

In FIG. 20B damper 2020 is open, to allow cool air to be drawn from the basement to the conditioned space, and damper 2030 is closed, because the basement air is cooler than the outdoor air temperature. In FIG. 20C damper 2020 is closed, to allow cool air to be drawn from the outdoors to the conditioned space, and damper 2030 is open, because the outdoor air temperature is cooler than the basement air.

Figure 21A:
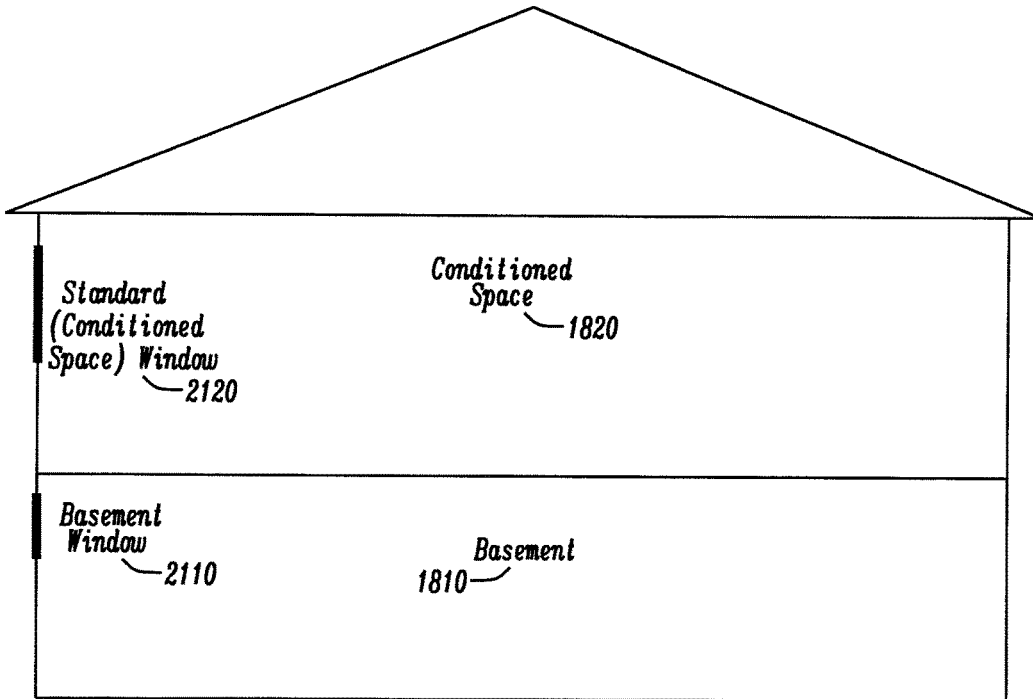
FIGS. 21A and 21B show a variation of an HVAC system including outdoor flexible ducting connecting two window inserts for cooling a conditioned space.
Figure 21B:
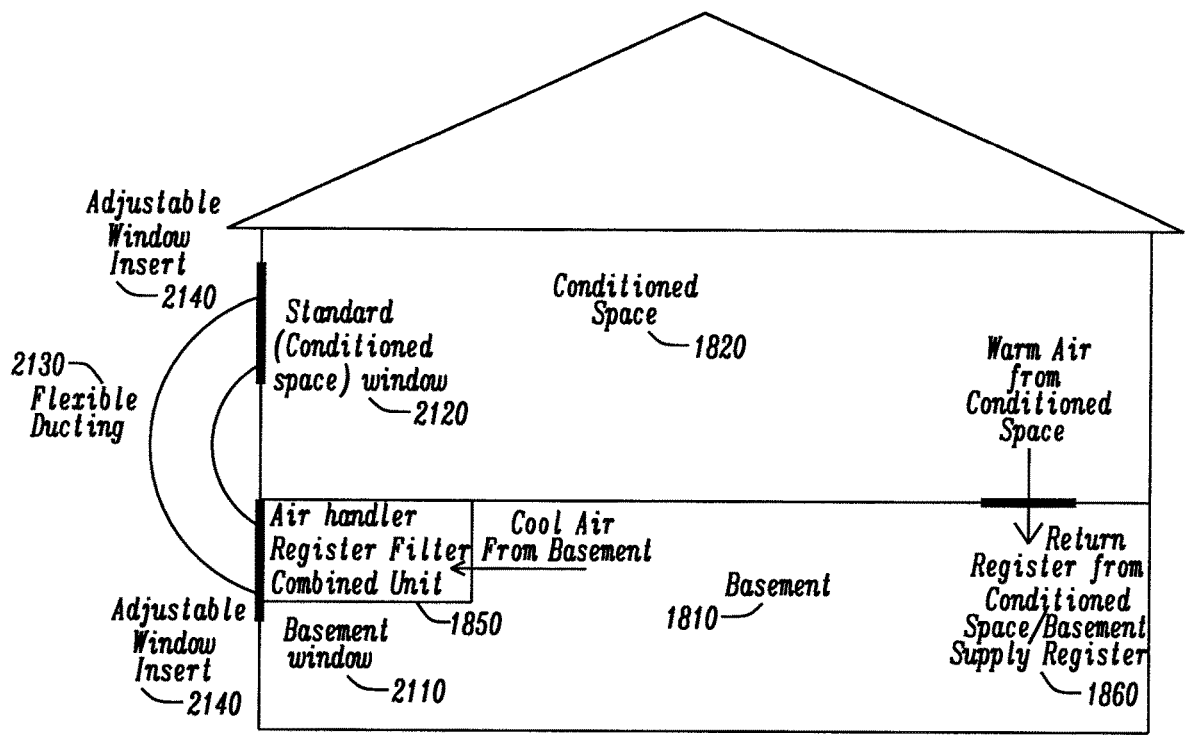

FIGS. 21A and 21B show a variation of an HVAC system including outdoor flexible ducting connecting two window inserts for cooling a conditioned space. This variation includes flexible ducting 2130 connecting two window inserts 2140 for the purpose of drawing air into a window 2120 in a conditioned space from a window 2110 in a basement or other mechanical space. The air is driven by an air handler 1850, with an optional HVAC filter, and receives cool air from the basement. There is a register 1860 through which warm air from the conditioned space is drawn.

Figure 22A:
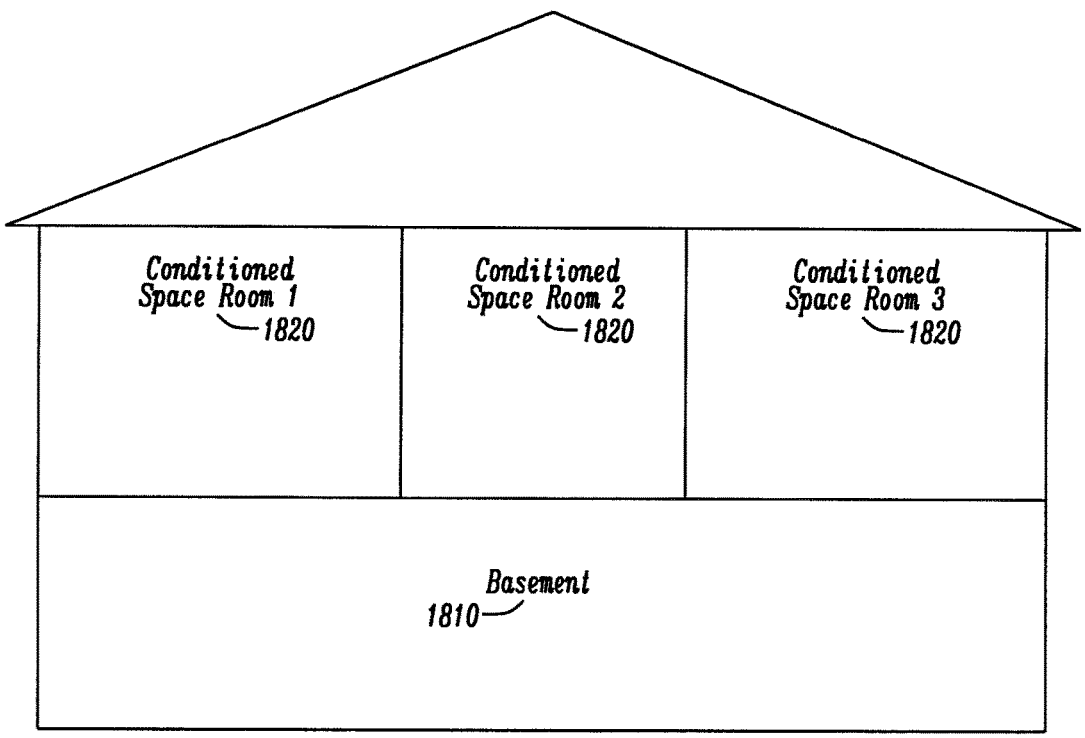
FIGS. 22A and 22B show a variation of an HVAC system including an air handler and a return duct from the conditioned space to an air-to-air heat exchanger.
Figure 22B:
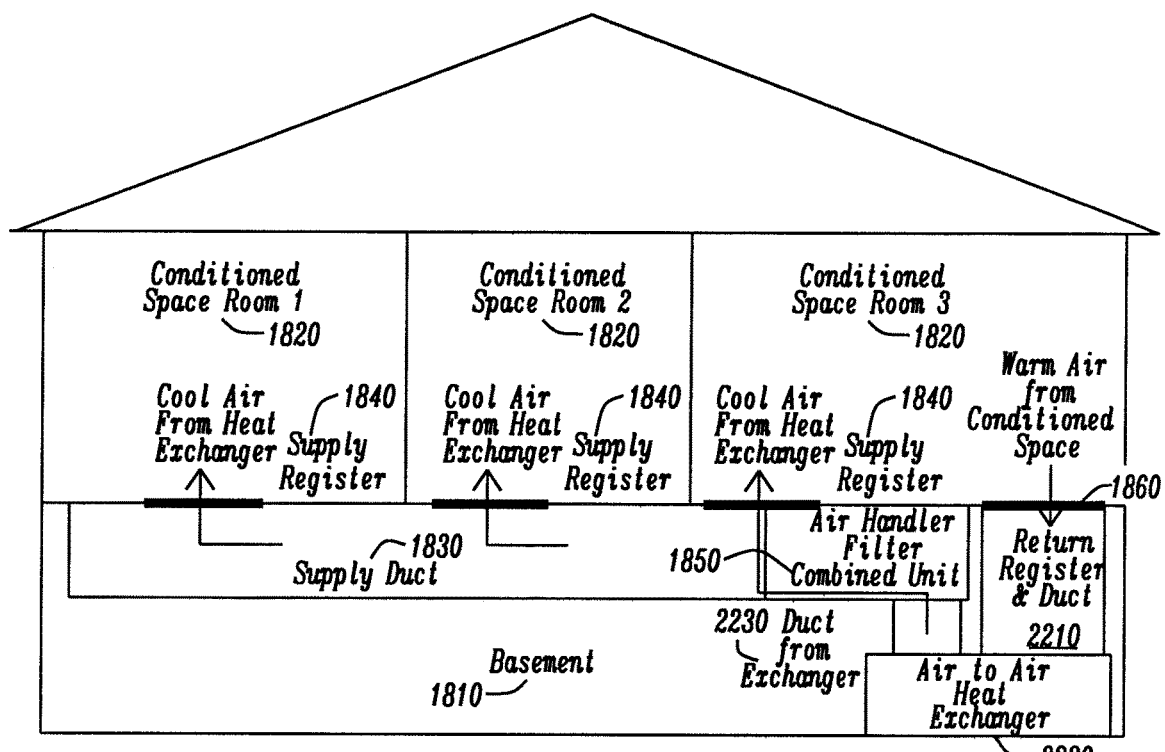

FIGS. 22A and 22B show a variation of an HVAC system including an air handler and a return duct from the conditioned space to an air-to-air heat exchanger. This variation includes an air handler 1850, a return duct 2210 from the conditioned space to an air-to-air heat exchanger 2220, a supply duct and a return duct 2230 both connected to the heat exchanger, and a register for each room as a typical supply duct system would have. It can be installed in the floor of any rooms/areas that touch the basement (or other mechanical space) or can otherwise be reached with ducts as a typical supply duct system would. This variation would typically include the GeoFlo thermostat or any other means of regulating the times when the system activates. It would typically include a means for users to control the system via the thermostat, an app, remote control devices, or other means of control.

The system will cycle between two modes of operation. It will enter active cooling mode, when the temperature sensor determines that the basement is cold enough, (either a specified basement threshold temperature or that there is a greater than a specified threshold delta compared to the temperature in other finished spaces located upstairs in the house). In active mode, the air handler will activate, and system will draw warm air from the conditioned space into the system, where the air is cooled as it passes through the air-to-air heat exchanger because of a lower basement temperature.

If at any time the temperature sensor determines that the basement temperature is not cold enough (either a specified basement threshold temperature or that there is less than a specified threshold delta compared to the temperature in other finished spaces located upstairs in the house) the Cool Down system enters an inactive recharging mode. During this phase, the air handler deactivates, and air is no longer drawn through the system.

Figure 23A:
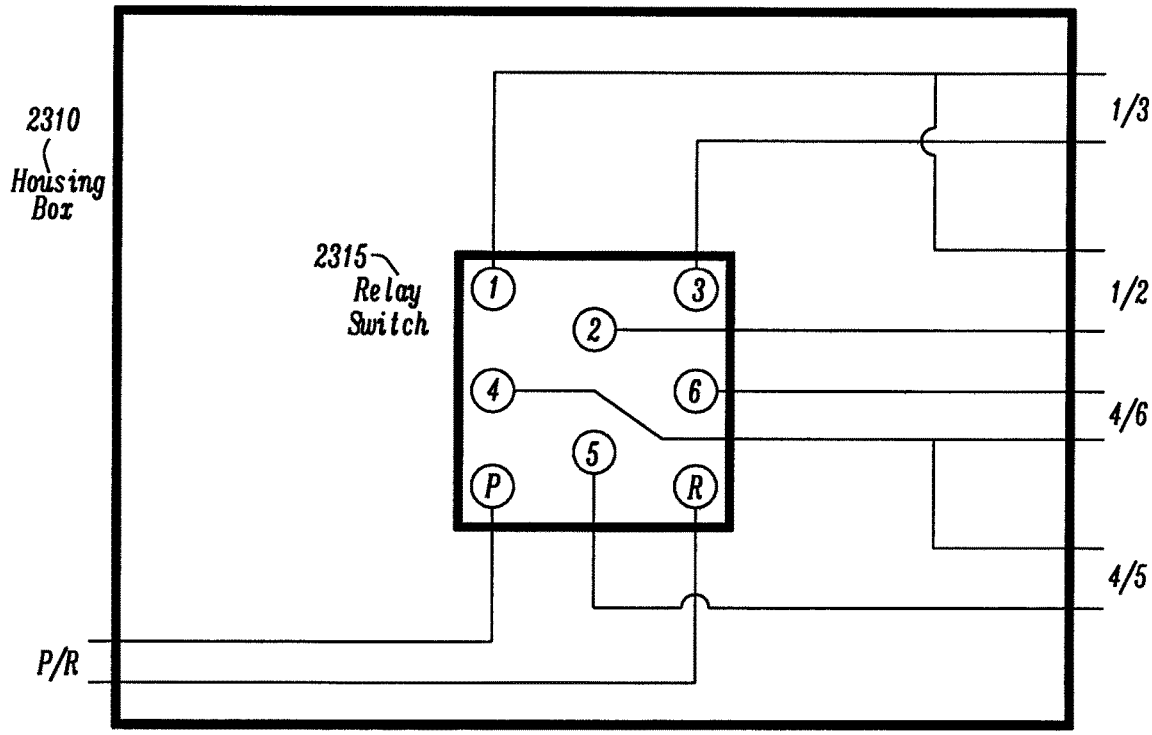
FIGS. 23A, 23B, and 23C depict the wiring configurations of a control box for an HVAC system designed to move air from one area of a building to another, for either a situation where the transformer is installed on the AC unit or a situation where the transformer is installed on the furnace unit.
Figure 23B:
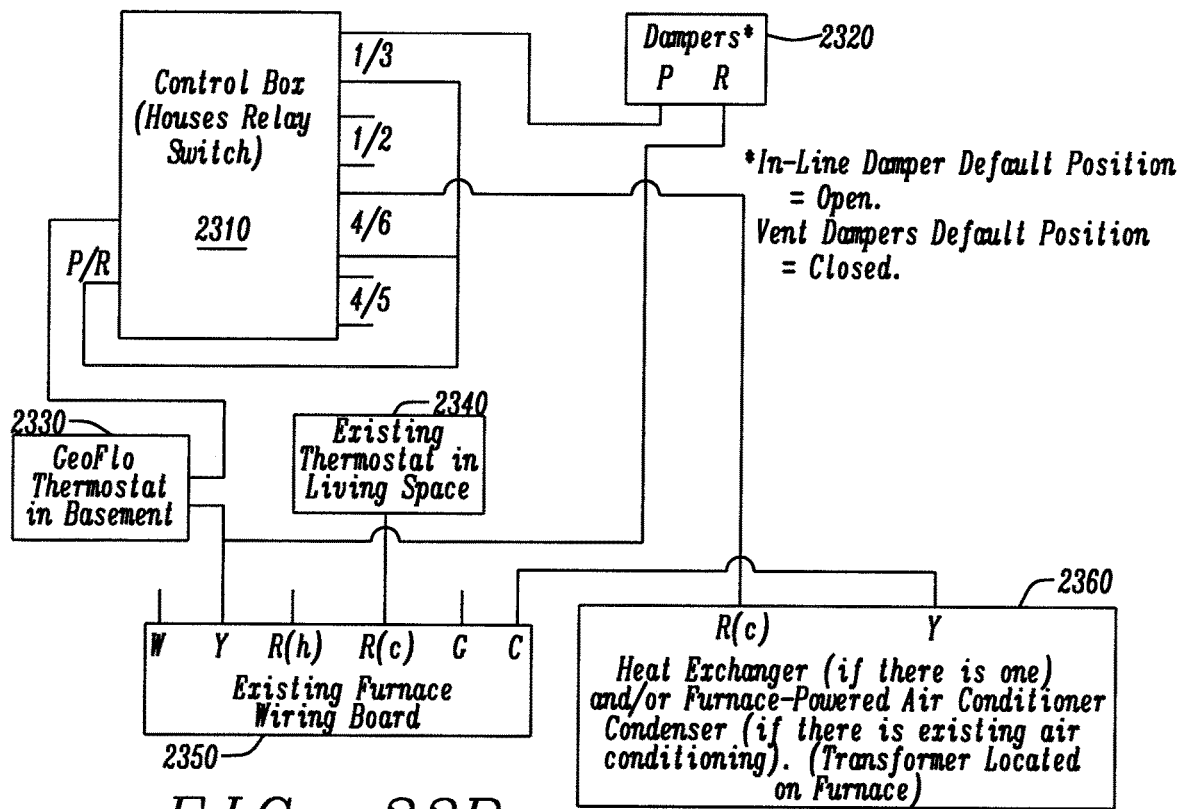
Figure 23C:
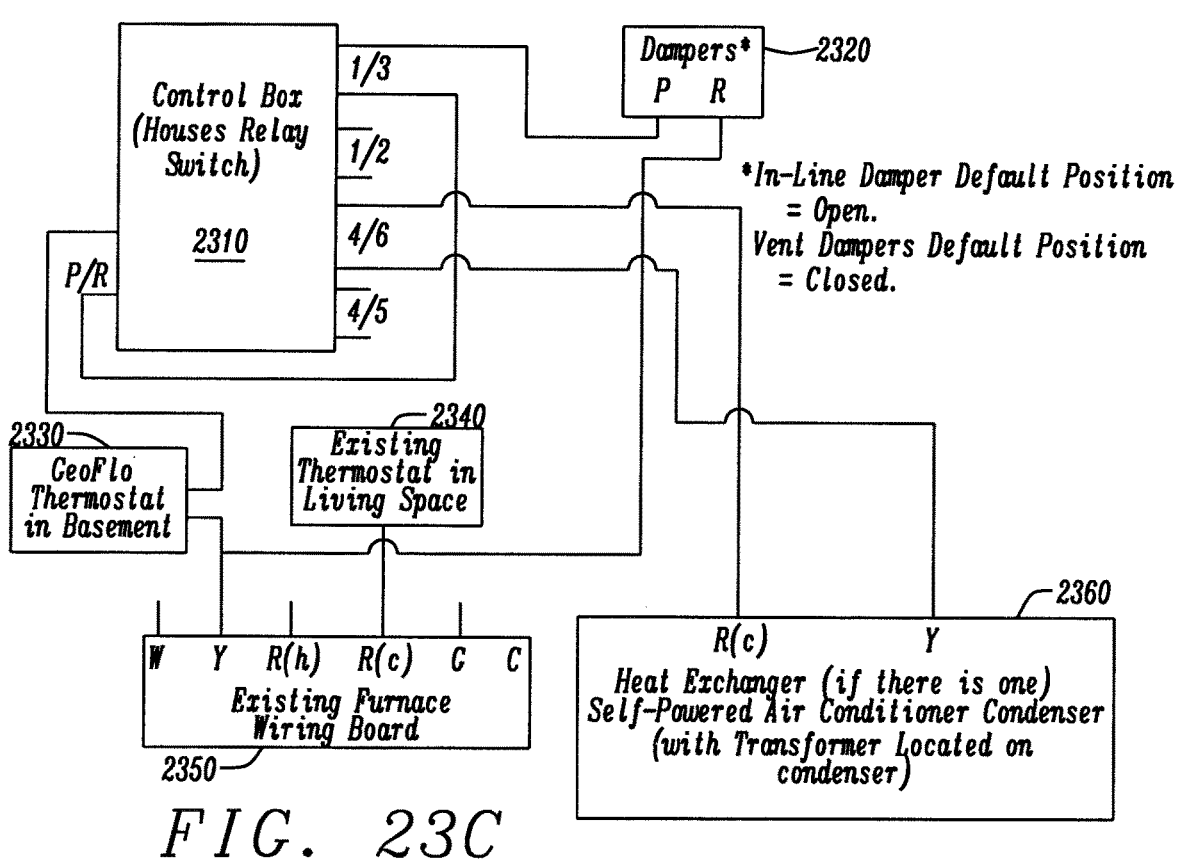

FIGS. 23A, 23B, and 23C depict the wiring configurations of a control box for an HVAC system designed to move air from one area of a building to another. This variation uses the existing HVAC system where the control has dual temperature sensors for the two locations to control heat transfer from one location to the other either by open exchange or through a heat exchanger, with or without a series of dampers, ducts and fans, and capable of activating or deactivating existing components of an HVAC system including but not limited to the air handler, dampers, and the condenser.

FIGS. 23A, 23B, and 23C correspond to the control system for the GeoFlo HVAC system. FIG. 23A is the central control box 2310 that houses a standard, off-the-shelf relay switch 2315, and the wiring added for the GeoFlo system. FIG. 23B and FIG. 23C show the wiring configurations that connect the box that houses the relay with the GeoFlo thermostat 2330 that is located in the basement, the GeoFlo dampers 2320 (in-line damper and 2× vent dampers) and the existing system components: the existing thermostat 2340 in the living space, the air conditioning condenser (with its evaporator coil) and air handler 2360, and the wiring board 2350 on the existing furnace. The wiring system controls all components as the GeoFlo system is turned on (typically whenever cooling is called for at the existing thermostat) and as the GeoFlo system toggles between active cooling mode (when cooling the house) and recharging mode (when traditional cooling is taking place if a traditional cooling system exists). FIG. 23B shows cooling mode for air conditioning with a transformer housed in the furnace, and FIG. 23C shows cooling mode for air conditioning with a transformer housed in the air conditioning unit.

During cooling mode, the wiring/control system sets the system components as follows: the vent dampers are open, the in-line damper is closed, the air handler activates or remains active, and the air conditioning condenser and evaporator coil deactivate or remain inactive. During recharging mode, the wiring/control system sets the system components as follows: the vent dampers are closed, the in-line damper is open, the air handler deactivates or remains inactive, and the air conditioning condenser and evaporator coil activate or remain active.

FIGS. 24-28 represent another variation of a GeoFlo HVAC System, with an air source heat pump, similar to FIGS. 5A and 5B, where the air source heat pump is located in the basement of a building, configured to have one set of coils that normally are located outside of the building, located instead in the basement of the building. There is a temperature sensor and control processing associated with the system. The GeoFlo HP system includes one or more thermostats, configured to sense a temperature at a location of the thermostat in a conditioned space in a building, and to sense a temperature in the basement. There is also a return duct from a conditioned space, and one or more supply ducts to the conditioned space. The GeoFlo HP system can supplement an existing heating system and cooling system (if there is one) or serve as the sole source for heating or cooling the building. There may also be optional insulation for the ceiling of the basement as well as insulation for the hot water system and furnace or boiler.

Figure 24:
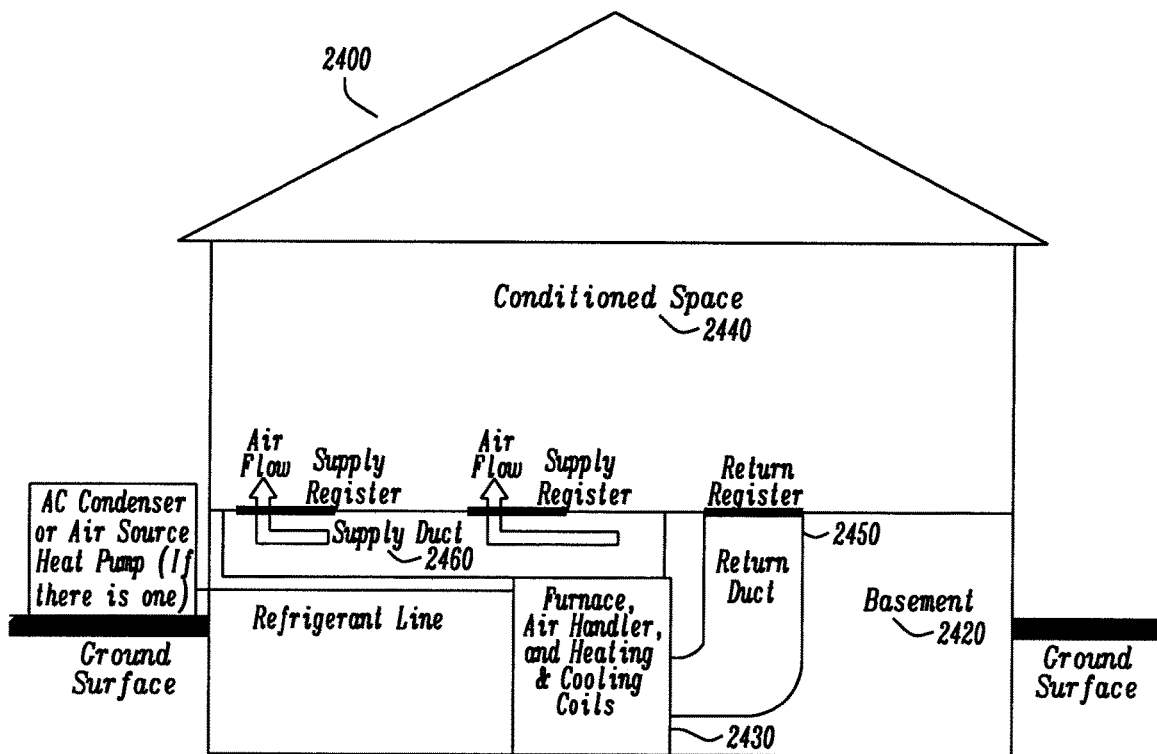
FIG. 24 is a block diagram of a traditional heating and cooling system.

FIG. 24 is a block diagram of a traditional heating and cooling system 2400, without the disclosed heat pump of the basement GeoFlo HP System. In a typical HVAC setup with a duct system that originates in the basement 2420, the air handler 2430 draws air from the conditioned space 2440 in the house through a return duct 2450, then moves the air across a heating and/or cooling coil, then moves the air back into the conditioned space via a supply duct 2460.

Figure 25:
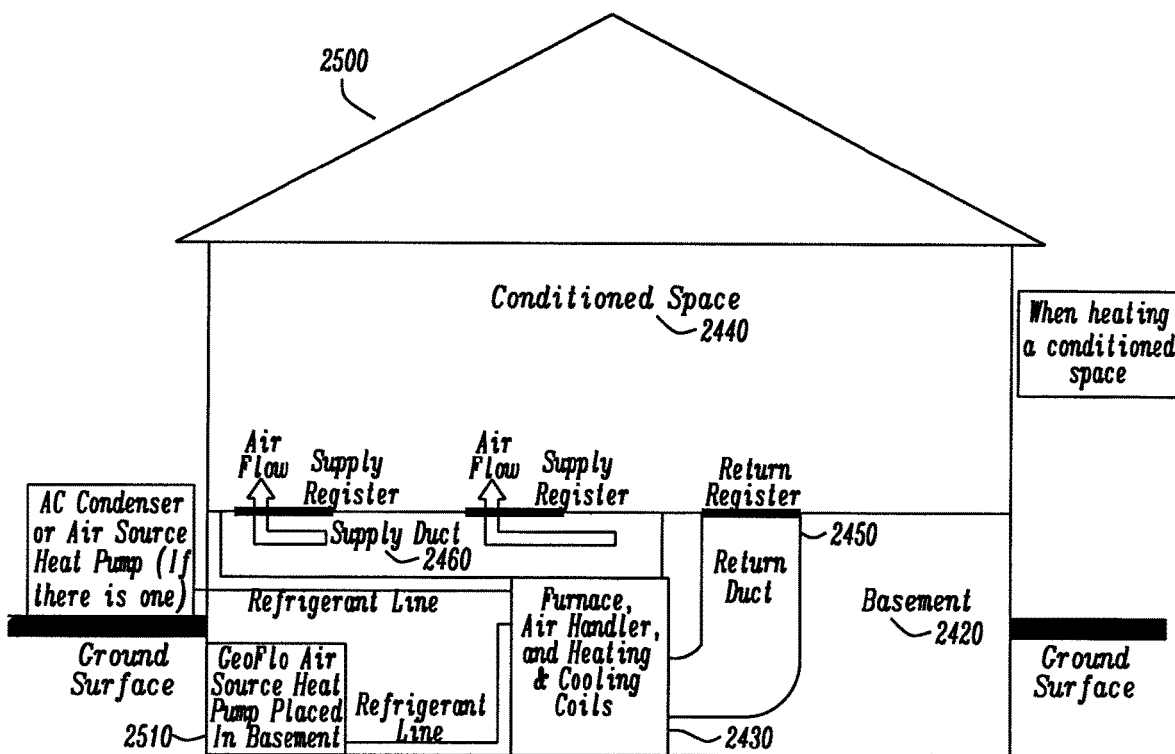
FIG. 25 is a block diagram of a basement GeoFlo HP System, for an air source heat pump used for heating a conditioned space, embodying the principles of the disclosure.

FIG. 25 is a block diagram of a basement GeoFlo HP System 2500, for an air source heat pump when used for heating a conditioned space, embodying the principles of the disclosure. During heating season, GeoFlo HP 2510 can either serve as the sole source of heating, or supplement the house's existing heating system. The basement coil (located in the GeoFlo HP) gathers heat from basement 2420, instead of gathering heat from the outdoors, as an air source heat pump typically would. The heat is dispersed by the air handler coil (located in the air handler assembly typically within the furnace 2430), to the conditioned space 2440 from the basement. This process thereby cools the basement. When the basement temperature has been reduced to a heating threshold temperature (for example, 42° F.), the GeoFlo HP deactivates, and allows heat to be absorbed into the basement from the earth. This is achieved geothermally, until the basement temperature has once again increased to a delta temperature (for example, 2° F.) above the heating threshold. At that time, the GeoFlo HP will reactivate to continue heating the building, or supplementing the building's heating system.

Figure 26:
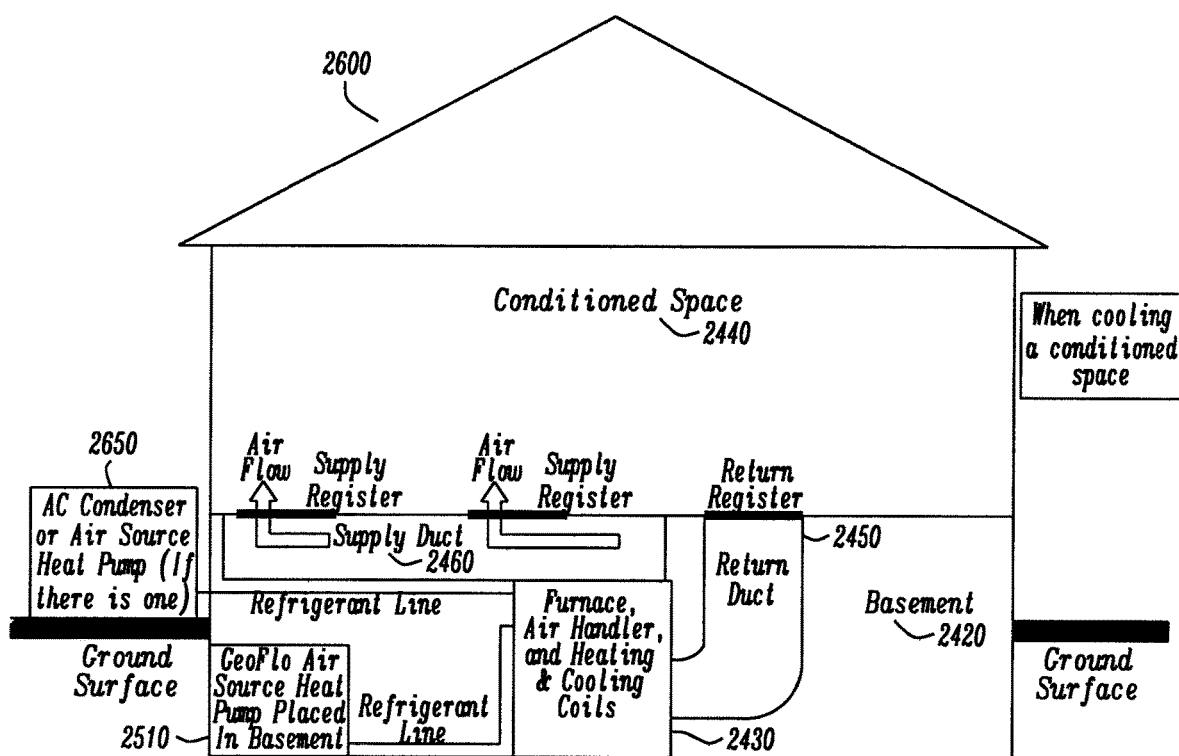
FIG. 26 is a block diagram of a basement GeoFlo HP System, for an air source heat pump used for cooling a conditioned space, embodying the principles of the disclosure.

FIG. 26 is a block diagram of a basement GeoFlo HP System 2600, for an air source heat pump when used for cooling a conditioned space 2440, embodying the principles of the disclosure. During cooling season, the GeoFlo HP 2510 can either serve as the sole source of cooling or supplement the house's existing cooling system 2650. The basement coil (located in the GeoFlo HP) disperses heat into the basement 2420 instead of dispersing heat into the outdoors, as an air source heat pump typically would. At the same time, heat is absorbed by the air handler coil (located in the air handler assembly typically within the furnace 2430). This process thereby heats the basement. When the basement temperature has been increased to a cooling threshold temperature (for example, 72° F., typically a different temperature than that used for the heating threshold temperature described above), the GeoFlo HP deactivates, and allows heat to be dispersed from the basement into the earth. This is achieved geothermally, until the basement temperature has once again decreased to a delta temperature (for example, 2° F.) below the cooling threshold point. At that time, the GeoFlo HP will reactivate to continue cooling the building or supplementing the building's cooling system.

Conventional thermostats, located in a conditioned space, sense the temperature at the location of the thermostat to determine when heating or cooling is needed. The thermostat for a GeoFlo HP System does this as well, and the GeoFlo HP System can use an existing thermostat. In either case, it also senses the temperature in a basement of the building, remotely via either a second thermostat or other means of remotely measuring the temperature.

Figure 27:
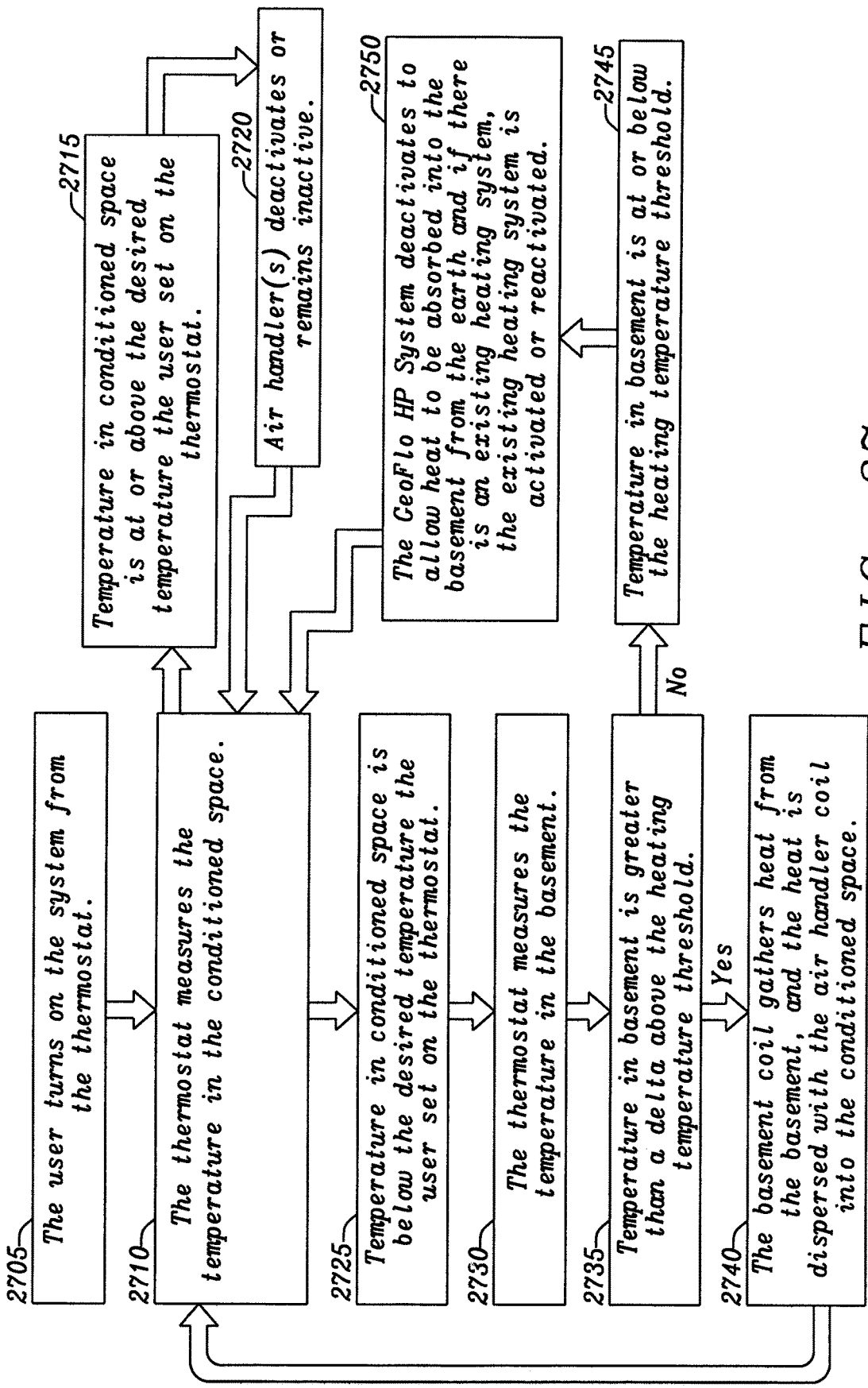
FIG. 27 is a flowchart for a method for operating a basement GeoFlo HP System, for an air source heat pump used for heating a conditioned space.

FIG. 27 is a flowchart for a method of operating a basement GeoFlo HP System, for an air source heat pump used for heating a conditioned space, as shown in FIG. 25. When heating, the user turns on the system from a thermostat, 2705. The thermostat measures the temperature in the conditioned space, 2710. If the temperature in the conditioned space is at or above the desired temperature the user set on the thermostat 2715, the air handler deactivates or remains inactive, 2720. If the temperature in the conditioned space is below the desired temperature the user set on the thermostat 2725, the thermostat measures the temperature in the basement 2730 via a remote sensor or separate thermostat.

A heating threshold temperature is utilized to determine when geothermal heat absorption into the basement is sufficient for basement heating to be used to heat the conditioned space. As an example only, the heating threshold temperature could be set at 42° F. Once the temperature in the basement is greater than a delta above the heating temperature threshold 2735, a basement coil gathers heat from the basement, and the heat is dispersed with an air handler coil into the conditioned space 2740. The delta could be set at, as an example only, 2° F. The system would activate, in this example, at 44° F. (the heating threshold temperature plus the delta). If the temperature in the basement is at or below the heating threshold temperature in 2745, the GeoFlo HP System deactivates to allow heat to be absorbed into the basement from the earth 2750, and if there is an existing heating system, the existing heating system is activated or reactivated. Once the basement temperature has again risen to the heating threshold temperature plus the delta, in this example, at 44° F., the GeoFlo HP system reactivates and continues heating or supplementing the building's heating system.

The threshold temperatures for both heating and cooling will be based on the maximum (for cooling, for example 75° F.) and minimum (for heating, for example 40° F.) temperatures that will not cause waste heat to be absorbed by the living space (while cooling, if the basement exceeds an example threshold of 75° F., it will disperse unwanted waste heat into the living space directly through the floor that separates the basement and the living space) and dispersed by the living space (while heating if the basement dips below an example threshold of 40° F., it will absorb valuable heat from the living space directly through the floor that separates the basement and the living space) to an extent that causes the system to waste energy by working against itself. The heating threshold temperature for both heating and cooling will not damage the house or any equipment in the house (if the basement exceeds an example threshold of 75° F., it might cause excess humidity (as an example of damage that might occur) in the basement. If the basement dips below an example threshold of 40° F., it might risk freezing pipes (as an example of damage that might occur). There might also be risk of other damage beyond these examples).

Figure 28:
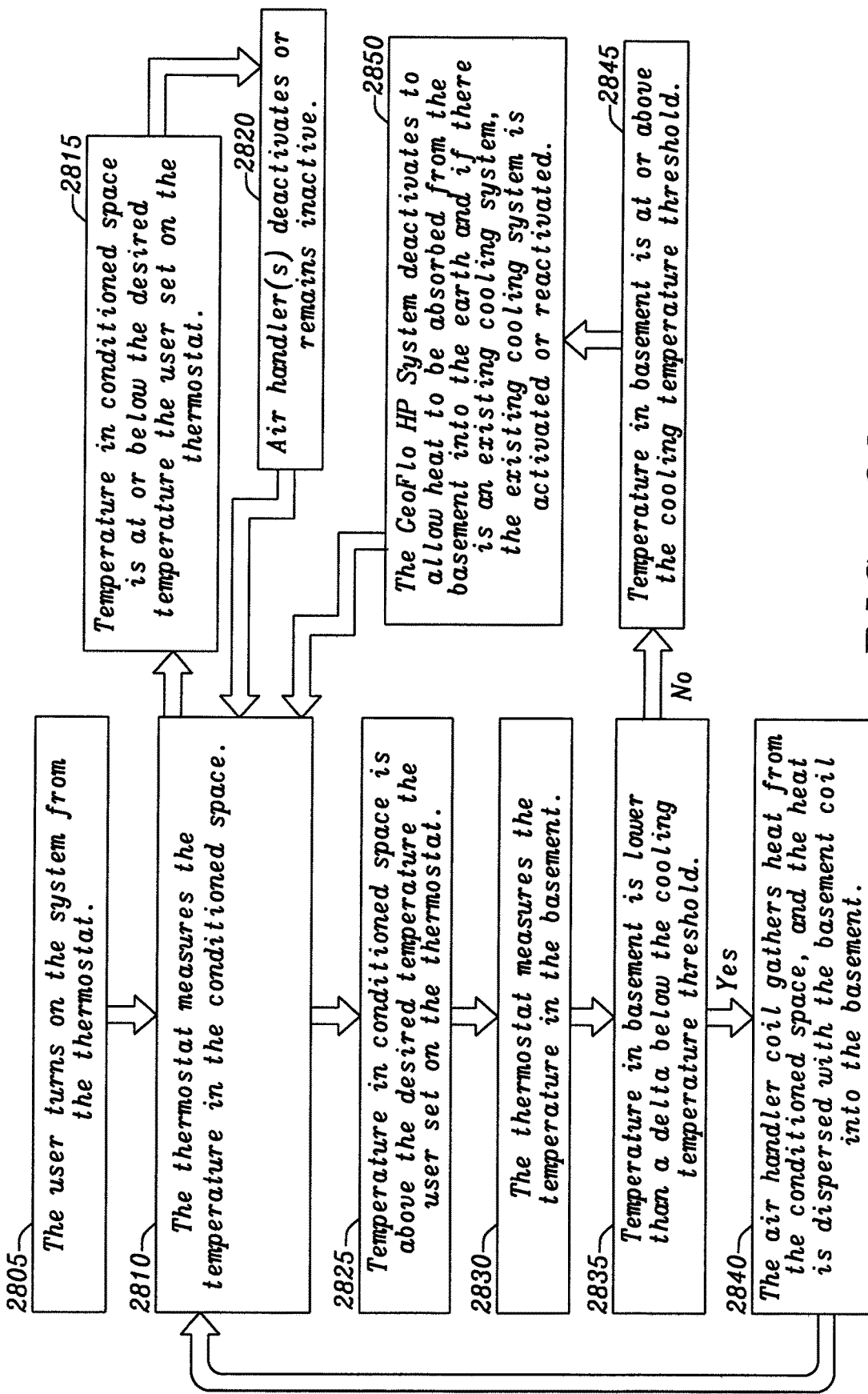
FIG. 28 is a flowchart for a method for operating a basement GeoFlo HP System, for an air source heat pump used for cooling a conditioned space.

FIG. 28 is a flowchart for a method of operating a basement GeoFlo HP System, for an air source heat pump used for cooling a conditioned space, as shown in FIG. 26. When cooling, the user turns on the system from a thermostat, 2805. The thermostat measures the temperature in the conditioned space, 2810. If the temperature in the conditioned space is at or below the desired temperature the user set on the thermostat 2815, the air handler deactivates or remains inactive, 2820. If the temperature in the conditioned space is above the desired temperature the user set on the thermostat 2825, the thermostat measures the temperature in the basement 2830 via a remote sensor or separate thermostat. Once the temperature in the basement is lower than a delta below the cooling temperature threshold 2835, the air handler coil gathers heat from the conditioned space, and the heat is dispersed with the basement coil into the basement 2840. The delta could be set at, as an example only, 2° F. The system would activate, in this example, at 70° F. (the cooling threshold temperature minus the delta). If the temperature in the basement is at or above the cooling threshold in 2845, the GeoFlo HP System deactivates to allow heat to be dispersed from the basement into the earth 2850, and if there is an existing cooling system, the existing cooling system is activated or reactivated. At this time, the existing cooling system if there is one, will typically reactivate. Once the basement temperature has again fallen below the cooling temperature threshold minus the delta, in this example, at 70° F., the GeoFlo HP system reactivates and continues cooling or supplementing the building's cooling system.

While particular embodiments of the present disclosure have been illustrated and described, it will be understood by those skilled in the art that various changes in form and details may be made without departing from the spirit and scope of the invention.

What is claimed is:

1. An air conditioning system having a computing or wiring based control system, comprising:
   one or more thermostats, configured to sense a temperature at a location of the thermostat in a building, and to sense a temperature in a basement of the building;
   a main return duct;
   a basement supply duct and a basement return duct, each connected on one end to said main return duct, and each opening on another end to said basement; and
   dampers for controlling air flow through said main return duct, said basement supply duct, and said basement return duct.

2. The air conditioning system of claim 1, wherein said dampers comprise a first, second, and third damper, wherein in a first set of positions said dampers allow air to flow through said return duct and not to/from the basement, and in a second set of positions allow air to flow to/from the basement.

3. The air conditioning system of claim 2, wherein said first and third dampers are formed as a dual damper, whereby opened/closed positions of said first and third dampers are mutually exclusive, or both open.

4. The air conditioning system of claim 2, wherein said first and second dampers are formed as a dual damper, whereby opened/closed positions of said first and third dampers are mutually exclusive, or both open.

5. The air conditioning system of claim 1, further comprising an air handler and evaporating coils between said main return duct and a main supply duct.

6. The air conditioning system of claim 1, wherein during a cooling mode, the system is configured to use basement air to cool a conditioned space, and wherein the system is configured to operate in the cooling mode until the basement can no longer cool the conditioned space, at which point the system transitions to a charging mode.

7. The air conditioning system of claim 1, wherein during a charging mode, the system is configured to operate without using basement air, to draw air through the main return duct, a cooling coil, and a main supply duct, until the basement is cool enough for the system to transition to a cooling mode.

8. The air conditioning system of claim 1, further comprising a temperature sensor located in the basement, connected to said one or more thermostats, either wired or wirelessly.

9. The air conditioning system of claim 8, wherein said thermostat is configured to control opening and closing of said dampers, to communicate with the basement temperature sensor or separate thermostat, and to operate the air handler and evaporating coils, to operate in cooling or charging modes.

10. The air conditioning system of claim 1, wherein during a cooling mode, the system is configured to use basement air to cool a conditioned space, and wherein the system is configured to operate in the cooling mode until the basement can no longer cool the conditioned space.

11. The air conditioning system of claim 1, further comprising a supplemental air handler added to the basement supply duct, configured to boost a HVAC system flow rate, and to operate during a cooling mode or drying mode.

12. The air conditioning system of claim 1, wherein if a conditioned space only needs a time period of cooling, and a charging mode is almost complete, the system is configured to change from a charging mode to a cooling mode after a pause to allow charging to complete.

13. The air conditioning system of claim 1, further comprising a basement air to air heat exchanger between said basement supply duct and said basement return duct, wherein the heat exchanger is placed in the basement on the floor, along the walls, or in any other location suitable for heat exchange.

14. The air conditioning system of claim 1, further comprising a dehumidification feature, or a power boost feature, for entering a drying mode, wherein a first damper is closed, a second and third damper are open, an air handler is on, and an evaporator is on.

15. The air conditioning system of claim 14, wherein the dehumidification feature is turned on, the system enters the drying mode for a predetermined period of time, and then enters a cooling mode.

16. The air conditioning system of claim 14, further comprising a hygrometer located in a basement and a thermostat designed and/or coded in such a way that the thermostat accepts and processes readings from the hygrometer.

17. The air conditioning system of claim 14, wherein the dehumidification feature is turned on/off at the thermostat, or from an app, whenever the system is running.

18. The cooling system of claim 1, further comprising an additional duct connecting the basement supply duct to the main return duct, for use in a building having a finished basement that also is conditioned.

19. The cooling system of claim 18, wherein said dampers comprise a first, second, and third damper, wherein in a first set of positions said dampers allow air to flow through said return duct and not to the basement, but rather to draw cool air from the basement, and in a second set of positions allow air to flow to the basement.

20. The cooling system of claim 1, further comprising a separate section of duct outside a main return duct, connected to said main return duct by lengths of flex duct.

21. The cooling system of claim 20, wherein during a cooling mode, said separate section of duct comprises a first damper open for warm air from the conditioned space to enter the basement, a second damper that is closed, and a third damper that is open for cool air from the basement to enter the conditioned space.

22. The cooling system of claim 20, wherein during a charging mode, said separate section of duct comprises a first damper that is closed, a second damper that is open for warm air from the conditioned space to enter the air handler unit, and a third damper that is closed.

23. The cooling system of claim 1, where the computing or wiring based control system is configured to move heat from one area of a building to another using the existing HVAC system, and comprises one or more temperature sensors for one or more locations to control heat transfer from one location to another location, either by open exchange or through a heat exchanger.

24. The cooling system of claim 23, further configured to activate or deactivate existing components of an existing HVAC system, including an air handler, dampers, and a condenser.

25. The air conditioning system of claim 1, wherein said dampers and said basement supply duct and basement return duct are assembled as a drop-in duct, for direct connection to an existing duct, or for connection to an existing duct through flex ducts.

26. The air conditioning system of claim 1, further comprising a moisture reducing HVAC filter located in line with said basement return duct.

27. The air conditioning system of claim 1, further comprising an ultraviolet (UV) antimicrobial filtration, placed in the basement return duct.

28. A method for operating an air conditioning system, in a building having pre-existing central air conditioning, wherein the air conditioning system comprises one or more thermostats, configured to sense a temperature at a location of the thermostat in a conditioned space in a building, and to sense a temperature in a basement of the building; a computing or wiring based control system; a main return duct; a basement supply duct and a basement return duct, each connected on one end to said main return duct, and each opening on another end to said basement; and dampers for controlling air flow through said main return duct, said basement supply duct, and said basement return duct, wherein the method comprises the steps of:

if the temperature in the basement is less than a predetermined threshold cooler than the temperature of the conditioned space, entering a charging mode, comprising:

activating an evaporator and an air handler, and circulating air through said main return duct, said air handler and said evaporator; and if the temperature in the basement is equal to or greater than said predetermined threshold cooler than the temperature of the conditioned space, entering a cooling mode, comprising:

deactivating the evaporator, activating the air handler, or allowing the air handler to remain active, and circulating air through said main return vent, said basement supply duct, said basement return duct and said air handler.

29. A method for operating an air conditioning system, in a building with pre-existing forced air heating, and without pre-existing central air conditioning, wherein the system comprises one or more thermostats, configured to sense a temperature at a location of the thermostat in a conditioned space in a building, and to sense a temperature in a basement of the building; a computing or wiring based control system; a main return duct; a basement supply duct and a basement return duct, each connected on one end to said main return duct, and each opening on another end to said basement; and dampers for controlling air flow through said main return duct, said basement supply duct, and said basement return duct, wherein the method comprises the steps of:

if the temperature in the conditioned space is above a desired temperature, measuring the temperature in the basement;

if the temperature in the basement is equal to or greater than a predetermined threshold cooler than the temperature of the conditioned space, entering a cooling mode, comprising:

activating an air handler, and circulating air through said main return vent, said basement supply duct, said basement return duct and said air handler; and if the temperature in the basement is less than a predetermined threshold cooler than the temperature of the conditioned space, entering a charging mode, comprising:

shutting off the system and allowing the basement to disperse heat into the earth.

30. An air conditioning system having a computing or wiring based control system, comprising:

one or more thermostats, configured to sense a temperature at a location of the thermostat in a building, and to sense a temperature in a basement of the building;

a main return duct;

a heat exchanger formed within, or inline with, said main return duct; and a blower or fan, whereby said blower or fan is configured to move air from the basement over said heat exchanger, while air is passing through said main return duct, to allow heat transfer between the basement air and duct air without mixing of said basement air and said duct air.

* * * * *